(12) United States Patent
Ahmed et al.

(10) Patent No.: US 11,506,512 B2
(45) Date of Patent: *Nov. 22, 2022

(54) METHOD AND SYSTEM USING TIGHTLY COUPLED RADAR POSITIONING TO IMPROVE MAP PERFORMANCE

(71) Applicant: Trusted Positioning, Inc., Calgary (CA)

(72) Inventors: Amr Shebl Ahmed, Calgary (CA); Medhat Omr, Calgary (CA); Abdelrahman Ali, Calgary (CA); Jacques Georgy, Calgary (CA); Christopher Goodall, Calgary (CA); Billy Cheuk Wai Chan, Calgary (CA); Qingli Wang, Calgary (CA)

(73) Assignee: TDK Japan, Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 15/929,367

(22) Filed: Apr. 28, 2020

(65) Prior Publication Data

US 2020/0370920 A1 Nov. 26, 2020

Related U.S. Application Data

(63) Continuation-in-part of application No. 16/420,143, filed on May 22, 2019, now Pat. No. 11,422,253.

(51) Int. Cl.
| | |
|---|---|
| *G01C 21/00* | (2006.01) |
| *G01S 13/89* | (2006.01) |
| *G01C 21/16* | (2006.01) |

(52) U.S. Cl.
CPC ........ *G01C 21/3848* (2020.08); *G01C 21/165* (2013.01); *G01C 21/3815* (2020.08); *G01S 13/89* (2013.01)

(58) Field of Classification Search
CPC .............. G01C 21/3848; G01C 21/165; G01C 21/3815; G01C 21/3602; G01C 21/3804; G01S 13/89; G01S 13/931; G05D 1/0257; G05D 1/0259; G05D 1/027
See application file for complete search history.

(56) References Cited

U.S. PATENT DOCUMENTS

| | | | | |
|---|---|---|---|---|
| 2004/0140405 | A1* | 7/2004 | Meyer | B61L 25/028 246/122 R |
| 2007/0222674 | A1* | 9/2007 | Tan | G06Q 10/087 342/357.32 |
| 2016/0349362 | A1* | 12/2016 | Rohr | G01S 17/06 |
| 2017/0023659 | A1* | 1/2017 | Bruemmer | G06V 40/20 |
| 2019/0003838 | A1* | 1/2019 | Kudrynski | G01C 21/3837 |

* cited by examiner

*Primary Examiner* — Donald H B Braswell

(57) ABSTRACT

Feedback for map information is based on an integrated navigation solution for a device within a moving platform using obtained motion sensor data from a sensor assembly of the device, obtained radar measurements for the platform and obtained map information for an environment encompassing the platform. An integrated navigation solution is generated based at least in part on the obtained motion sensor data using a nonlinear state estimation technique that uses a nonlinear measurement model for radar measurements. The map information is assessed based at least in part on the integrated navigation solution and radar measurements so that feedback for the map information can be provided.

20 Claims, 12 Drawing Sheets

METHOD AND SYSTEM USING TIGHTLY COUPLED RADAR POSITIONING TO IMPROVE MAP PERFORMANCE

CROSS-REFERENCE TO RELATED APPLICATIONS

This application is a continuation-in-part, claiming priority from and benefit of U.S. patent application Ser. No. 16/420,143, filed May 22, 2019, which is entitled "METHOD AND SYSTEM FOR POSITIONING USING RADAR AND MOTION SENSORS," is assigned to the assignee hereof, and is incorporated by reference in its entirety.

FIELD OF THE PRESENT DISCLOSURE

This disclosure generally relates to positioning and navigation techniques and more specifically to providing feedback for map information by positioning determinations from radar and motion sensors.

BACKGROUND

Self-driving vehicles have the potential of reducing the number of annual causalities by eliminating the human error factor. By enabling self-driving vehicles, numerous intelligent transportation systems can be deployed and used for traffic management and a multitude of safety and entertainment applications. One of the major challenges facing researchers and engineers working on the development of autonomous vehicles, is fulfilling the system requirement of estimating the vehicles' pose or positioning in real-time within certain accuracy and availability constraints. Traditional systems used for such estimation include Inertial Measurement Units (IMU) and Global Navigation Satellite System (GNSS). IMU-based systems provide relative pose estimation accurate in short time but due to the process of mechanization, standalone IMU-based systems, such as inertial navigation systems (INS), accumulate errors in the states exponentially with time due to drift and other sensor characteristics. On the other hand, the position estimated by the GNSS receiver is absolute and does not drift over time. However, GNSS signals are sometimes completely blocked or affected by severe multipath. Due to the complementary error characteristics of motion sensors and GNSS systems, a traditional approach to accurately estimate the pose of the vehicle, is by using sensor fusion algorithms to integrate IMU and GNSS signals. The performance of the GNSS system can also be enhanced by using Differential GPS stations that can broadcast ionospheric and tropospheric errors to adjacent GNSS receivers.

Due to very high accuracy and reliability requirements imposed by autonomous driving applications, traditional IMU/GNSS or INS/GNSS integration is not enough. In dense urban areas, skyscrapers block several positioning satellites and reflect signals (i.e., multipath) from visible and non-visible satellites, leading to low positioning accuracy. Moreover, due to the geometry of the visible satellites, which are mostly collinear in dense urban areas, the GNSS positioning accuracy and availability is usually limited. Hence, traditional IMU/GNSS or INS/GNSS integration systems are not capable of achieving the accuracy requirements for autonomous driving applications. Regardless of the environment surrounding self-driving vehicles, achieving a minimum level of positioning accuracy is needed. Correspondingly, suitable techniques for providing an additional source of information that may be used in determining a positional and/or navigational solution using radar information are disclosed in the U.S. patent application Ser. No. 16/420,143 referenced above, wherein radar measurements are integrated with information from an IMU to help overcome the limitations of the conventional GNSS integration.

The positioning techniques noted above may be used in conjunction with map information, such as to improve both the reliability and positioning accuracy of the navigation system. Examples of algorithms using map information to aid a navigation system include geometric, topological, probabilistic and other advanced techniques. However, conventional approaches may not account for position determinations that are made at increased resolution, such as those obtained by integrating radar measurements. For the sake of illustration, typical uses of map information include constraining techniques that seek to limit the position of the device to possible paths, but such uses do not necessarily benefit from the improved resolution as the map information may not have enough detail or the constraints may not be sufficiently limiting to provide a practical aid in determining navigation solutions. Further, existing map information may suffer from inaccuracies due to mistakes during the original data gathering process as well as temporary or permanent changes that have occurred subsequently. Accordingly, it would be desirable to provide feedback that may be used to improve map information using the navigation solutions determined by integrating radar measurements with IMU-based systems. As will be described in the following materials, this disclosure satisfies these and other needs.

SUMMARY

This disclosure includes a method for providing feedback for map information using an integrated navigation solution for a device within a moving platform by obtaining motion sensor data from a sensor assembly of the device, obtaining radar measurements for the platform, obtaining map information for an environment encompassing the platform, generating an integrated navigation solution based at least in part on the obtained motion sensor data using a nonlinear state estimation technique, wherein the nonlinear state estimation technique comprises using a nonlinear measurement model for radar measurements, assessing the map information based at least in part on the integrated navigation solution and radar measurements and providing feedback for the map information based on the assessment. Generating the integrated navigation solution comprises using the obtained motion sensor data in the nonlinear state estimation technique and integrating the radar measurements directly by updating the nonlinear state estimation technique using the nonlinear measurement models and the map information.

This disclosure also includes a system for providing feedback for map information using an integrated navigation solution for a device within a moving platform, the system comprises a device having a sensor assembly configured to output motion sensor data, a radar configured to output radar measurements for the platform and at least one processor, coupled to receive the motion sensor data, the radar measurements, and map information for an environment encompassing the platform. The processor may be operative to generate an integrated navigation solution based at least in part on the motion sensor data using a nonlinear state estimation technique, wherein the nonlinear state estimation technique comprises using a nonlinear measurement model for radar measurements, assess the map information based at least in part on the integrated navigation solution and radar measurements and provide feedback for the map information based at least in part on the assessment. The nonlinear state estimation technique comprises using a nonlinear measurement model for radar measurements, such that the at least one processor generates the integrated navigation solution by using the obtained motion sensor data in the nonlinear state estimation technique and integrating the radar measurements directly by updating the nonlinear state estimation technique using the nonlinear measurement models and the map information.

DETAILED DESCRIPTION

Figure 1:
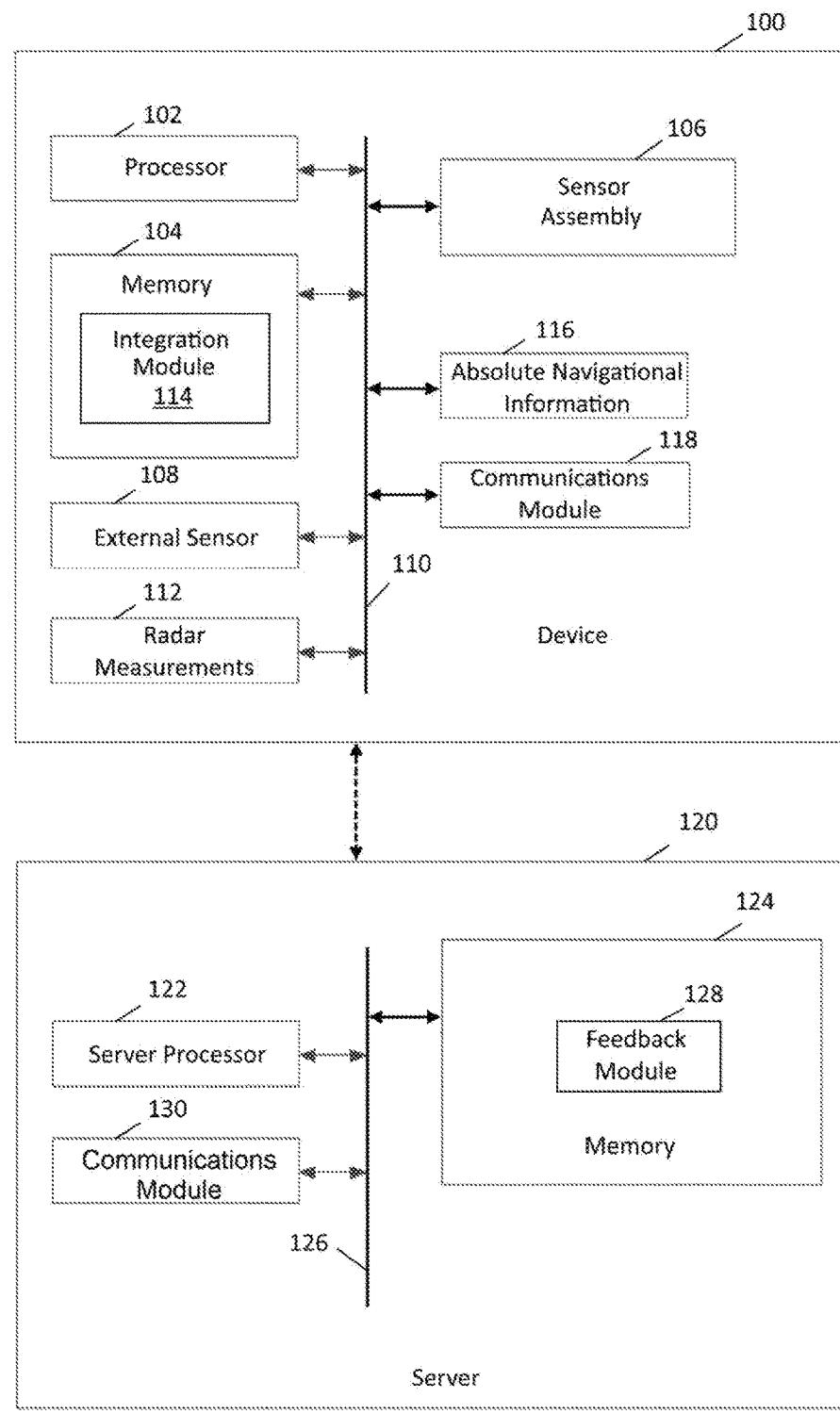
FIG. 1 is schematic diagram of a device for providing a navigation solution by integrating radar measurements with motion sensor data according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

The techniques of this disclosure are directed to providing a navigation solution for a device within a moving platform by integrating radar measurements with motion sensor data. Typically, the platform is a wheel-based vehicle or other similar vessel intended for use on land, but may also be marine or airborne. As such, the platform may also be referred to as the vehicle. However, the platform may also be a pedestrian or a user undergoing on foot motion. As will be appreciated, motion sensor data includes information from accelerometers, gyroscopes, or an IMU. Inertial sensors are self-contained sensors that use gyroscopes to measure the rate of rotation/angle, and accelerometers to measure the specific force (from which acceleration is obtained). Inertial sensors data may be used in an INS, which is a non-reference based relative positioning system. Using initial estimates of position, velocity and orientation angles of the moving platform as a starting point, the INS readings can subsequently be integrated over time and used to determine the current position, velocity and orientation angles of the platform. Typically, measurements are integrated once for gyroscopes to yield orientation angles and twice for accelerometers to yield position of the platform incorporating the orientation angles. Thus, the measurements of gyroscopes will undergo a triple integration operation during the process of yielding position. Inertial sensors alone, however, are unsuitable for accurate positioning because the required integration operations of data results in positioning solutions that drift with time, thereby leading to an unbounded accumulation of errors. Integrating radar measurements with the motion sensor data can help mitigate such errors.

The device that is contained within the platform (which as noted may be a vehicle or vessel of any type, and in some applications, may be a person) and may have one or more sources of navigational or positional information. In some embodiments, the device is strapped or tethered in a fixed orientation with respect to the platform. The device is "strapped," "strapped down," or "tethered" to the platform when it is physically connected to the platform in a fixed manner that does not change with time during navigation, in the case of strapped devices, the relative position and orientation between the device and platform does not change with time during navigation. Notably, in strapped configurations, it is assumed that the mounting of the device to the platform is in a known orientation. Nevertheless, in some circumstances, there may be a deviation in the intended mounting orientation, leading to a misalignment between the device and the platform. In one aspect, the techniques of this disclosure may be employed to characterize and correct for such a mounting misalignment.

In other embodiments, the device is "non-strapped", or "non-tethered" when the device has some mobility relative to the platform (or within the platform), meaning that the relative position or relative orientation between the device and platform may change with time during navigation. Under these conditions, the relative orientation of the device with respect to the platform may vary, which may also be termed misalignment. As with the mounting misalignment discussed above, this varying misalignment between the frame of the device and the frame of the platform may be determined using the techniques of this disclosure and correspondingly compensated for. The device may be "non-strapped" in two scenarios: where the mobility of the device within the platform is "unconstrained", or where the mobility of the device within the platform is "constrained." One example of "unconstrained" mobility may be a person moving on foot and having a portable device such as a smartphone in the their hand for texting or viewing purposes (hand may also move), at their ear, in hand and dangling/swinging, in a belt clip, in a pocket, among others, where such use cases can change with time and even each use case can have a changing orientation with respect to the user. Another example where the mobility of the device within the platform is "unconstrained" is a person in a vessel or vehicle, where the person has a portable device such as a smartphone in the their hand for texting or viewing purposes (hand may also move), at their ear, in a belt clip, in a pocket, among others, where such use cases can change with time and even each use case can have a changing orientation with respect to the user. An example of "constrained" mobility may be when the user enters a vehicle and puts the portable device (such as smartphone) in a rotation-capable holder or cradle. In this example, the user may rotate the holder or cradle at any time during navigation and thus may change the orientation of the device with respect to the platform or vehicle. Thus, when non-strapped, the mobility of the device may be constrained or unconstrained within the platform and may be moved or tilted to any orientation within the platform and the techniques of this disclosure may still be applied under all of these conditions. As such, some embodiments described below include a portable, hand-held device that can be moved in space by a user and its motion, location and/or orientation in space therefore sensed. The techniques of this disclosure can work with any type of portable device as desired, including a smartphone or the other exemplary devices noted below. It will be appreciated that such devices are often carried or associated with a user and thus may benefit from providing navigation solutions using a variety of inputs. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices. However, the techniques of this disclosure may also be applied to other types of devices that are not handheld, including devices integrated with autonomous or piloted platforms whether land-based, aerial, or underwater vehicles, including robots or Autonomous Mobile Robots (AMR), automobiles, trucks, buses, forklifts, carts, or other types of vehicles or vessels, as well as equipment that may be used with such platforms. As an illustration only and without limitation, the platform may be a drone, also known as an unmanned aerial vehicle (UAV)

To help illustrate aspects of this disclosure, features of a suitable device 100 are depicted in FIG. 1 with high level schematic blocks. As will be appreciated, device 100 may be implemented as a device or apparatus, such a strapped, non-strapped, tethered, or non-tethered device as described above, which when non-strapped, the mobility of the device may be constrained or unconstrained within the platform and may be moved or tilted to any orientation within the platform. As shown, device 100 includes a processor 102, which may be one or more microprocessors, central processing units (CPUs), or other processors to run software programs, which may be stored in memory 104, associated with the functions of device 100. In other embodiments, any of the processors of this disclosure may have similar characteristics. Multiple layers of software can be provided in memory 104, which may be any combination of computer readable medium such as electronic memory or other storage medium such as hard disk, optical disk, etc., for use with the processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly 106 for providing motion sensor data representing motion of device 100 in space, including inertial sensors such as an accelerometer and a gyroscope, other motion sensors including a magnetometer, a pressure sensor or others may be used in addition. Depending on the configuration, sensor assembly 106 measures one or more axes of rotation and/or one or more axes of acceleration of the device. In one embodiment, sensor assembly 106 may include inertial rotational motion sensors or inertial linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by processor 102, or other processing resources of device 100, combines data from sensor assembly 106 to provide a six axis determination of motion or six degrees of freedom (6DOF). Still further, sensor assembly 106 may include a magnetometer measuring along three orthogonal axes and output data to be fused with the gyroscope and accelerometer inertial sensor data to provide a nine axis determination of motion. Likewise, sensor assembly 106 may also include a pressure sensor to provide an altitude determination that may be fused with the other sensor data to provide a ten axis determination of motion. As desired, sensor assembly 106 may be implemented using Micro Electro Mechanical System (MEMS), allowing integration into a single small package.

Optionally, device 100 may implement an additional sensor assembly in the form of external sensor 108, and may represent one or more sensors as described above, such as inertial motion sensors (i.e., accelerometer and/or a gyroscope), other motion sensors or other types of sensors. For example, in some of the embodiments discussed below, external sensor 108 is a supplemental sensor, such as an optical camera, a thermal camera, an infra-red imaging sensor, a light detection and ranging (LIDAR) system, or other suitable sensor that records images or samples to help classify objects detected by the radar system. As used herein, "external" means a sensor that is not integrated with sensor assembly 106 and may be remote or local to device 100. Also alternatively or in addition, sensor assembly 106 and/or external sensor 108 may be configured to measure one or more other aspects about the environment surrounding device 100. This is optional and not required in all embodiments. For example, a pressure sensor and/or a magnetometer may be used to refine motion determinations. Although described in the context of one or more sensors being MEMS based, the techniques of this disclosure may be applied to any sensor design or implementation.

In the embodiment shown, processor 102, memory 104, sensor assembly 106 and other components of device 100 may be coupled through bus 110, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between processor 102 and memory 104.

As will be discussed in detail below, the techniques of this disclosure involve integrating radar measurements with the motion sensor data provided by sensor assembly 106 (or other sensors, such as external sensor 108) to provide the navigation solution. Device 100 obtains radar measurements 112 from any suitable radar system, which may be integrated with device 100, may be associated or connected with device 100, may be part of the platform or may be implemented in any other desired manner.

Algorithms, routines or other instructions for processing sensor data, including integrating radar measurements 112, may be employed by integration module 114 to perform this any of the operations associated with the techniques of this disclosure. In one aspect, an integrated navigation solution based on the motion sensor data and the radar measurements may be output by integration module 114. As used herein, a navigation solution comprises position and attitude (or orientation) and may optionally include velocity. Determining the navigation solution may involve sensor fusion or similar operations performed by the processor 102, which may be using the memory 104, or any combination of other processing resources.

Optionally, device 100 may have a source of absolute navigational information 116, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons or other similar methods when deriving a navigation solution. This is optional and not required in all embodiments. Integration module 114 may also be configured to use information from a wireless communication protocol to provide a navigation solution determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. The source of absolute navigational information represents a "reference-based" system that depend upon external sources of information, as opposed to self-contained navigational information that is provided by self-contained and/or "non-reference based" systems within a device/platform, such as sensor assembly 106 as noted above.

In some embodiments, device 100 may include communications module 118 for any suitable purpose, including for receiving map information for the environment surrounding the platform. Communications module 118 may employ a Wireless Local Area Network (WLAN) conforming to Institute for Electrical and Electronic Engineers (IEEE) 802.11 protocols, featuring multiple transmit and receive chains to provide increased bandwidth and achieve greater throughput. For example, the 802.11ad (WiGIG™) standard includes the capability for devices to communicate in the 60 GHz frequency band over four, 2.16 GHz-wide channels, delivering data rates of up to 7 Gbps. Other standards may also involve the use of multiple channels operating in other frequency bands, such as the 5 GHz band, or other systems including cellular-based and WLAN technologies such as Universal Terrestrial Radio Access (UTRA), Code Division Multiple Access (CDMA) networks, Global System for Mobile Communications (GSM), IEEE 802.16 (WiMAX), Long Term Evolution (LTE), other transmission control protocol, internet protocol (TCP/IP) packet-based communications, or the like may be used. In some embodiments, multiple communication systems may be employed to leverage different capabilities. Typically, communications involving higher bandwidths may be associated with greater power consumption, such that other channels may utilize a lower power communication protocol such as BLUETOOTH®, ZigBee®, ANT or the like. Further, a wired connection may also be employed. Generally, communication may be direct or indirect, such as through one or multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

In this exemplary system, device 100 communicates raw sensor data, including radar measurements, and/or navigation solutions derived by integrating the radar measurements with motion sensor data to any suitable remote processing resources, such as server 120. One suitable architecture of server 120 is depicted using high level schematic blocks in FIG. 1, and may include server processor 122 that is in communication with memory 124 over bus 126. As will be described in further detail below, server processor 122 may execute instructions stored in memory 124 that are represented as functional blocks, including feedback module 128, which is configured to assess map information using the radar measurements and integrated navigation solutions provided by device 100 to improve the map information, as discussed in further detail below. Server 120 includes a communications module 130 to exchange information with device 100, using any suitable protocol including those noted above. Device 100 and server 120 may communicate either directly or indirectly, such as through multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As noted, device 100 may derive the integrated navigation solutions and server 120 may use the radar measurements and integrated navigation solutions to provide feedback for the map information. However, any or all of the functions described as being performed may be performed by any number of discrete devices in communication with each other, or may be performed by device 100 itself in other suitable system architectures. Accordingly, it should be appreciated that any suitable division of processing resources may be employed whether within one device or among a plurality of devices. Further, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 102, server processor 122, a dedicated processor or any other processing resources of portable device 100, server 120 or other remote processing resources, or may be implemented using any desired combination of software, hardware and firmware.

Figure 2:
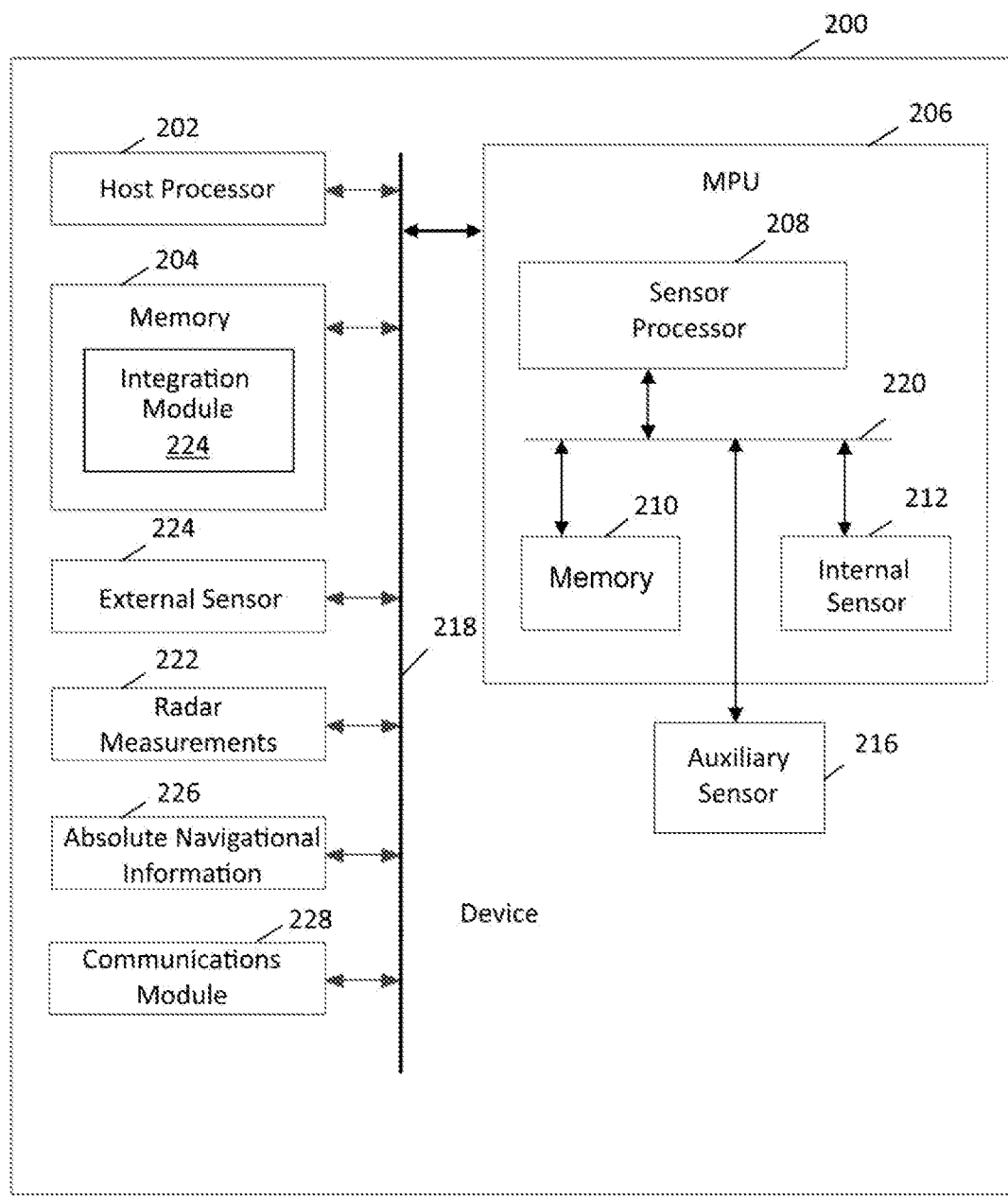
FIG. 2 is schematic diagram of another device architecture for providing a navigation solution by integrating radar measurements with motion sensor data according to an embodiment.

As another illustration of aspects of this disclosure, features of a different device architecture are depicted in FIG. 2 with high level schematic blocks in the context of device 200. Here, device 200 includes a host processor 202 and memory 204 similar to the above embodiment. Device 200 includes at least one sensor assembly for providing motion sensor data, as shown here in the form of integrated motion processing unit (MPU®) 206 or any other sensor processing unit (SPU), featuring sensor processor 208, memory 210 and internal sensor 212. Memory 210 may store algorithms, routines or other instructions for processing data output by internal sensor 212 and/or other sensors as described below using logic or controllers of sensor processor 208, as well as storing raw data and/or motion data output by internal sensor 212 or other sensors. Memory 210 may also be used for any of the functions associated with memory 204. Internal sensor 212 may be one or more sensors for measuring motion of device 200 in space as described above, including inertial sensors such as an accelerometer and a gyroscope, other motion sensors including a magnetometer, a pressure sensor or others may be used in addition. Exemplary details regarding suitable configurations of host processor 202 and MPU 206 may be found in, commonly owned U.S. Pat. No. 8,250,921, issued Aug. 28, 2012, and U.S. Pat. No. 8,952, 832, issued Feb. 10, 2015, which are hereby incorporated by reference in their entirety. Suitable implementations for MPU 206 in device 200 are available from InvenSense, Inc. of San Jose, Calif.

Optionally, device 200 may implement another sensor assembly in the form of external sensor 214, and may represent sensors, such as inertial motion sensors (i.e., accelerometer and/or a gyroscope), other motion sensors or other types of sensors as described above. In this context, "external" means a sensor that is not integrated with MPU 206 and may be remote or local to device 200. Also alternatively or in addition, MPU 206 may receive data from an auxiliary sensor 216 configured to measure one or more aspects about the environment surrounding device 200. This is optional and not required in all embodiments. For example, a pressure sensor and/or a magnetometer may be used to refine motion determinations made using internal sensor 212. In the embodiment shown, host processor 202, memory 204, MPU 206 and other components of device 200 may be coupled through bus 218, while sensor processor 208, memory 210, internal sensor 212 and/or auxiliary sensor 216 may be coupled though bus 220, either of which may be any suitable bus or interface as described above.

Again, the techniques of this disclosure involve integrating radar measurements with the motion sensor data provided by internal sensor 212 (or other sensors) to provide the navigation solution, and correspondingly, device 200 obtains radar measurements 222 from an integrated radar system. Alternatively, the radar system may be associated with device 200, may be part of the platform or may be implemented in any other desired manner. Also similar to the above embodiment, algorithms, routines or other instructions for processing sensor data, including integrating radar measurements 222, may be employed by integration module 224 to perform this any of the operations associated with the techniques of this disclosure. In one aspect, an integrated navigation solution based on the motion sensor data and the radar measurements may be output by integration module 224. Determining the navigation solution may involve sensor fusion or similar operations performed by MPU processor 208. In other embodiments, some, or all, of the processing and calculation may be performed by the host processor 202, which may be using the host memory 204, or any combination of other processing resources. Further, the operations associated with providing feedback for improvement of map information using the techniques of this disclosure can be performed using host processor 202, can be performed remotely in a similar manner as server 120, or using any desired allocation of local and remote computing resources.

Optionally as described above, device 200 may have a source of absolute navigational information 226 and may include communications module 228 for any suitable purpose. Source of absolute navigational information 226 and/or communications module 228 may have any of the characteristics discussed above with regard to source of absolute navigational information 116 and communications module 118.

As with processor 102 and server processor 122, host processor 202 and/or sensor processor 208 may be one or more microprocessors, central processing units (CPUs), or other processors which run software programs for device 200 or for other applications related to the functionality of device 200. Embodiments of this disclosure may feature any desired division of processing between host processor 202, MPU 206 and other processing resources, as appropriate for the applications and/or hardware being employed. Further, remote processing resources similar to server 120 may also be employed to perform any or all of the operations associated with the techniques of this disclosure, including providing feedback for the map information.

As will be described, the techniques of this disclosure employ a source of map information for the environment surrounding the platform and device. In one aspect, sensors such as those integrated with the device within the platform continuously log real-time measurements. These measurements provide at least some level of description of the local environment surrounding the platform. A map is a representation of all the elements/objects in the real-world that might affect the measurements logged by the sensors. Maps in general can be either static or dynamic depending on whether static only or static and dynamic objects are represented in the map. Two well-known forms of maps include Location-based maps and a Feature-based maps.

In a location-based map, the map is represented as a set of objects in set m, where the $i^{th}$ object denoted by $m_i = m_{ix,iy,iz}$ in set m, is a 3D location in the map. Here, $m_{ix,iy,iz}$ is the Cartesian coordinates represented by the $i^{th}$ element. Each location-object can contain other attributes describing the object. A distinctive characteristic of location-based maps is that the list of objects in the set m are indexed by their location instead of any other attribute. The main advantage of location-based maps is that every location in the map is represented, hence, the map has a full description of empty and non-empty locations in the map. A well-known example of Location-based maps is an Occupancy Grid Map (OGM), where the real world is discretized into squares (in the case of 2D maps) or cubes (in the case of 3D maps). The objects in the OGM map are the locations of the center-point of the squares/cubes, where each location-object might have several attributes. For examples, one attribute could reflect whether the squares/cubes are occupied or empty (alternatively this attribute could reflect whether the squares/cubes are occupied, empty or unmapped), another attribute could contain the expected measurements vector of a specific sensor at the current location-object.

In a feature-based map, the map is represented as a set of objects in set m, where the $i^{th}$ object denoted by $m_i$ is a specific feature-object in the map. In other words, a feature-based map is a collection of objects that somehow represent certain features in the environment. These objects usually have several attributes including the location of the object. A distinctive characteristic of a feature-based map is that only selective locations of the environment are represented in m. Feature-based maps can either be sparse or dense depending on the number of feature-objects across the map. Moreover, the feature-objects can be uniformly distributed (or any other distribution) across different locations in a map, or feature-objects can be congested in specific locations. Finally, the uniqueness of each of the feature-object is another characteristic of a feature-map. These characteristics affect how useful the feature-map can be used for localization purposes. A feature-based map that consists of dense, unique and uniformly distributed feature-objects (across locations in a map) are generally favorable characteristics for localization systems.

Map information as used herein may also include radar signatures regarding objects in the environment. As will be appreciated, objects can have unique signatures with respect to the radar, and hence detected objects can be inferred or identified by comparing the radar signature to the object signature. Matches may allow the assumption that an object detected by the radar is the object that maximizes the correlation between the radar signature and a specific map object.

In the context of this disclosure, either the device or the platform also includes a radar sensor system, which provide radar measurements 112 or 222. Radars have numerous characteristics based on the signals used by the sensor, the covered area/volume by the radar, the accuracy and resolution of radar range/bearing, and the type of measurements logged by the sensor. Suitable characteristics and types of radar sensors are discussed in the following materials.

Most radar sensors radiate one of two types of RF signals; Pulse-based signal and a Frequency Modulated Continuous Wave (FMCW) signal. Pulse-based radars employ one carrier frequency denoted by $f_c$ and transmits this frequency in the form of repetitive pulses. This type of radar sensor switches between transmitting a pulse and then waiting for a short period. The radar uses the silence period to receive a reflection of the transmitted pulse (in case it is reflected by a target). By applying Fast Fourier Transform (FFT) to the repetitive pulses in the time-domain, it may be realized that the bandwidth of the signal is very large. The range and Doppler resolution of the pulse-based radar are proportional to the pulse-width and the carrier frequency of the radar respectively.

On the other hand, an FMCW signal is continuous in time and therefore, its bandwidth is limited. The FMCW signal is generated with the radar sensor by modulating the frequency at the Voltage Controlled Oscillator (VCO) linearly with time. This process is called sweeping. Moreover, the sweeping bandwidth denoted by $sw_{BD}$ is determined according to the band at which the radar operates. The sweeping time denoted by $sw_T$ is the time set for the VCO to linearly vary the frequency of the signal across $sw_{BD}$. An FMCW-based radar typically transmits and receives at the same time (simultaneous transmission and reception). Hence, the sensor does not stop transmission for it to receive a reflection from a target.

When it comes to which radar technology is better for techniques of this disclosure, each type has its advantages and disadvantages. Pulse-based radars do not require complex computations like FMCW-based radars. Moreover, there is no Doppler-range coupling like in the case of some modulation FMCW-based modulation scheme (a triangular sweep can help decouple both measurements efficiently). In addition, the accuracy of the FMCW-based radar depends on the linearity of the employed VCO. However, pulse-based radars leak power to adjacent bands, limiting the reuse of frequencies. This is a limitation of pulse-based radars because autonomous vehicles will be operating in the close vicinity, especially in urban areas. Since FMCW-based radars are continuous wave, there is no significant power leaking outside the band, therefore, frequency reuse is enabled and interference is limited. Another, drawback of pulse-based radars is that there is a transmitting time and a receiving time. In mission-critical scenarios, where the self-driving vehicle is driving at a high speed or when the vehicle is operating in dense urban environments, not being able to transmit and receive at the same time can result in high latency, which in turn, hinders real-time updates. Nevertheless, some manufacturers have commercialized pulse-based radars that provide simultaneous transmission and reception.

Another important characteristic of a radar system is the frequency operating band employed. There are several millimeter frequency bands used in radar sensors. Two prominent operating bands are the 24 GHz and the 77 GHz. The 24 GHz band lies in the Industrial, Scientific and Medical radio (ISM) band. The 24 GHz-based radars operate between 24.0 GHz to 24.25 GHz, which translates to a bandwidth of 250 MHz. On the other hand, the 77 GHz band offers a wide bandwidth of up to 4 GHz. The range accuracy and resolution of the radar increases as the available sweeping bandwidth increases. The range resolution reflects the ability of the radar to detect clustered/nearby targets. Moreover, a higher operating frequency results in a higher velocity accuracy and resolution. The 77 GHz-based radars operate at a higher bandwidth (providing 20× better range accuracy and resolution) and at a higher frequency (providing 3× better velocity accuracy and resolution) compared to the 24 GHz-based radars. Finally, the dimensions of the radar antenna are proportional to the operating frequency. The antenna of the 77 GHz radar is 3 times smaller than the 24 GHz antenna.

Regardless of the type of signals used by the radar or the operating band, the radar signal processing unit estimates the range and Doppler from the received reflections. The radar range at a specific azimuth and elevation angle can be denoted by $r_{\alpha,\beta}$, where $\alpha$ is the azimuth/bearing angle relative to the radar coordinates and $\beta$ is the elevation angle. Moreover, $f_{D_{\alpha,\beta}}$ denotes the Doppler frequency of the target at range $r_{\alpha,\beta}$. Moreover, the power of the signal reflected by the target at $(\alpha,\beta)$ can be denoted by $p_{R_{\alpha,\beta}}$. Radar derived measurements; $r_{\alpha,\beta}$, $f_{D_{\alpha,\beta}}$ and direct measurement; $p_{R_{\alpha,\beta}}$ are usually used by the radar higher level processing embedded software to derive more meaningful data. This layer of adaptive algorithms (knows as Constant False Alarm Rate (CFAR)) can detect target returns against a background of noise, clutter and interference. Moreover, by grouping range, Doppler and power measurements from adjacent cells, other layers of software might be able to estimate the centroid of all targets. Another useful derived information can be the estimated size of the target (this might require the processing of several scans). All this data can be used to derive a more accurate radar measurement model.

Other characteristics of a radar system are its range and beam-width. Radars can be categorized based on their range and Field of View (FOV). This leads to three types of radar; Long Range Radar (LRR), Medium Range Radar (MRR) and Short-Range Radar (SRR). An LRR at the 76-77 GHz band with 600 MHz of bandwidth, usually covers a distance range of 10-250 m, a distance resolution and accuracy of 0.5 m and 0.1 m respectively, a velocity resolution and accuracy of 0.6 m/s and 0.1 m/s respectively, an angular accuracy of 0.1 degrees, a 3 dB beam-width in azimuth of +/−15 degrees and a 3 dB beam-width in elevation of +/−5 degrees. An MRR at the 77-81 GHz band with 600 MHz of bandwidth, usually covers a distance range of 1-100 m, a distance resolution and accuracy of 0.5 m and 0.1 m respectively, a velocity resolution and accuracy of 0.6 m/s and 0.1 m/s respectively, an angular accuracy of 0.5 degrees, a 3 dB beam-width in azimuth of +/−40 degrees and a 3 dB beam-width in elevation of +/−5 degrees. Finally, an SRR at the 77-81 GHz band with 4 GHz of bandwidth, usually covers a distance range of 0.15-30 m, a distance resolution and accuracy of 0.1 m and 0.02 m respectively, a velocity resolution and accuracy of 0.6 m/s and 0.1 m/s respectively, an angular accuracy of 1 degrees, a 3 dB beam-width in azimuth of +/−80 degrees and a 3 dB beam-width in elevation of +/−10 degrees.

Generally, increasing the bandwidth of the radar for the same (or close to) operating frequency can result in better range accuracy and resolution. However, a bandwidth of 4 GHz is used only in the case of SRR. Even though better range accuracy and resolution for the LRR is desirable, the distance range of the radar is proportional to the transmitted power. If higher transmitting power is used by a radar operating at a wide bandwidth, this can lead to very high out-of-band interference. Therefore, a compromise may be reached between the distance range of the radar (how far can its signal reach) and its range and accuracy. Moreover, the velocity resolution and accuracy of different types of radar are substantially equivalent because they are all operating around the same frequency band.

Finally, the Field of View (FOV) of the radar is equivalent to the beam-width in azimuth and elevation. The radars discussed so far have a wider FOV in azimuth compared to elevation, but some manufacturers are also working on 3D radars that have wider azimuth and elevation beam-width. Moreover, some automotive radars can scan medium range and long range simultaneously.

Integrating the radar measurements with the motion sensor data according to the techniques of this disclosure involves modeling the radar measurements. One approach is to model measurements based on radar characteristics and environmental factors (i.e., exact model). This approach is not always effective because the derived model could be a function of unknown states or reaching an accurate model could consume a lot of resources. Accordingly, another approach is to use a probabilistic approach to build the measurement model using nonlinear techniques. Suitable measurement models include a radar range-based model based at least in part on a probability distribution of measured ranges using an estimated state of the platform and the map information, a radar nearest object likelihood model based at least in part on a probability distribution of distance to an object detected using the radar measurements, an estimated state of the platform and a nearest object identification from the map information, a radar map matching model based at least in part on a probability distribution derived by correlating a global map derived from the map information to a local map generated using the radar measurement and an estimated state of the platform, and a radar closed-form model based at least in part on a relation between an estimated state of the platform and ranges to objects from the map information derived from the radar measurements.

Figure 3:
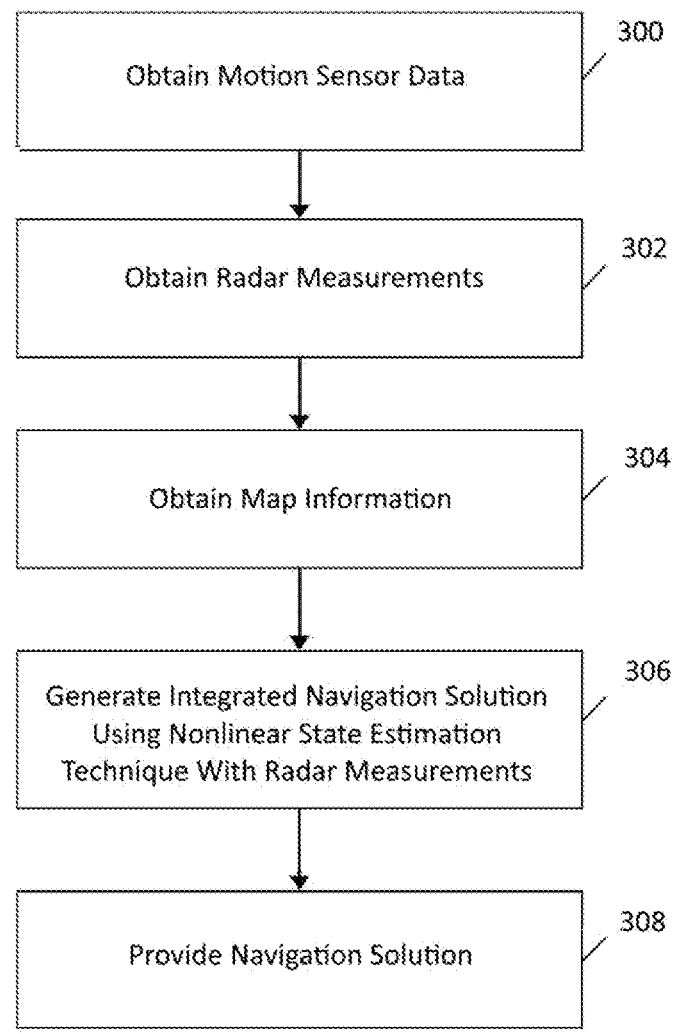
FIG. 3 is a flowchart showing a routine for providing an integrated navigation solution with radar measurements and motion sensor data according to an embodiment.

To help illustrate the techniques of this disclosure, FIG. 3 depicts an exemplary routine for integrating radar measurements and motion sensor data to provide a navigation solution for a device within a moving platform. Although described in the context of device 100 as depicted in FIG. 1, other architectures, including the one shown in FIG. 2, may be used as desired with the appropriate modifications. Beginning with 300, motion sensor data may be obtained for device 100, such as from sensor assembly 106. In one aspect, the sensor data may be inertial sensor data from one or more accelerometers, gyroscopes or other suitable motion and/or orientation detection sensors. In 302, radar measurements 112 are obtained for the platform. In 304, map information as described above may also be obtained for an environment encompassing the platform. In 306, an integrated navigation solution is generated based at least in part on the obtained motion sensor data. The integrated navigation solution may be generated using a nonlinear state estimation technique. Further, the nonlinear state estimation technique is configured to use a nonlinear measurement model as noted above. Consequently, the integration navigation solution from the updated nonlinear state estimation technique may then be provided in 308.

Figure 4:
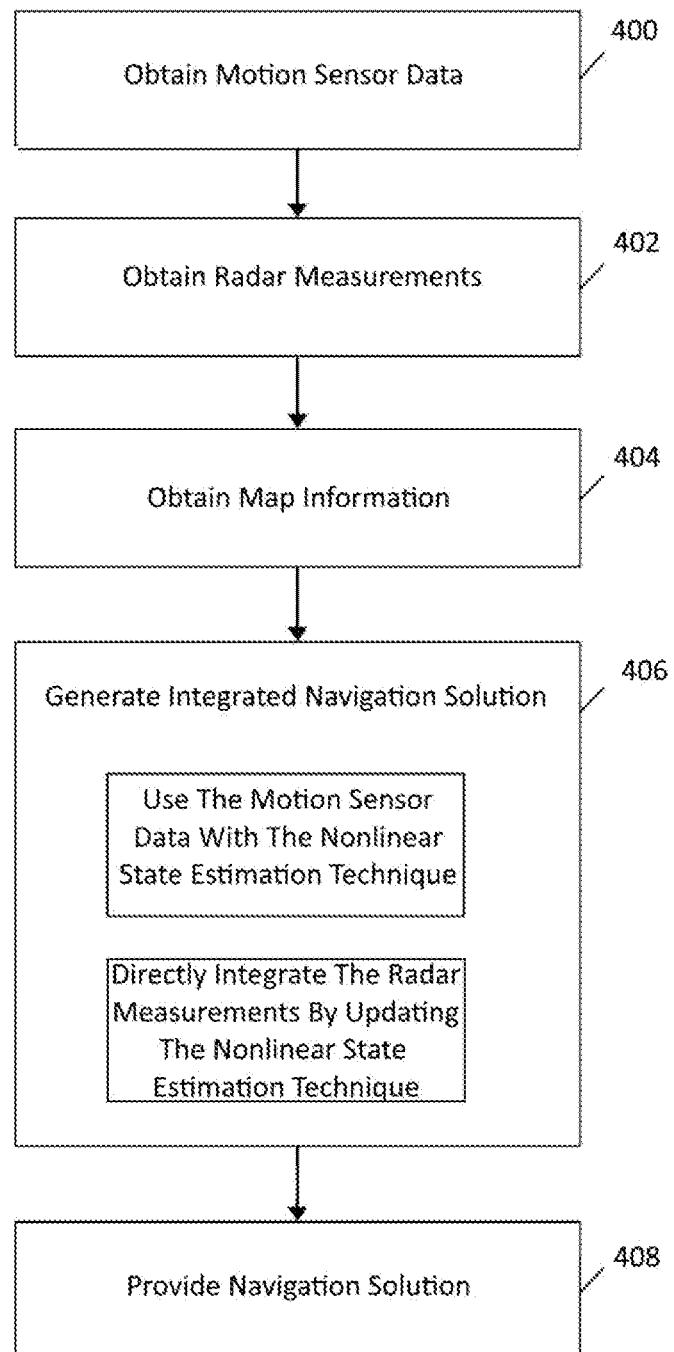
FIG. 4 is a flowchart showing further details of a routine for providing an integrated navigation solution with radar measurements and motion sensor data according to an embodiment.

As a further example, FIG. 4 shows a routine for integrating radar measurements and motion sensor data to provide a navigation solution for a device within a moving platform that includes obtaining motion sensor data in 400, obtaining radar measurements 402, obtaining map information 404, generating an integrated navigation solution 406 and consequently providing the integrated navigation solution 408. In particular, the aspect of generating the integrated navigation solution of 406 may involve the indicated operations. In one aspect, generating the integrated navigation solution includes using the obtained motion sensor data in the nonlinear state estimation technique and then integrating the radar measurements directly by updating the nonlinear state estimation technique using the nonlinear measurement models.

A state estimation technique, such as a filter, includes a prediction phase and an update phase (which may also be termed a measurement update phase). A state estimation technique also uses a system model and measurement model(s) based on what measurements are used. The system model is used in the prediction phase, and the measurement model(s) is/are used in the update phase. As such, the state estimation techniques of this disclosure use a measurement model for the radar measurements so that the obtained radar measurements directly update the state estimation technique. Further, according to this disclosure, the state estimation technique is nonlinear. The nonlinear models do not suffer from approximation or linearization and can enhance the navigation solution of the device when using very low-cost low-end inertial sensors. The radar measurement model(s) is/are nonlinear. The system models can be linear or nonlinear. The system model may be a linear or nonlinear error-state system model. The system model may be a total-state system model, in most cases total-state system models are nonlinear. In the total-state approach, the state estimation or filtering technique is estimating the state of the device itself (such as position, velocity, and attitude of the device), the system model or the state transition model used is the motion model itself, which in case of inertial navigation is a nonlinear model, this model is a total-state model since the estimated state is the state of the navigation device itself. In the error-state approach, the motion model is used externally in what is called inertial mechanization, which is a nonlinear model as mentioned earlier, the output of this model is the navigation states of the module, such as position, velocity, and attitude. The state estimation or filtering technique estimates the errors in the navigation states obtained by the mechanization, so the estimated state vector by this state estimation or filtering technique is for the error states, and the system model is an error-state system model which transitions the previous error-state to the current error-state. The mechanization output is corrected for these estimated errors to provide the corrected navigation states, such as corrected position, velocity and attitude. The estimated error-state is about a nominal value which is the mechanization output, the mechanization can operate either unaided in an open loop mode, or can receive feedback from the corrected states, this case is called closed-loop mode. Conventional, linear state estimation techniques, such as a Kalman filter (KF) or an extended Kalman filter (EKF) require linearized approximations. By avoiding the need for approximation by linearization, the nonlinear techniques of this disclosure can provide a more accurate navigation solution for the device.

As such, suitable methods involve obtaining motion sensor data from a sensor assembly of the device, obtaining radar measurements for the platform, obtaining map information for an environment encompassing the platform, generating an integrated navigation solution based at least in part on the obtained motion sensor data using a nonlinear state estimation technique, wherein the nonlinear state estimation technique comprises using a nonlinear measurement model for radar measurements. Generating the integrated navigation solution may include using the obtained motion sensor data in the nonlinear state estimation technique and integrating the radar measurements directly by updating the nonlinear state estimation technique using the nonlinear measurement models and the map information. The integrated navigation solution may then be provided.

Notably, the measurement model may be at least one of: i) a radar range-based model based at least in part on a probability distribution of measured ranges using an estimated state of the platform and the map information; ii) a radar nearest object likelihood model based at least in part on a probability distribution of distance to an object detected using the radar measurements, an estimated state of the platform and a nearest object identification from the map information; iii) a radar map matching model based at least in part on a probability distribution derived by correlating a global map derived from the map information to a local map generated using the radar measurement and an estimated state of the platform; and iv) a radar closed-form model based at least in part on a relation between an estimated state of the platform and ranges to objects from the map information derived from the radar measurements. When the measurement model is a radar range-based model, range may be estimated by casting rays between the platform and objects from the map information. When the measurement model is a radar closed-form model, the method may further involve classifying a detected object using the radar measurements and determining a first correspondence between the classified object and an object from the map information and/or classifying a detected object using data from a supplemental sensor, determining a first correspondence between the classified object and the radar measurements, and determining a second correspondence between the classified object and an object from the map information.

As desired, the nonlinear measurement model may include models for radar-related errors comprising any one or any combination of environmental errors, sensor-based errors and dynamic errors. Further, the nonlinear measurement model may be configured to handle errors in the map information.

Depending on the embodiment, the nonlinear state estimation technique may be at least one of: i) an error-state system model; ii) a total-state system model, wherein the integrated navigation solution is output directly by the total-state model; and iii) a system model receiving input from an additional state estimation technique that integrates the motion sensor data. When the method uses an error-state system model, providing the integrated navigation solution may involve correcting an inertial mechanization output with the updated nonlinear state estimation technique. When the system model is a system model receiving input from an additional state estimation technique, the additional state estimation technique may integrate any one or any combination of: i) inertial sensor data; ii) odometer or means for obtaining platform speed data; iii) pressure sensor data; iv) magnetometer data; and v) absolute navigational information. The system model of the nonlinear state estimation technique may include a motion sensor error model. Further, the nonlinear state estimation technique may use at least one of: i) a Particle Filter (PF); ii) a PF wherein the PF comprises a Sampling/Importance Resampling (SIR) PF; and iii) a PF, wherein the PF comprises a Mixture PF.

As noted above, the map information used in the techniques of this disclosure may be provided in different forms and have different characteristics. However, one aspect that applies to all types of map information is that an existing map may have errors or other problems, or may present opportunities for improvement. For example, some of the original measurements used to build the map might have been erroneous or have omissions. Moreover, even if accurate when built, all maps are subject to subsequent changes, such as when a new road is constructed or an existing road is closed or rerouted. Similarly, buildings and other objects that can be detected and identified using radar measurements can be added, removed or altered. As one illustration, road signs are particularly suitable for use in map information for use with radar measurements due to their high reflectance. In addition to such relatively permanent changes, there may also be temporary changes due to construction or other conditions, and again, road signs are a useful example. Temporary changes that existed when the map was prepared will become errors when they revert, while on the other hand, changes made after the map is built, even if only temporary, do not reflect current conditions and also represent errors. Further, some or all existing map information may be subject to improvement. As one non-limiting illustration, the radar measurements obtained in the techniques of this disclosure, in conjunction with the integrated navigation solutions that provide accurate positioning represent an opportunity to improve the resolution and/or accuracy of associated map information. Resolution is dependent on the characteristics of the radar system or other perception system used to build the map and refers to the smallest change in the map that is detectable by the radar or other perception sensor, while accuracy refers to the overall uncertainty of the determination of objects/cells in the map because of error in radar measurement or other perception system used to build the map. As will be appreciated, the radar measurements allow for mapping depths of relative distances to points on surfaces of the objects in the map, allowing for greater resolution and/or accuracy in the information that can in turn better aid navigational solutions. Other characteristics of radar measurements also can help provide increased resolution and/or accuracy as noted elsewhere.

Correspondingly, the techniques of this disclosure employ the radar measurements as well as the navigation solutions that integrate those measurements to provide feedback for map information. At a minimum, such feedback can be provided by assessing the map information to identify errors and changes or to identify areas of improvement. The accurate navigation solutions provided by integrating the radar measurements, along with information regarding detected objects provided by the radar measurements themselves (e.g., range, bearing, elevation, and/or Doppler) enable an effective comparison with objects indicated by the map information. It will be appreciated that assessing the map information with the radar measurements and integrated navigation solutions can therefore identify discrepancies, such as the errors or changes noted above. Once identified, errors or changes can be marked, labeled or indicated in any other suitable manner. Importantly, the recognition of these problems alone represents a significant benefit of the techniques of this disclosure given that understanding the limitations of the current map information helps minimize incorrect determinations that might otherwise be made.

It should also be appreciated that the characteristics of the radar measurements and the integrated navigation solutions facilitate the identification of problems such as errors and changes in the map information by being able to discern between errors in the measurements or navigation solutions and actual problems. In particular, the radar measurements and navigation solutions represent a series of epochs during which the same object and its relationship to the position and attitude of the device is detected. Errors in the radar measurements will not be consistent over multiple successive frames and epochs of time so they will not keep indicating a wrong problem all the time. Conversely, problems in the map information persist and are unchanged over the epochs such that the consistent identification of a problem in the map information over time increases the confidence of where the problem lies. Put simply, if successive radar measurements and integrated navigation solutions indicate the same problem in the map information consistently over multiple successive epochs, it may be assumed that a true problem has been identified with a confidence that increases over time. Beneficially, the characteristics of radar measurements contribute positively to this assessment. For example, radar measurements have a relatively wide FOV which increase the number of objects for which information can be obtained during a given epoch. Because of the wide field of view, even if some radar measurements had errors, there will be other radar measurements that match both the prediction for the navigation solution and the correct portions of maps consistently over successive epochs. This wealth of information increases the opportunities for determining whether the consistency noted above is present, so that actual problems in the map information can be identified more accurately.

As an illustration, the prediction phase from the state estimation technique is used alongside the radar measurements. Since the radar measurements are not in the same domain as the map information, the integrated navigational solution output by the prediction phase and its position information can be used with the radar measurements to allow comparison between detected objects and objects in the map information. For example, the radar measurements may indicate an object that is missing from the map information, such as a new building or road sign. Conversely, an object in the map information may be missing from the radar measurements, such as when a building has been demolished. Further, a correspondence may be established between a detected object and an object in the map information to determine whether it is the same object. A sufficient correspondence may be determined using any suitable characteristic or combination of characteristics regarding the object, including for example position, orientation, dimension and reflected power.

Following the above described identification, corrections, improvements and/or updates to the map information may be made as desired. Non-limiting illustrations of these operations involving providing feedback for map information include correcting errors that occurred when the map was built, updating the map to make it more current if changes have occurred subsequent to the map building and other improvements to the map, such as increasing the resolution and/or accuracy. Notably, the tight (or ultra-tight/ deep) integration of radar measurements with the motion sensor data may enable creating or updating a map at higher resolutions and/or accuracy than existing in the current map information. For example, radar measurements and the associated navigation solutions may be obtained for all or an area of a given environment from a single device over multiple iterations, from multiple devices using crowd sourcing techniques or any combination of these to increase the resolution and/or accuracy of the map information or provide other improvement. Another example of improvement is the recognition of dynamic conditions within the map information with changes that can be predicted based on regularly occurring patterns, such as lanes that change direction or exits/entrances that open/close based on traffic demand.

Figure 5:
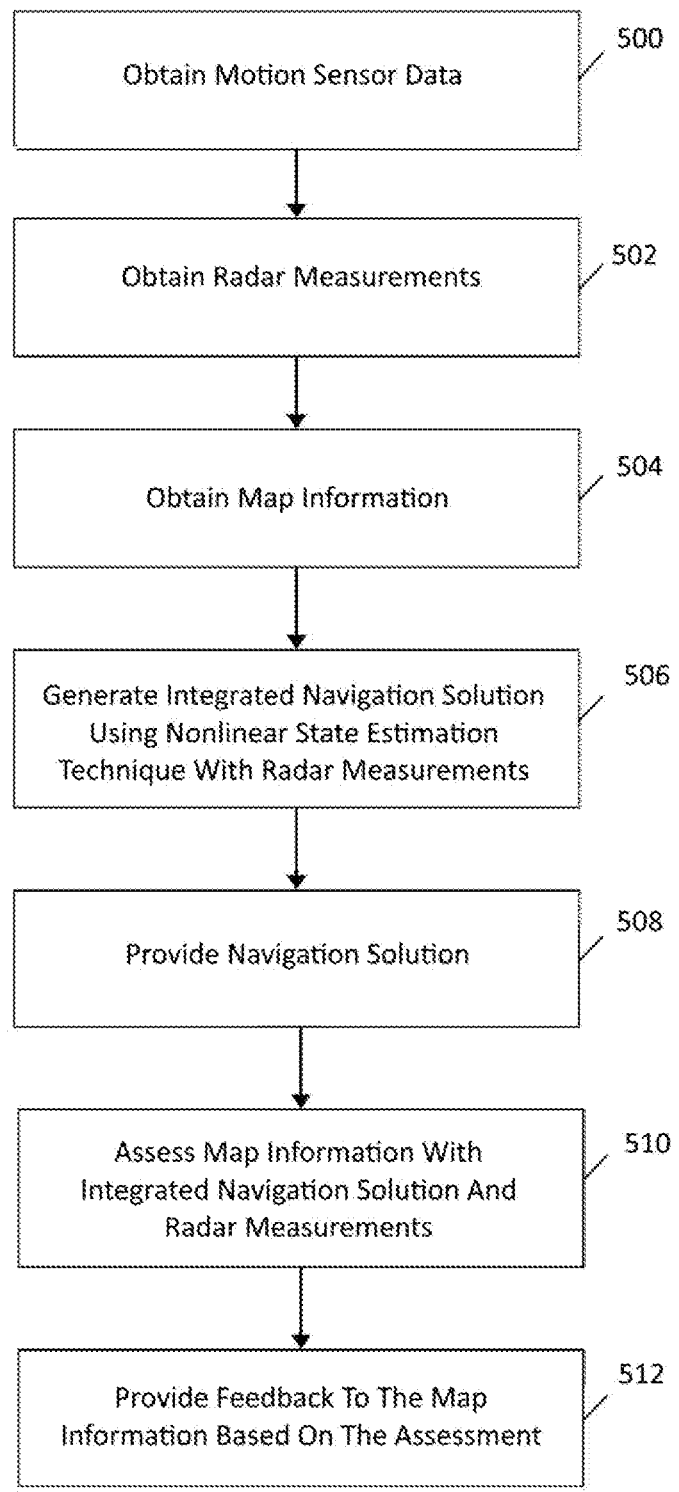
FIG. 5 is a flowchart showing a routine for providing feedback for map information using an integrated navigation solution with radar measurements and motion sensor data according to an embodiment.

To help illustrate the techniques of this disclosure, FIG. 5 depicts an exemplary routine for integrating radar measurements and motion sensor data to provide a navigation solution for a device within a moving platform. Although described in the context of device 100 as depicted in FIG. 1, other architectures, including the one shown in FIG. 2, may be used as desired with the appropriate modifications. Beginning with 500, motion sensor data may be obtained for device 100, such as from sensor assembly 106. In one aspect, the sensor data may be inertial sensor data from one or more accelerometers, gyroscopes or other suitable motion and/or orientation detection sensors. In 502, radar measurements 112 are obtained for the platform. In 504, map information as described above may also be obtained for an environment encompassing the platform. In 506, an integrated navigation solution is generated based at least in part on the obtained motion sensor data. The integrated navigation solution may be generated using a nonlinear state estimation technique, configured to use a nonlinear measurement model as noted above, with the integration navigation solution from the updated nonlinear state estimation technique provided in 508. Correspondingly, the map information may be assessed in 510, based at least in part on the integrated navigation solution and the radar measurements, so that feedback can be provided to the map information in 512, such as by any of the techniques of this disclosure.

Figure 6:
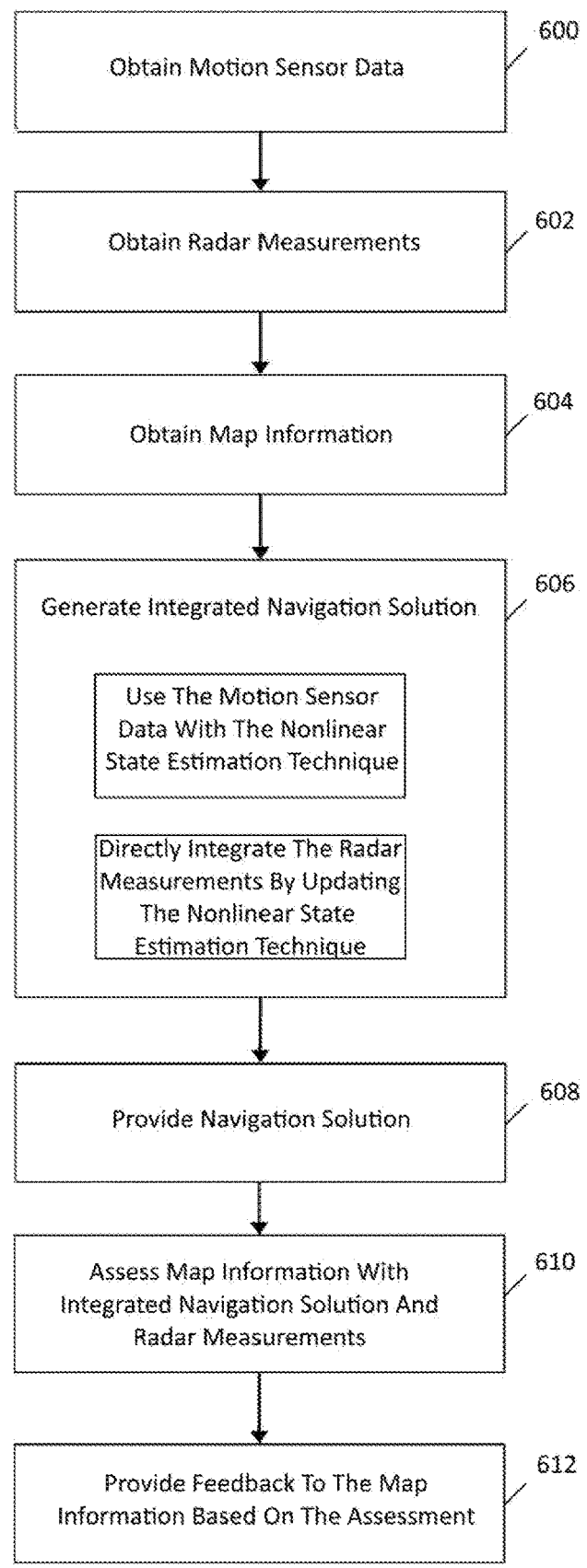
FIG. 6 is a flowchart showing further details of a routine for providing feedback for map information using an integrated navigation solution with radar measurements and motion sensor data according to an embodiment.

As a further example, FIG. 6 shows a routine for integrating radar measurements and motion sensor data to provide a navigation solution for a device within a moving platform that includes obtaining motion sensor data in 600, obtaining radar measurements 602, obtaining map information 604, generating an integrated navigation solution 606 and consequently providing the integrated navigation solution 608. In particular, the aspect of generating the integrated navigation solution of 606 may involve the indicated operations. In one aspect, generating the integrated navigation solution includes using the obtained motion sensor data in the nonlinear state estimation technique and then integrating the radar measurements directly by updating the nonlinear state estimation technique using the nonlinear measurement models. Then, the map information may be assessed in 610, based at least in part on the integrated navigation solution and the radar measurements, so that feedback can be provided to the map information in 612, such as by any of the techniques of this disclosure.

Figure 7:
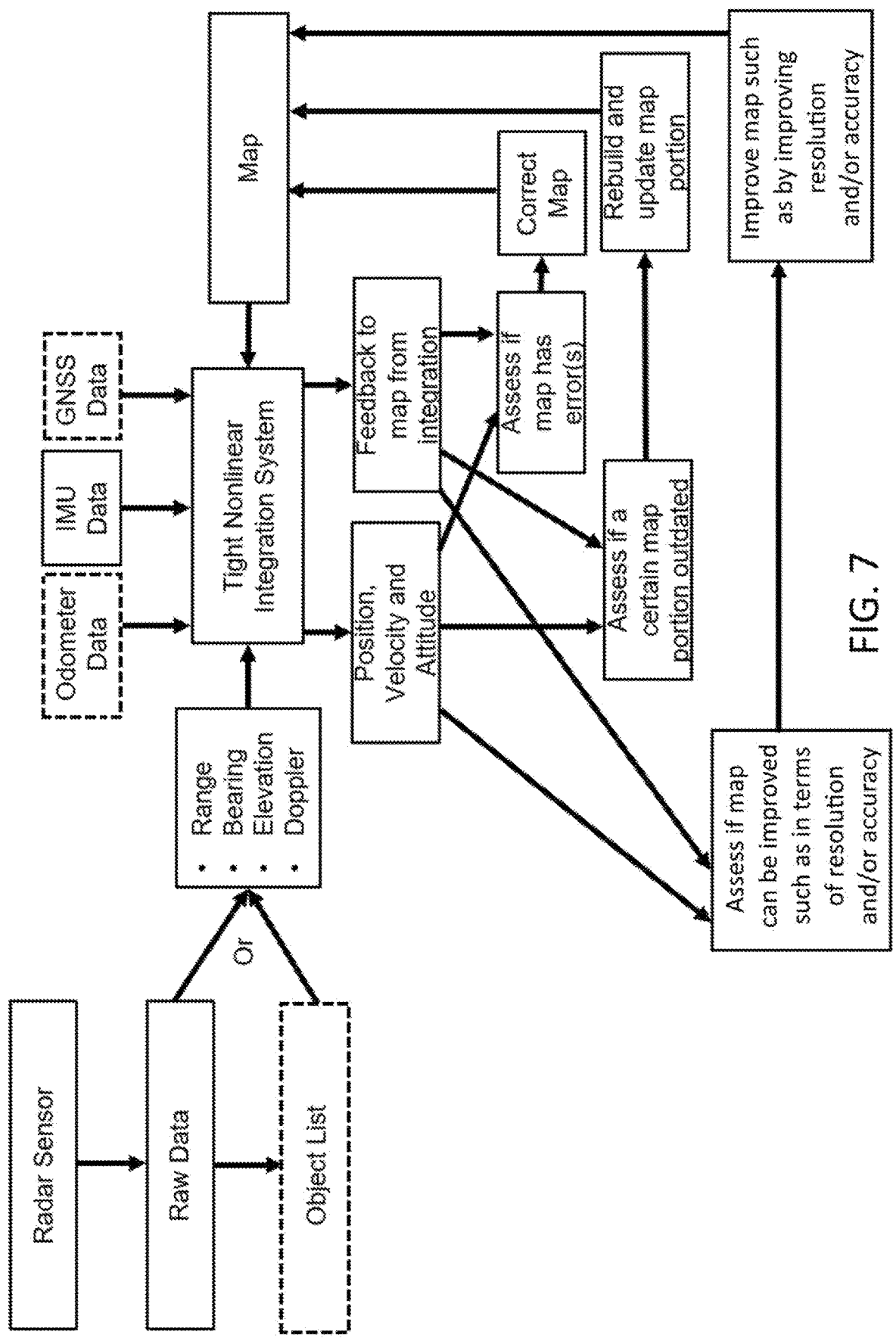
FIG. 7 is a schematic representation of providing feedback for map information using an integrated navigation solution with radar measurements and motion sensor data according to an embodiment.

As a further illustration of aspects of the disclosure, FIG. 7 is a schematic representation of one suitable system architecture for providing feedback to improve map information. As shown, the nonlinear integration system, such as integration modules 114 or 224, employs a state estimation technique or filter as discussed above and receives input from the radar system in the form of the raw data of the measurements 112 or 222 themselves. Optionally, the radar system may provide a list of detected objects that may be used. The integration system also receives motion sensor data as an input from an IMU, such as sensor assembly 106 or MPU 206. Also optionally, the integration system may have absolute navigational information 116 or 226, such as GNSS for example, or other sensors as an input if available, such as any of the sensors noted above, an odometer or another-vehicle based sensor. The integration system also receives the current map information as shown.

Following the techniques of this disclosure, with detailed examples provided below, the integration system outputs navigation solutions including the position, attitude and (optionally) velocity. Consequently, the integration system can also provide feedback for map information based on the radar measurements themselves in addition to the integrated navigation solutions. In a first option, an assessment is made to determine if there are errors in the map information. In addition to the feedback of identifying the error, a map correction may be determined and applied to the map if desired. In a second option, an assessment determines whether a change has occurred, making at least an area or portion of the map outdated. Again, the change may be identified or, once identified, the relevant area updated and applied to the map. When a sufficient change has been identified, it may be desirable to rebuild either the affected portion or the entire map. As a third option, an assessment may be made to determine if an improvement to the map may be made. For example, the radar measurements and associated integrated navigation solutions may represent information at a higher resolution and/or accuracy than the current map, such that the map may be improved by increasing its resolution and/or accuracy.

Accordingly, the techniques of this disclosure involve providing feedback for map information using an integrated navigation solution for a device within a moving platform by obtaining motion sensor data from a sensor assembly of the device, obtaining radar measurements for the platform, obtaining map information for an environment encompassing the platform, generating an integrated navigation solution based at least in part on the obtained motion sensor data using a nonlinear state estimation technique, wherein the nonlinear state estimation technique comprises using a nonlinear measurement model for radar measurements, assessing the map information based at least in part on the integrated navigation solution and radar measurements and providing feedback for the map information based on the assessment. Generating the integrated navigation solution may include using the obtained motion sensor data in the nonlinear state estimation technique and integrating the radar measurements directly by updating the nonlinear state estimation technique using the nonlinear measurement models and the map information.

In one aspect, the measurement model is at least one of a) a radar range-based model based at least in part on a probability distribution of measured ranges using an estimated state of the platform and the map information, b) a radar nearest object likelihood model based at least in part on a probability distribution of distance to an object detected using the radar measurements, an estimated state of the platform and a nearest object identification from the map information, c) a radar map matching model based at least in part on a probability distribution derived by correlating a global map derived from the map information to a local map generated using the radar measurement and an estimated state of the platform and d) a radar closed-form model based at least in part on a relation between an estimated state of the platform and ranges to objects from the map information derived from the radar measurements. The nonlinear measurement model may also include models for radar-related errors comprising any one or any combination of environmental errors, sensor-based errors and dynamic errors.

In one aspect, the nonlinear state estimation technique is at least one of a) an error-state system model, b) a total-state system model, wherein the integrated navigation solution is output directly by the total-state model and c) a system model receiving input from an additional state estimation technique that integrates the motion sensor data.

In one aspect, assessing the map information is performed over successive epochs of radar measurements.

In one aspect, assessing the map information compares objects detected using the radar measurements with objects from the map information. The comparing may be at least one of a) determining that at least one object detected using the radar measurements is missing from the map information, b) determining that at least one object from the map information is not detected by the radar measurements, c) determining a correspondence between an object detected using the radar measurements and an object from the map information, d) determining a correspondence between an object detected using the radar measurements and an object from the map information, wherein the radar measurements indicate a difference in a characteristic of the corresponding objects and e) determining a correspondence between an object detected using the radar measurements and an object from the map information, wherein the radar measurements indicate a difference in a characteristic of the corresponding objects and the characteristic is at least one of position, orientation, dimension and reflected power.

In one aspect, assessing the map information is at least one of a) identifying at least one error in the map information, b) determining that at least one change has occurred in the map information and c) determining an improvement for the map information. Correspondingly, providing feedback for the map information may be at least one of a) wherein assessing the map information comprises identifying at least one error in the map information, marking at least one identified error or determined change in the map information, b) wherein assessing the map information comprises identifying at least one error in the map information, correcting at least one identified error in the map information, c) wherein assessing the map information comprises determining that at least one change has occurred in the map information, marking at least one determined change in the map information, d) wherein assessing the map information comprises determining that at least one change has occurred in the map information, updating at least one determined change in the map information, e) rebuilding at least a portion of the map information for an area, f) wherein assessing the map information comprises determining an improvement for the map information, increasing resolution of at least a portion of the map information, g) wherein assessing the map information comprises determining an improvement for the map information, increasing resolution of at least a portion of the map information, wherein the increased resolution is based at least in part on the integrated navigation solution, h) wherein assessing the map information comprises determining an improvement for the map information, increasing accuracy of at least a portion of the map information, and j) wherein assessing the map information comprises determining an improvement for the map information, increasing accuracy of at least a portion of the map information, wherein the increased resolution is based at least in part on the integrated navigation solution.

In one aspect, assessing the map information may distinguish between errors in the radar measurements and errors in the map information.

In one aspect, a source of absolute navigational information may be integrated with the integrated navigation solution.

In one aspect, the integrated navigation solution may also integrate information from at least one of a) an odometer or means for obtaining platform speed, b) a pressure sensor and c) a magnetometer.

Likewise, a system for providing feedback for map information using an integrated navigation solution for a device within a moving platform may have a device having a sensor assembly configured to output motion sensor data, a radar configured to output radar measurements for the platform and at least one processor, coupled to receive the motion sensor data, the radar measurements, and map information for an environment encompassing the platform. The processor may be operative to generate an integrated navigation solution based at least in part on the motion sensor data using a nonlinear state estimation technique, assess the map information based at least in part on the integrated navigation solution and radar measurements and provide feedback for the map information based at least in part on the assessment. The nonlinear state estimation technique may use a nonlinear measurement model for radar measurements, such that the at least one processor generates the integrated navigation solution by using the obtained motion sensor data in the nonlinear state estimation technique and integrating the radar measurements directly by updating the nonlinear state estimation technique using the nonlinear measurement models and the map information.

In one aspect, the measurement model is at least one of a) a radar range-based model based at least in part on a probability distribution of measured ranges using an estimated state of the platform and the map information, b) a radar nearest object likelihood model based at least in part on a probability distribution of distance to an object detected using the radar measurements, an estimated state of the platform and a nearest object identification from the map information, c) a radar map matching model based at least in part on a probability distribution derived by correlating a global map derived from the map information to a local map generated using the radar measurement and an estimated state of the platform and d) a radar closed-form model based at least in part on a relation between an estimated state of the platform and ranges to objects from the map information derived from the radar measurements.

In one aspect, the nonlinear state estimation technique is at least one of a) an error-state system model, b) a total-state system model, wherein the integrated navigation solution is output directly by the total-state model and c) a system model receiving input from an additional state estimation technique that integrates the motion sensor data.

In one aspect, the at least one processor is operative to provide feedback for the map information by performing at least one of a) correcting at least one identified error in the map information, b) updating at least one determined change in the map information and c) improving the map information.

In one aspect, the sensor assembly may include an accelerometer and a gyroscope. For example, the sensor assembly can be implemented as a Micro Electro Mechanical System (MEMS).

In one aspect, the system also has a source of absolute navigational information.

In one aspect, the system has any one or any combination of an odometer or means for obtaining platform speed, a pressure sensor and a magnetometer.

EXAMPLES

It is contemplated that the present methods and systems may be used for any application involving providing feedback for map information using radar measurements and the navigation solutions derived by integrating the radar measurements with motion sensor data. Without any limitation to the foregoing, the present disclosure is further described by way of the following examples detailing illustrative examples of integrating radar measurements with motion sensor data.

1 Radar Measurement Model Embodiments

As noted above, a nonlinear measurement model of the radar measurements is used to directly update the nonlinear state estimation technique used to provide the integrated navigation solution. As one example, information from radar sensors adapted for vehicular use may have a data rate of 20 Hz. Each scan consists of a set of measurements covering the FOV of the radar. Generally, a full scan is tagged as one measurement vector. A measurement vector may be denoted by the set $\rho_t = \{\rho_t^0, \rho_t^1, \ldots, \rho_t^{K-1}\}$, where K is the total number of measurements per scan. In a 2D radar, measurement is usually along the azimuth angle. Therefore, $\rho_t^k$ represents the measured range at $k^{th}$ bearing angle. In a 3D radar, the measurement vector can be represented by the 2D list $\rho_t = \{\rho_t^{(\alpha_0, \beta_0)}, \ldots, \rho_t^{(\alpha_{N-1}, \beta_{M-1})}\}$, where N and M represent the number of scanning bins in the azimuth and elevation angle respectively. The Markov property is assumed to be valid for the measurements. In other words, there is no dependence between the error in measurements over time. The aim is to model the probability of a measurement denoted by $\rho_t$, given the knowledge of the map m, and the state of the vehicle at time t denoted by $x_t$. It may be assumed that the measurements at different angles from one scan are independent (the error in distance range at one angle is independent of the error in distance range at another angle). The following discussion is in the context of 2D radar, however, the 3D radar model can be extended from the 2D radar measurement model easily. The probability of the measurement vector $\rho_t$, given m and $x_t$, may be represented as $p(\rho_t|x_t,m) = \Pi_{k=0}^{K-1} p(\rho_t^k|x_t,m)$.

Using the independence assumption between measurements, the probability of a scan is represented as the multiplication between the probability of each individual measurement given the knowledge of the map and the state of the vehicle. These assumptions are used to simplify the modeling process. Four different radar measurement models using different modeling techniques are detailed below, but other models may be employed as desired.

1.1 Range-Based Model Embodiments

One suitable radar measurement model is a range-based measurement model. Based on the true range between a static radar sensor and a static target, the model describes the error distribution of the actual radar measurements for this range (given that multiple measurements of the same static target are available), as expressed by the probability density function: $p(\rho_t^k|x_t,m)$. In other words, given the knowledge of the map (whether feature-based or location map) and an estimate of the state of the platform, what is the probability distribution of the measured range. Here, k refers to the $k^{th}$ range at a certain (azimuth/elevation) angle. Deriving $p(\rho_t|x_t,m)$ from $p(\rho_t^k|x_t,m)$ is a matter of multiplication of probabilities of all ranges.

1.1.1 Ray Casting Embodiments

For range-based modeling, the true range to the target in the map (this may include a feature-based map, location-based map or both) may be computed based on the estimate of the state of the platform. This is done by using ray casting algorithms, denoting the true range by $\rho_t^{k,true}$. In wireless communications, ray casting is used to estimate the signal strength of the RF signal due to Line-Of-Sight (LOS) and multiple Non-Line-Of-Sight (NLOS) components of the signal. These methods use geometry to determine where the signal will reflect and they also use path-loss models to model the fading of the RF signal with space. This technique is suitable from estimating the range to a target in the map if the underlying radar sensor was using reflected signal-strength based ranging. Both pulse-based and FMCW-based radars use some sort of time difference to estimate the range between the vehicle and the target, so modeling the attenuation of the range with distance is not required.

To estimate the range between the vehicle and the target in a map, a ray (this ray does not have to propagate with respect to RF path-loss models) may be simulated to move in a straight line until it either hits a target in the map or exceeds a certain distance (defined by radar maximum range). The ray's direction in 3D is based on the reported state of the platform (which may include position and orientation and may also be termed "pose") and the bearing of this specific measurement. A conversion between radar coordinate frame and the vehicle coordinate frame may establish the starting point and direction of the ray relative to the state of the vehicle. Using this technique, the true range $\rho_t^{k,true}$ from the radar sensor to the target may be found. It is important to note that a target must be in the map for this operation to make sense. If the target is not in the map (i.e., another moving vehicle or a pedestrian), it should be detected before the ray casting algorithm is called. To do so, the Doppler (or velocity of the target) is used to filter out moving targets. For now, only radar measurements to static targets will be considered by the ray casting model.

One of the main issues with ray casting algorithms is the time complexity of the algorithms. To speed up the ray casting algorithm, only ray casting at a delta bearing around the measurement may be explored. This delta is used to account for the error in the Direction of Arrival (DOA) estimation of the radar sensor. Hence, instead of ray casting hypothetical rays from all possible radar bearing, the exploration is limited to ray casting around the bearings of the measured range. Moreover, the coverage of the ray casting algorithm will be a function of the range of the radar sensor (i.e., LRR, MRR or SRR) and the uncertainty in the estimated vehicle's pose. The higher the uncertainty is, the larger is the ray casting coverage range. Limiting the number of ray casting iterations (by limiting ray casting exploration within a bearing delta from the estimated DOA) and limiting the coverage of the ray casting algorithm would help reduce the time-complexity of the algorithm.

Figure 8:
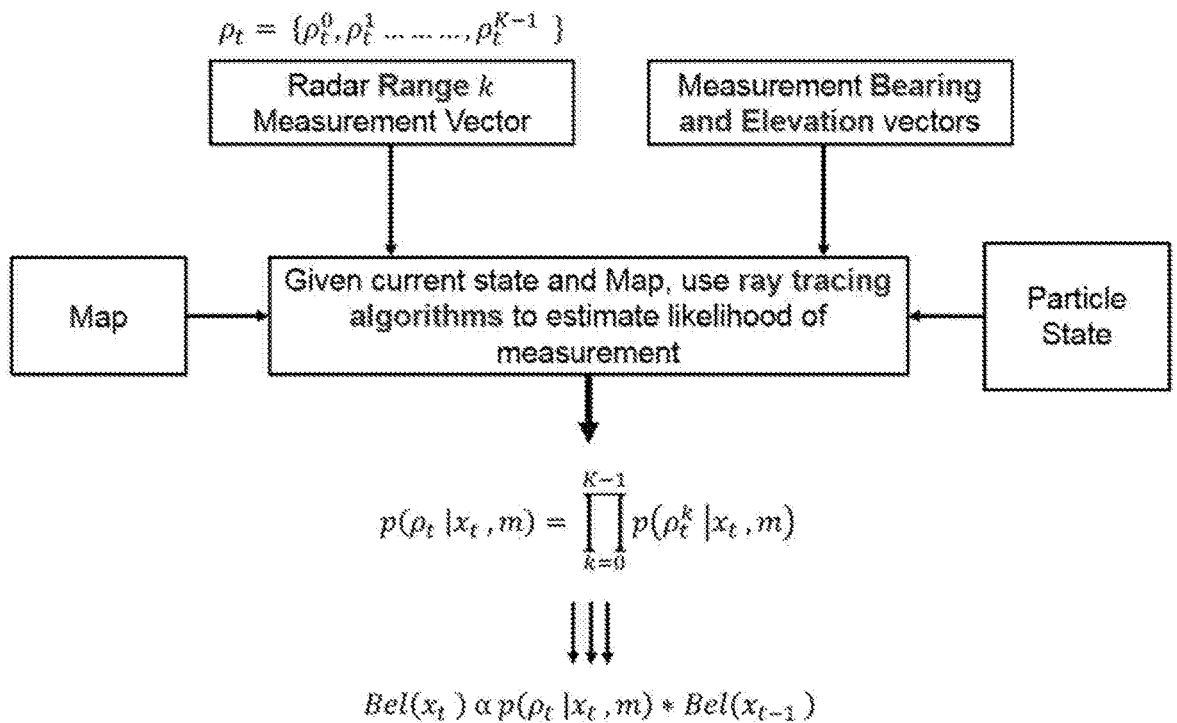
FIG. 8 is a schematic representation of use of a radar range-based measurement model according to an embodiment.

A schematic depiction of an architecture using a range-based radar model to estimate the probability of the current state of the platform is shown in FIG. 8. Here, particle state refers to the state of the vehicle at time t. The input to the system is the radar range measurements along with their respective bearing and elevation angles. Given the state of the platform and the map, ray casting may be used to estimate $p(\rho_t|x_t,m)$. Finally, to estimate the probability of the current state denoted by $Bel(x_t)$, the belief in the current state is proportional to the probability of the measurement given the state $x_t$ and the map, times the prior probability of the previous state denoted by $Bel(x_{t-1})$.

1.1.2 Error Modeling Embodiments

Given the estimation of the true range to the target using an initial estimate of the platform's state a given map, various factors may affect the measurement error of the radar sensor. The measurement model of this disclosure is configured to handle errors, such as by being adaptive to help compensate for these errors or otherwise intelligently cope with the existence of errors so that the measurement model can still provide good results and operate despite the errors. The sources of range errors may be separated into three categories; the first source of errors is environmental factors affecting the radar measurements, the second source of errors are inherent in the sensor itself and the third source of errors is related to the dynamics of the vehicle relative to the target.

Regardless of the source of error, the measurement error due to a specific error source may be modeled as a Gaussian distribution with mean $\rho_t^{k,true}$ and standard deviation denoted by $\sigma_{err}$. Also, the distribution between the minimum range denoted by $\rho_{min}$ and the maximum range of the radar denoted by $\rho_{max}$ (i.e., a radar sensor can measure within a limited range) may be limited. Hence, the probability distribution of the radar measurement model can be modeled as for the range $[\rho_{min},\rho_{max}]$ and zero otherwise, where the numerator refers to a normally distributed random variable with mean $\rho_t^{k,true}$ and standard deviation $\sigma_{err}$:

$$p(\rho_t | x_t, m) = \frac{e^{-\frac{1}{2}\frac{(\rho_t^k - \rho_t^{k,true})^2}{\sigma_{err}^2}} / \sqrt{2\pi\sigma_{err}^2}}{\frac{1}{\sqrt{2\pi\sigma_{err}^2}} * \int_{\rho_{min}}^{\rho_{max}} \left( e^{-\frac{1}{2}\frac{(\rho_t^k - \rho_t^{k,true})^2}{\sigma_{err}^2}} \right) d\rho_t^k}$$

The denominator represents the normalizing factor of the probability density function $p(\rho_t|x_t,m)$, which is computed by integrating the numerator (i.e., the normal distribution) within the radar's coverage range $[\rho_{min},\rho_{max}]$, leaving the only missing parameter to define $\sigma_{err}$.

Different sources of error have different effects on the variance of the measurement model. Three sources of error identified above may be considered when building a probabilistic measurement model. The first source of errors is environmental factors including weather conditions like rain, fog and snow. Another important environmental factor is the effect of reflectors on the signal. The radar antenna radiates a signal at a specific bearing, this signal is affected by the Power Delay (PDP) Profile of the channel. Depending on the PDP, the reflected signal might be the sum of LOS to the target and NLOS to the target. Due to multipath effect, the accuracy of radar measurements might be negatively affected. The second source of error is inherent in the design of the radar sensor itself. For example, in FMCW-based radars, the VCO is used to sweep the available bandwidth to generate the transmitted signal. Ideally, this sweep should result in a linear relation between frequency and sweep-time. However, the measured target range is affected by variance errors due to the FMCW radar sweep non-linearity. This error can be modeled using $\sigma_{err}$. Similarly, different radar technologies like pulse-based sensors might have other inherent design issues that lead to variance in range estimation and can easily be integrated in the model. The final source of error is related to the dynamics of the radar sensor relative to a static or dynamic target. Generally, these errors reflect the effect of position, speed and direction of motion of the target on the range estimation accuracy. For example, some radars have better range estimation accuracy for targets at 0 degrees and lower accuracy for targets at higher azimuth angles (relative to the radar center-point). Moreover, the range estimation accuracy might also be affected by the speed of the vehicle. Specifically, some radars have better range estimation at low Doppler frequency shifts between the radar and the target and lower range accuracy at high Doppler frequency shifts. Hence, these errors can also be modeled using the standard deviation of our adaptive model. It is also worth noting that the speed of the target relative to the radar sensor has the same effect on the bearing estimation.

Figure 9:
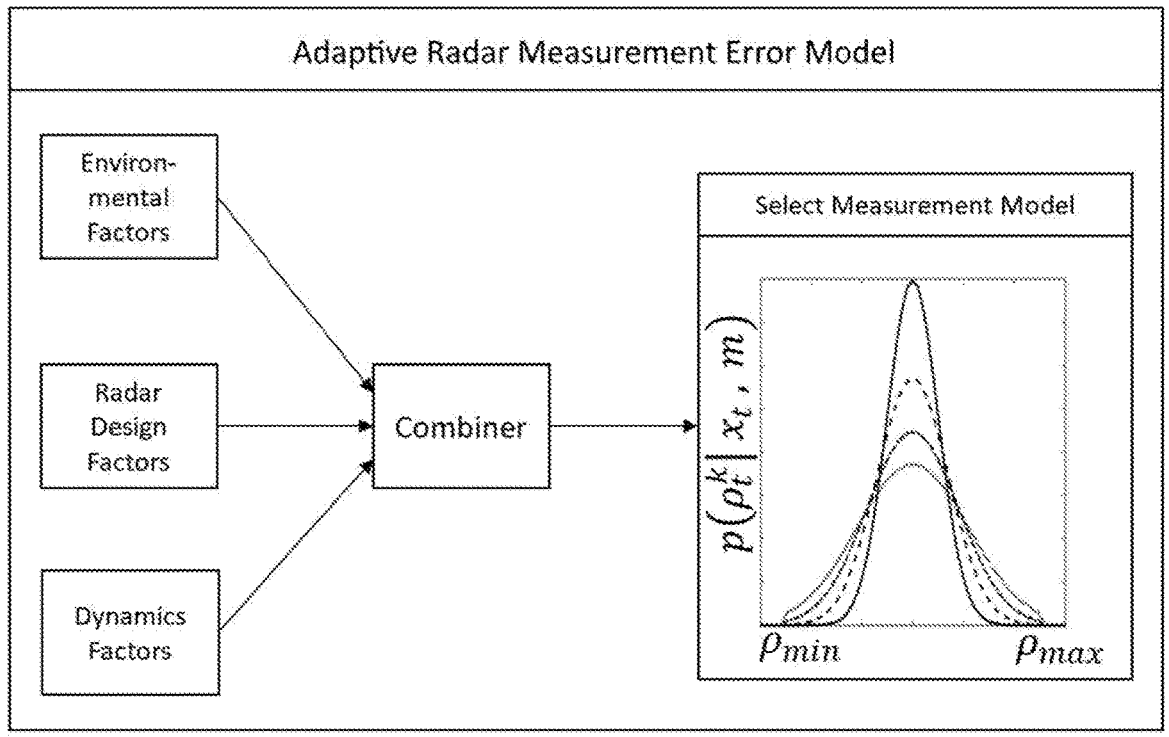
FIG. 9 is a schematic representation of an adaptive radar measurement error model according to an embodiment.

Taking the above factors into consideration, one suitable Adaptive Measurement Model (AMM) is schematically depicted in FIG. 9. As shown, each block on the right-hand side represents the three different factors that might affect the variance of the measurement model, namely; Environmental factors, Radar Design factors and (platform) Dynamics factors. For example, using an FMCW with a sweep non-linearity affecting the range estimation has a variance of $\sigma_{non-lin}^2$. As an example, in raining environmental conditions, an error would be introduced to the range measurement denoted by $\sigma_{rain}^2$. These variances are sent to the Combiner as indicated, with the assumption that both errors are independent random variables. Hence, the measured range can be represented as $\rho_t^k = \rho_t^{k,true} + err_{non-lin} + err_{rain}$, where $err_{non-lin} \sim N(\mu_{non-lin}, \sigma_{non-lin}^2)$ and $err_{rain} \sim N(\mu_{rain}, \sigma_{rain}^2)$. Correspondingly, the distribution of the resulting measurement model can be represented as:

$$\rho_t^k \sim N(\mu_{non-lin} + \mu_{rain}, \sigma_{non-lin}^2 + \sigma_{rain}^2)$$

To generalize, for E number of independent sources of error, the probability distribution of radar measurement is given by $\rho_t^k \sim N(\Sigma_{e=0}^{E-1}\mu_i, \Sigma_{e=0}^{E-1}\sigma_i^2)$, with the Combiner block estimating the resulting mean and variance of the measurement model based on the availability of error sources.

1.1.3 Parameter Estimation Embodiments

Notably, building the AMM model may involve identifying the mean and variance of each source of error. Once these parameters are estimated, an approximate PDF for the current measurement may be built. To so do, either a field expert's intuitions or design experiments may be used to collect data depending on the source of error and then attempt to find the best normal distribution that would fit the collected data. Once the fittest distribution is found, the mean and variance of the error source under investigation may be extracted. This mean and variance can then be saved for us to use when the same conditions road conditions apply.

1.2 Nearest Object Likelihood Model Embodiments

Another suitable radar measurement model is a nearest object likelihood (NOL) measurement model that features reduced computational complexity as compared to the ray casting for each possible state used in the range-based measurement model. Under this approach, the radar sensor position is first converted from the local frame to the global frame. Assuming the radar is positioned at $(x_{rad}^l, y_{rad}^l, z_{rad}^l)$ relative to the platform's local frame, and the current state of the platform in the global frame is denoted by $(x_t, y_t, z_t)$, then the position of the radar sensor in the global frame can be represented by $$\begin{bmatrix} x_{rad,t} \\ y_{rad,t} \\ z_{rad,t} \end{bmatrix} = \begin{bmatrix} x_t \\ y_t \\ z_t \end{bmatrix} + R_l^g * \begin{bmatrix} x_{rad}^l \\ y_{rad}^l \\ z_{rad}^l \end{bmatrix}.$$

The rotational matrix $R_l^g$ is the rotation from local to the global frame represented by $$R_l^g = \begin{bmatrix} \cos(\varphi)\cos(\psi) + \sin(\varphi)\sin(\theta)\sin(\psi) & \sin(\varphi)\cos(\theta) & \cos(\varphi)\sin(\theta) - \sin(\varphi)\sin(\theta)\cos(\psi) \\ -\sin(\varphi)\cos(\psi) + \cos(\varphi)\sin(\theta)\sin(\psi) & \cos(\varphi)\cos(\theta) & -\sin(\varphi)\sin(\theta) - \cos(\varphi)\sin(\theta)\cos(\psi) \\ -\cos(\theta)\sin(\psi) & \sin(\theta) & \cos(\theta)\cos(\psi) \end{bmatrix}$$

with the current roll, pitch and azimuth angles denoted by $\psi$, $\theta$ and $\varphi$ respectively.

The radar position in the global frame may be denoted $(x_{rad,t}, y_{rad,t}, z_{rad,t})$, which can be correlated to a position in the map information. The next step is to project the position of the radar in the global frame based on the current measurement $\rho_t^k$. By doing so, the position of the object that was detected by the radar resulting in the current measurement is estimated. Assuming that the radar measurement $\rho_t^k$ is measured at an azimuth and elevation angle of $\phi_{rad,t}^k$ and $\theta_{rad,t}^k$ respectively, the 3D projection of the measurement vector $\rho_t^k$ in the map can be represented by $$\begin{bmatrix} x_{rad,t}^k \\ y_{rad,t}^k \\ z_{rad,t}^k \end{bmatrix} = \begin{bmatrix} x_{rad,t} \\ y_{rad,t} \\ z_{rad,t} \end{bmatrix} + R_l^g * \begin{bmatrix} \rho_t^k * \cos(\theta_{rad,t}^k)\cos(\phi_{rad,t}^k) \\ \rho_t^k * \cos(\theta_{rad,t}^k)\sin(\phi_{rad,t}^k) \\ \rho_t^k * \sin(\theta_{rad,t}^k) \end{bmatrix}$$

Then, the nearest object in the map to the projected position denoted by $(x_{rad,t}^k, y_{rad,t}^k, z_{rad,t}^k)$ may be searched. Here, it is assumed that the likelihood $p(\rho_t^k|x_t, m)$ is equal to a Gaussian distribution with zero mean and variance $\sigma_{near}^2$ representing the error in Euclidian distance between the projected position and the nearest object in the map. Hence, the probability of a set of measurements given the state of the vehicle and a map, can be represented as $p(\rho_t|x_t, m) \propto \Pi_{k=0}^{K-1} p(D=dist^k)$, where $D \sim N(0, \sigma_{near}^2)$ and $dist^k$ is the distance between the projected position of measurement k and the nearest object in the map.

Figure 10:
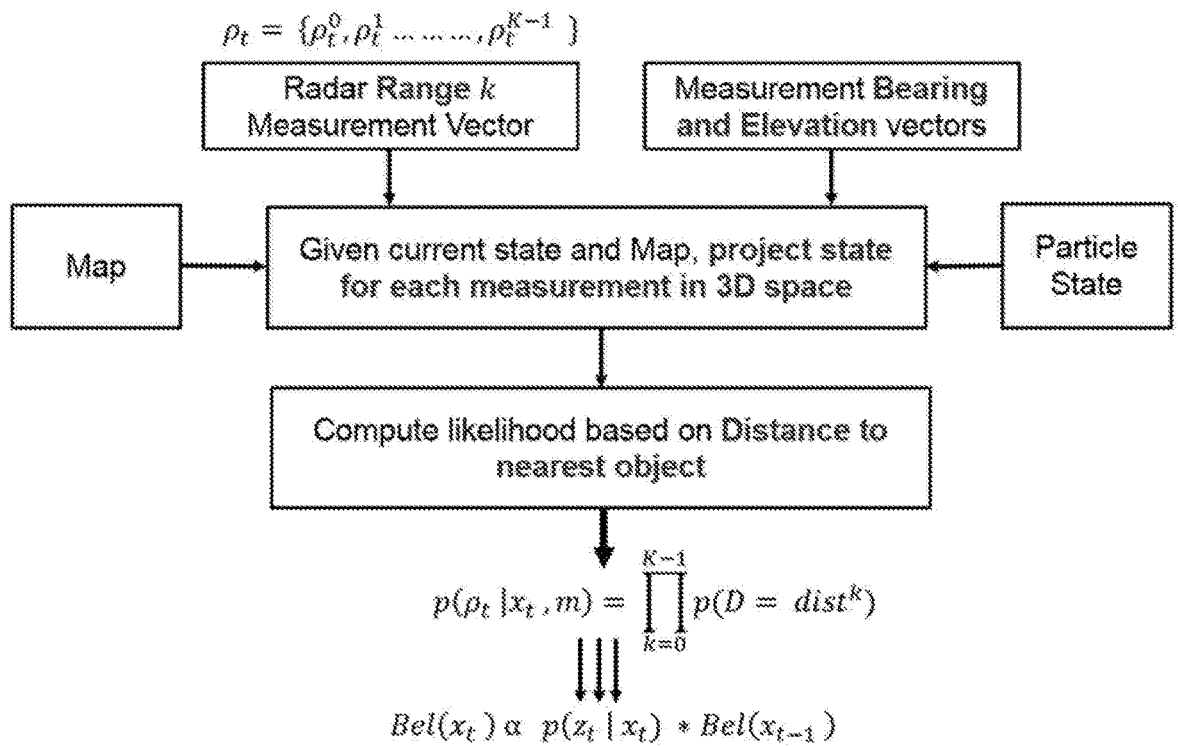
FIG. 10 is a schematic representation of use of a radar nearest object likelihood measurement model according to an embodiment.

One suitable architecture for estimating the probability of a platform state based on a radar NOL measurement model is schematically depicted in FIG. 10 to estimate belief in the current state of the vehicle. Here, particle state refers to the pose of the vehicle at time t. The input to the system is the radar-range measurements along with their respective bearing and elevation angles. Given the state of the vehicle and the map, the vehicle's pose is projected in 3D space for each measurement. Based on the distance to the nearest objects from each projection, $p(\rho_t|x_t, m)$ is estimated. The probability of the current state denoted by $Bel(x_t)$ is correspondingly proportional to the probability of the measurement given the state $x_t$ and the map, times the prior probability of the previous state denoted by $Bel(x_{t-1})$. As will be appreciated, the error compensation techniques discussed above for a range-based measurement model, such as those discussed in Section 1.1.2, may also be applied to the NOL measurement model.

1.3 Map Matching-Based Model Embodiments

Yet another suitable radar measurement model is a map matching model that features the capability of considering objects that are not detected by the radar system by matching between a local map and a global map when assessing the likelihood of a scan given knowledge of the platform state and the map. The local map is defined as a map created based on radar measurements. The global map can either be a feature-based or location-based map as discussed above. As one example, assume a grid-map of the environment encompassing the platform is denoted by $m^{gl}$ and the measurement $z_t$ is converted into a local grid-map denoted by $m^{loc}$. The local map must be defined in the global coordinate frame using the rotational matrix $R_l^g$. The representation of what is in the grid cells of both the global and local map may reflect whether an object exists in this cell (Occupancy Grid Map (OGM)) or the cells may contain the strength of the reflected signal from the current cell to the radar receiver.

Assuming a 3D map and a 3D radar, the center of a grid cell in the global and local map can be denoted by $m_{x,y,z}^{gl}$ and $m_{x,y,z}^{loc}$ respectively. The linear correlation can be used to indicate the likelihood of the current local map matching the global map, given the current state of the platform. By denoting $\overline{m}^{gl}$ to the mean of the relevant section of the global map by $\overline{m}^{gl}$, the mean of the local map by $\overline{m}^{loc}$, and the standard deviation of the global and local map as $\sigma_{m^{gl}}$ and $\sigma_{m^{loc}}$, respectively, the correlation coefficient between the local and global map is then represented by:

$$p(m^{loc}|x_t, m) = Corr_{m^{gl}, m^{loc}}$$
$$= \sum_{x,y,z} ((m_{x,y,z}^{loc} - \overline{m}^{loc}) *$$
$$(m_{x,y,z}^{gl} - \overline{m}^{gl}))/(\sigma_{m^{gl}} * \sigma_{m^{loc}})$$

The correlation coefficient ranges between +1 and −1, but all negative correlations may be assumed to be equal to 0 when only the existence of positive correlation or no correlation at all is relevant, allowing the likelihood of the measurement to be represented as $p(\rho_t|x_t, m) \propto \max(Corr_{m^{gl}, m^{loc}}, 0)$.

Figure 11:
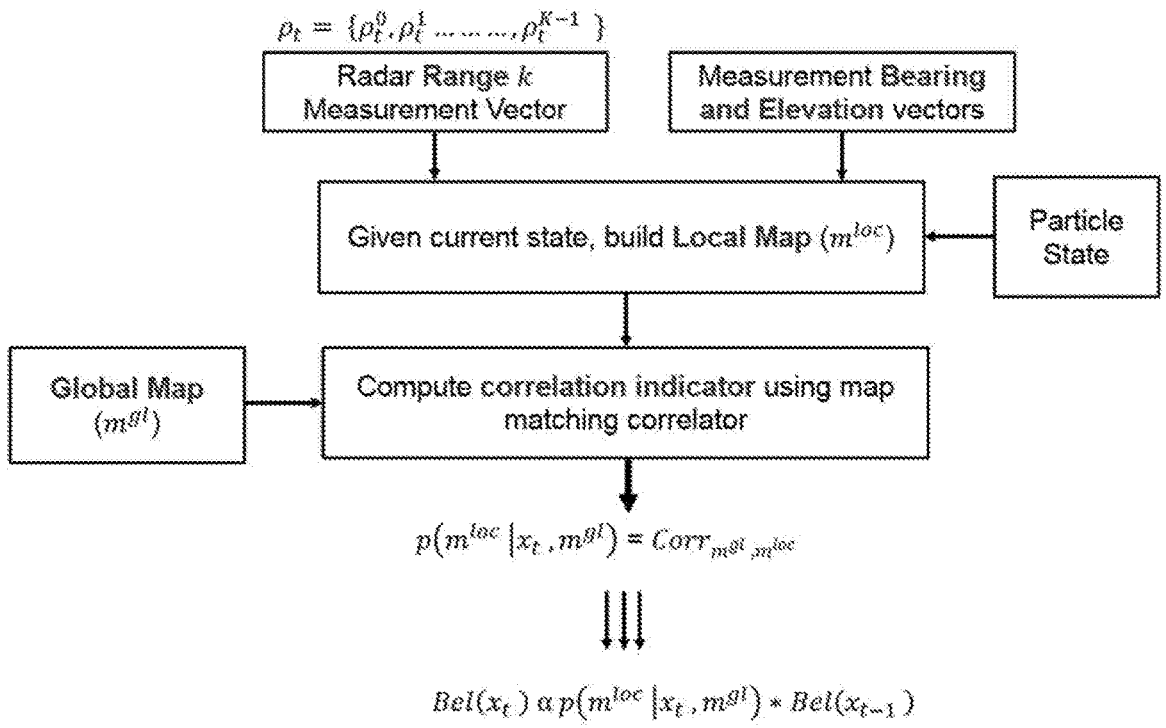
FIG. 11 is a schematic representation of use of a radar map matching measurement model according to an embodiment.

A schematic illustration of one possible architecture for a radar map matching measurement model that may be used to estimate belief in the current state of the platform is depicted in FIG. 11. Here, particle state refers to the state of the platform at time t. The input to the system is the radar range measurements along with their respective bearing and elevation angles. Given the state of the vehicle and the radar measurements, a local map (e.g., a 2D or 3D occupancy grid) denoted by $m^{loc}$ may be built. Then, using the same representation of the global map denoted by $m^{gl}$, the correlation between the global and the local map may be computed and used as an indicator for $p(\rho_t|x_t, m)$. Finally, to estimate the probability of the current state denoted by $Bel(x_t)$, the belief in the current state is proportional to the probability of the measurement given the state $x_t$ and the map, times the prior probability of the previous state denoted by Bel($x_{t-1}$). As will be appreciated, the error compensation techniques discussed above for a range-based measurement model, such as those discussed in Section 1.1.2, may also be applied to the map matching measurement model.

1.4 Closed-Form Model Embodiments

A further example of radar measurement models that may be used in the techniques of this disclosure are stochastic, closed-form models that relate the radar measured ranges to the true ranges as a function of the states of the platform as compared to the probabilistic approaches discussed above. The closed-form radar measurement models do not include a deterministic relation between the measured range and the true range. To provide a relation between the state of the platform and the measured ranges, a first correspondence/association is determined by assuming that objects detected by the radar are identified uniquely as objects in the map. Given an estimate of the range to an object and knowing which object is detected by the radar in the map provides the correspondence. There are several approaches to solving the correspondence problem, for example, if the map was represented as a feature-map containing a set of objects, every object has a unique signature with respect to the radar, and hence the object detected can be inferred by comparing the radar signature to the object signature, and if they match, then it may be assumed the object detected by the radar is the object that maximizes the correlation between the radar signature and a specific map object. If signatures from several objects leads to the same (or close to) correlation vector, the search area can be limited to a smaller cone centered around the reported azimuth and elevation angle of the radar. Other approaches to solving the correspondence problem include using other visual sensors like cameras to aid in classifying the type of object (i.e., speed limit road sign versus a traffic sign) detected by the radar and thus limiting the search to objects of the same kind and in the platform's vicinity. As will be appreciated, the error compensation techniques discussed above for a range-based measurement model, such as those discussed in Section 1.1.2, may also be applied to the closed form measurement models.

Assuming that a single radar measurement can be represented by $m_t^k = \{\rho_t^k, \phi_{rad,t}^k, \theta_{rad,t}^k\}$, where $\rho_t^k$ is the measured range to an object (with known correspondence) in the map, positioned in the global frame at $\{x_{obj}^k, y_{obj}^k, z_{obj}^k\}$, and $\phi_{rad,t}^k$ and $\theta_{rad,t}^k$ are the azimuth and elevation angles of the main lobe relative to the radar's centerline, the global position of the radar sensor can be represented as:

$$\begin{bmatrix} x_{rad,t} \\ y_{rad,t} \\ z_{rad,t} \end{bmatrix} = \begin{bmatrix} x_t \\ y_t \\ z_t \end{bmatrix} + R_l^g * \begin{bmatrix} x_{rad}^l \\ y_{rad}^l \\ z_{rad}^l \end{bmatrix}$$

The relationship between the measurement denoted by $m_t^k$ and the states of the vehicle can be expressed by the following set of equations:

$$\rho_t^k = \rho_t^{k,true} + \eta_{z_{rad}} = \sqrt{(x_{obj}^k - x_{rad,t})^2 + (y_{obj}^k - y_{rad,t})^2 + (z_{obj}^k - z_{rad,t})^2} + \eta_{z_{rad}}$$

$$\phi_{rad,t}^k = \tan^{-1}((y_{obj}^k - y_{rad,t})/(x_{obj}^k - x_{rad,t})) - \phi_t + \eta_{\phi_{rad}}$$

$$\theta_{rad,t}^k = \tan^{-1}((z_{obj}^k - z_{rad,t})/\sqrt{(x_{obj}^k - x_{rad,t})^2 + (y_{obj}^k - y_{rad,t})^2}) - \theta_t + \eta_{\theta_{rad}}$$

In this representation, $\eta_{z_{rad}} \sim N(0, \sigma_{z_{rad}}^2)$, $\eta_{\phi_{rad}} \sim N(0, \sigma_{\phi_{rad}}^2)$ and $\eta_{\theta_{rad}} \sim N(0, \sigma_{\theta_{rad}}^2)$ are zero-centered Gaussian random variables modeling the error in the measured range, the error in the estimated azimuth angle and the error in the estimated elevation angle respectively. Moreover, $\rho_t^{k,true}$ is the error free range to the detected object and $\phi_t$, $\theta_t$ angles are the azimuth and pitch of the vehicle at time t.

Figure 12:
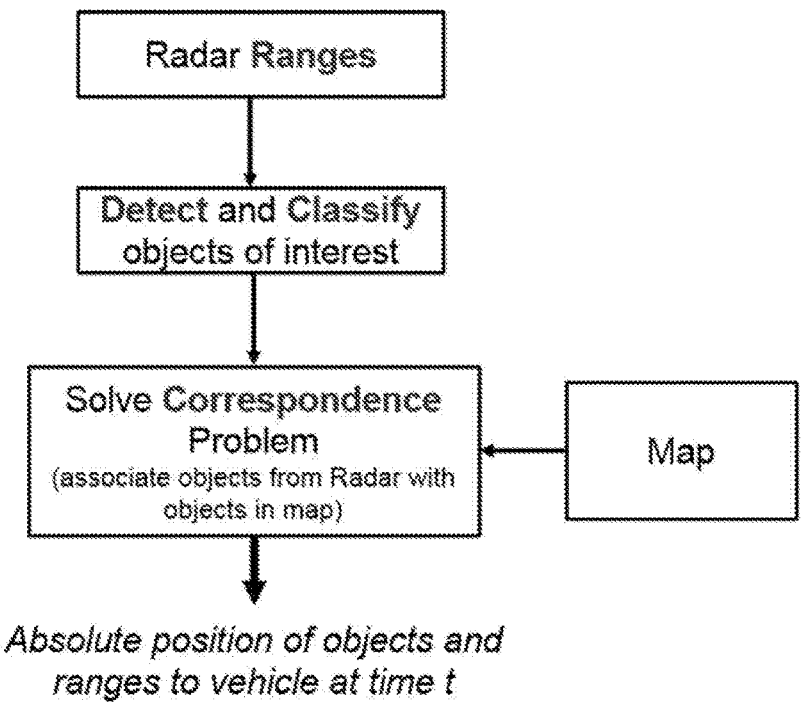
FIG. 12 is a schematic representation of use of a radar closed-form measurement model according to an embodiment.

One embodiment of a closed-form radar measurement model is schematically depicted in FIG. 12. It may be desirable to employ 4D radars with high resolution in azimuth and elevation angle to detect and classify objects. Then, a first correspondence between the objects detected and classified by the radar sensor (labeled with range ranges) and objects in the map. Resolving the radar/map correspondence leads to knowing the position of objects in the global frame (absolute position). Correspondingly, the absolute positioning of the objects and their ranges may be used to build a closed form measurement model as a function of the states of the platform.

Figure 13:
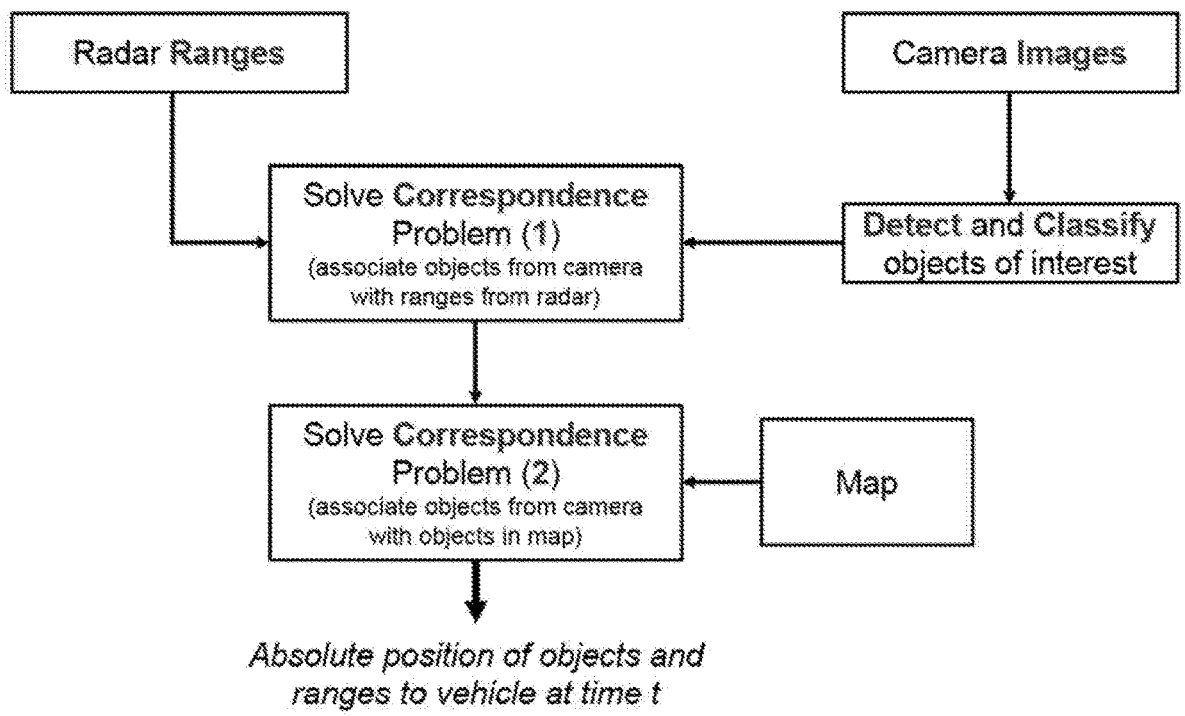
FIG. 13 is a schematic representation of use of a radar closed-form measurement model employing a supplemental sensor according to an embodiment.

Another embodiment of a closed-form radar measurement model that employs information from a supplemental sensor is schematically depicted in FIG. 13. Suitable types of supplemental sensors include an optical camera, a thermal camera and an infra-red imaging sensor, which may be implemented as external sensor 116 or auxiliary sensor 114 of device 100 or in any other desired manner. Images or other samples from the supplemental sensors may be used to detect and classify objects. A first correspondence is then determined by associating the ranges from the radar with the classified objects. Next, a second correspondence is determined between the objects detected and classified by the supplemental sensor (labeled with range ranges) and objects in the map. Resolving the camera/map correspondence leads to knowing the position of objects in the global frame (absolute position). As such, the absolute positioning of the objects and their ranges may be used to build a closed form measurement model as a function of the states of the platform.

2 System Model Embodiments

As discussed above, another aspect of the techniques of this disclosure is the use of a state estimation technique to provide the navigation solution that integrates radar measurements with the motion sensor data. The following materials discuss exemplary nonlinear system models as well as using another integrated navigation solution through another state estimation technique. In one embodiment, a nonlinear error-state model can be used to predict the error-states and then use the error-states to correct the actual states of the vehicle. Alternatively, in some embodiments, a linearized error-state model may be used. In another embodiment, a nonlinear total-state model can be used to directly estimate the states of the vehicle, including the 3D position, velocity and attitude angles. In yet another embodiment, the solution from another state estimation technique (another filter) that integrates INS and GNSS (or other source absolute navigational information) systems to feed the system model for the state estimation technique at hand.

2.1 Nonlinear Error-State Model Embodiments

In the present example, a three-dimensional (3D) navigation solution is provided by calculating 3D position, velocity and attitude of a moving platform. The relative navigational information includes motion sensor data obtained from MEMS-based inertial sensors consisting of three orthogonal accelerometers and three orthogonal gyroscopes, such as sensor assembly 106 of device 100 in FIG. 1. Likewise, host processor 102 may implement integration module 114 to integrate the information using a nonlinear state estimation technique, such as for example, Mixture PF having the system model defined herein below.

Navigation Solution

The state of device 100 whether tethered or non-tethered to the moving platform is $x_k=[\varphi_k,\lambda_k,h_k,v_k^E,v_k^N,v_k^U,p_k,r_k,A_k]^T$, where $\varphi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle. Since this is an error-state approach, the motion model is used externally in what is called inertial mechanization, which is a nonlinear model as mentioned earlier, the output of this model is the navigation states of the device, such as position, velocity, and attitude. The state estimation or filtering technique estimates the errors in the navigation states obtained by the mechanization, so the estimated state vector by this state estimation or filtering technique is for the error states, and the system model is an error-state system model which transition the previous error-state to the current error-state. The mechanization output is corrected for these estimated errors to provide the corrected navigation states, such as corrected position, velocity and attitude. The estimated error-state is about a nominal value which is the mechanization output, the mechanization can operate either unaided in an open loop mode, or can receive feedback from the corrected states, this case is called closed-loop mode. The error-state system model commonly used is a linearized model (to be used with KF-based solutions), but the work in this example uses a nonlinear error-state model to avoid the linearization and approximation.

The motion model used in the mechanization is given by $x_k=f_{mech}(x_{k-1},u_{k-1})$ where $u_{k-1}$ is the control input which is the inertial sensors readings that correspond to transforming the state from time epoch k−1 to time epoch k, this will be the convention used in this explanation for the sensor readings for nomenclature purposes. The nonlinear error-state system model (also called state transition model) is given by $\delta x_k=f(\delta x_{k-1},u_{k-1},w_{k-1})$ where $w_k$ is the process noise which is independent of the past and present states and accounts for the uncertainty in the platform motion and the control inputs. The measurement model is $\delta z_k=h(\delta x_k,v_k)$ where $v_k$ is the measurement noise which is independent of the past and current states and the process noise and accounts for uncertainty in radar measurements.

For this and other examples, a set of common reference frames is used for demonstration purposes and it should be recognized that other definitions of reference frames may be used. The body frame of the platform has the X-axis along the transversal direction, Y-axis along the forward longitudinal direction, and Z-axis along the vertical direction of the vehicle completing a right-handed system. The local-level frame is the ENU frame that has axes along East, North, and vertical (Up) directions. The inertial frame is Earth-centered inertial frame (ECI) centered at the center of mass of the Earth and whose the Z-axis is the axis of rotation of the Earth. The Earth-centered Earth-fixed (ECEF) frame has the same origin and z-axis as the ECI frame but it rotates with the Earth (hence the name Earth-fixed).

A recursive mechanization process may be performed to convert the output of inertial sensors into position, velocity and attitude information based on previous output (or some initial values) and the new measurement from the inertial sensors. Next, a suitable initialization procedures may be performed and may be tailored to the specific application. For example, the initialization may be for position and velocity, such as by using a platform's last known position before it started to move and if available, may be provided by absolute navigational information, while velocity initialization may be made with zero input, if the platform is stationary and if moving, the velocity may be provided from an external navigation source such as for example, GNSS or odometer. When velocity is not available from the absolute navigation information, position differences over time may be used to approximate velocity and consequently calculate azimuth. In some embodiment, attitude angles may be calculated, such as through the use of quaternions. Another suitable technique for calculating attitude angles employs a skew symmetric matrix of the angle increments corresponding to the rotation vector from the local-level frame to the body frame depicted in the body frame. Further, position and velocity may be calculated as appropriate. In general, it should be recognized that the mechanization equations for attitude, velocity and position may be implemented differently, such as for example, using a better numerical integration technique for position. Furthermore, coning and sculling may be used to provide more precise mechanization output.

System Model

As noted above, the system model is the state transition model and since this is an error state system model, this system model transitions from the error state of the previous iteration k−1 to the error state of the current iteration k. To describe the system model utilized in the present navigation module, which is the nonlinear error-state system model, the error state vector has to be described first. The error state consist of the errors in the navigation states, the errors in the rotation matrix $R_b^l$ that transforms from the device body frame to the local-level frame, the errors in the sensors readings (i.e. the errors in the control input). The errors in the navigation states are $[\delta\varphi_k,\delta\lambda_k,\delta h_k,\delta v_k^E,\delta v_k^N,\delta v_k^U,\delta p_k,\delta r_k,\delta A_k]^T$, which are the errors in latitude, longitude, altitude, velocity along East, North, and Up directions, pitch, roll, and azimuth, respectively. The errors in $R_b^l$ are the errors in the nine elements of this 3×3 matrix, the 3×3 matrix of the errors will be called $\delta R_b^l$. The errors associated with the different control inputs (the sensors' errors): $[\delta f_k^x\ \delta f_k^y\ \delta f_k^z\ \delta\omega_k^x\ \delta\omega_k^y\ \delta\omega_k^z]^T$ where $\delta f_k^x$, $\delta f_k^y$, and $\delta f_k^z$ are the stochastic errors in accelerometers readings, and $\delta\omega_k^x$, $\delta\omega_k^y$, and $\delta\omega_k^z$ are the stochastic errors in gyroscopes readings.

Modeling Sensors' Errors

A system model for the sensors' errors may be used. For example the traditional model for these sensors errors in the literature, is the first order Gauss Markov model, which can be used here, but other models as well can be used. For example, a higher order Auto-Regressive (AR) model to model the drift in each one of the inertial sensors may be used. In general, if the stochastic gyroscope drift is modeled by any model such as for example Gauss Markov (GM), or AR, in the system model, the state vector has to be augmented accordingly. The normal way of doing this augmentation will lead to, for example in the case of AR with order 120, the addition of 120 states to the state vector. Since this will introduce a lot of computational overhead and will require an increase in the number of used particles, another approach involves augmenting the state vector in PF by only one state for the gyroscope drift to allow use of higher order models possible without adding a lot of computational overhead. In some embodiments, the errors in the rotation matrix that transforms from the device body frame to the local-level frame may be modeled. Further, the errors in attitude and velocity may be obtained. Finally, the errors in position may also be modeled.

2.2 Nonlinear Total-State Model Embodiments

In the present example, a three-dimensional (3D) navigation solution is provided by calculating 3D position, velocity and attitude of a moving platform. The relative navigational information includes motion sensor data obtained from MEMS-based inertial sensors consisting of three orthogonal accelerometers and three orthogonal gyroscopes, such as sensor assembly 106 of device 100 in FIG. 1. Likewise, host processor 102 may implement integration module 114 to integrate the information using a nonlinear state estimation technique, such as for example, Mixture PF having the system model defined herein below.

Navigation Solution

The state of device 100 whether tethered or non-tethered to the moving platform is $x_k = [\phi_k, \lambda_k, h_k, v_k^E, v_k^N, v_k^U, p_k, r_k, A_k]^T$, where $\phi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle. Since this is a total-state approach, the system model is the motion model itself, which is a nonlinear model as mentioned earlier, the output of this model is the navigation states of the device, such as position, velocity, and attitude. The state estimation or filtering technique estimates directly the navigation states themselves, so the estimated state vector by this state estimation or filtering technique is for the total states or the navigation states, and the system model is a total-state system model which transition the previous total-state to the current total-state. The traditional and commonly used navigation solutions use a linearized error-state system model (to be used with KF-based solutions), but the work in this example uses a nonlinear total-state model to avoid the linearization and approximation.

The nonlinear total-state system model (also called state transition model) is given by $x_k = f(x_{k-1}, u_{k-1}, w_{k-1})$ where $u_{k-1}$ is the control input which is the inertial sensors readings that correspond to transforming the state from time epoch k−1 to time epoch k, this will be the convention used in this explanation for the sensor readings just used for nomenclature purposes. Furthermore, $w_k$ is the process noise which is independent of the past and present states and accounts for the uncertainty in the platform motion and the control inputs. The measurement model is $z_k = h(x_k, v_k)$ where $v_k$ is the measurement noise which is independent of the past and current states and the process noise and accounts for uncertainty in radar measurements.

2.2.1 The System Model

The system model is the state transition model and since this is a total state system model, this system model transitions from the total state of the previous iteration k−1 to the total state of the current iteration k. Before describing the system model utilized in the present example, the control inputs are first introduced. The measurement provided by the IMU is the control input; $u_{k-1} = [f_{k-1}^x \; f_{k-1}^y \; f_{k-1}^z \; \omega_{k-1}^x \; \omega_{k-1}^y \; \omega_{k-1}^z]^T$ where $f_{k-1}^x$, $f_{k-1}^y$, and $f_{k-1}^z$ are the readings of the accelerometer triad, and $\omega_{k-1}^x$, $\omega_{k-1}^y$, and $\omega_{k-1}^z$ are the readings of the gyroscope triad. As mentioned earlier these are the sensors' readings that correspond to transforming the state from time epoch k−1 to time epoch k, this is the convention used in this explanation for the sensor readings just used for nomenclature purposes.

To describe the system model utilized in the present example, which is the nonlinear total-state system model, the total state vector has to be described first. The state consists of the navigation states themselves, and the errors in the sensors readings (i.e. the errors in the control input). The navigation states are $[\phi_k, \lambda_k, h_k, v_k^E, v_k^N, v_k^U, p_k, r_k, A_k]^T$, which are the latitude, longitude, altitude, velocity along East, North, and Up directions, pitch, roll, and azimuth, respectively. The errors associated with the different control inputs (the sensors' errors): $[\delta f_k^x \; \delta f_k^y \; \delta f_k^z \; \delta \omega_k^x \; \delta \omega_k^y \; \delta \omega_k^z]^T$ where $\delta f_k^x$, $\delta f_k^y$, and $\delta f_k^z$ are the stochastic errors in accelerometers readings, and $\delta \omega_k^x$, $\delta \omega_k^y$, and $\delta \omega_k^z$ are the stochastic errors in gyroscopes readings. The rotation matrix that transforms from the vehicle body frame to the local-level frame at time k−1 is $$R_{b,k-1}^\ell = \begin{bmatrix} \cos A_{k-1} \cos r_{k-1} + \sin A_{k-1} \sin p_{k-1} \sin r_{k-1} & \sin A_{k-1} \cos p_{k-1} & \cos A_{k-1} \sin r_{k-1} - \sin A_{k-1} \sin p_{k-1} \cos r_{k-1} \\ -\sin A_{k-1} \cos r_{k-1} + \cos A_{k-1} \sin p_{k-1} \sin r_{k-1} & \cos A_{k-1} \cos p_{k-1} & -\sin A_{k-1} \sin r_{k-1} - \cos A_{k-1} \sin p_{k-1} \cos r_{k-1} \\ -\cos p_{k-1} \sin r_{k-1} & \sin p_{k-1} & \cos p_{k-1} \cos r_{k-1} \end{bmatrix}$$

Modeling Sensors' Errors

A similar approach for modeling sensors' errors as described for the Nonlinear Error-State Model embodiments discussed in Section 2.1 may be used here. It should be recognized that the system model equations for attitude, velocity and position may be implemented differently, such as for example, using a better numerical integration technique for position. Furthermore, coning and sculling may be used to provide more precise navigation states output.

2.3 System Model with Another Integration Filter Embodiments

Figure 14:
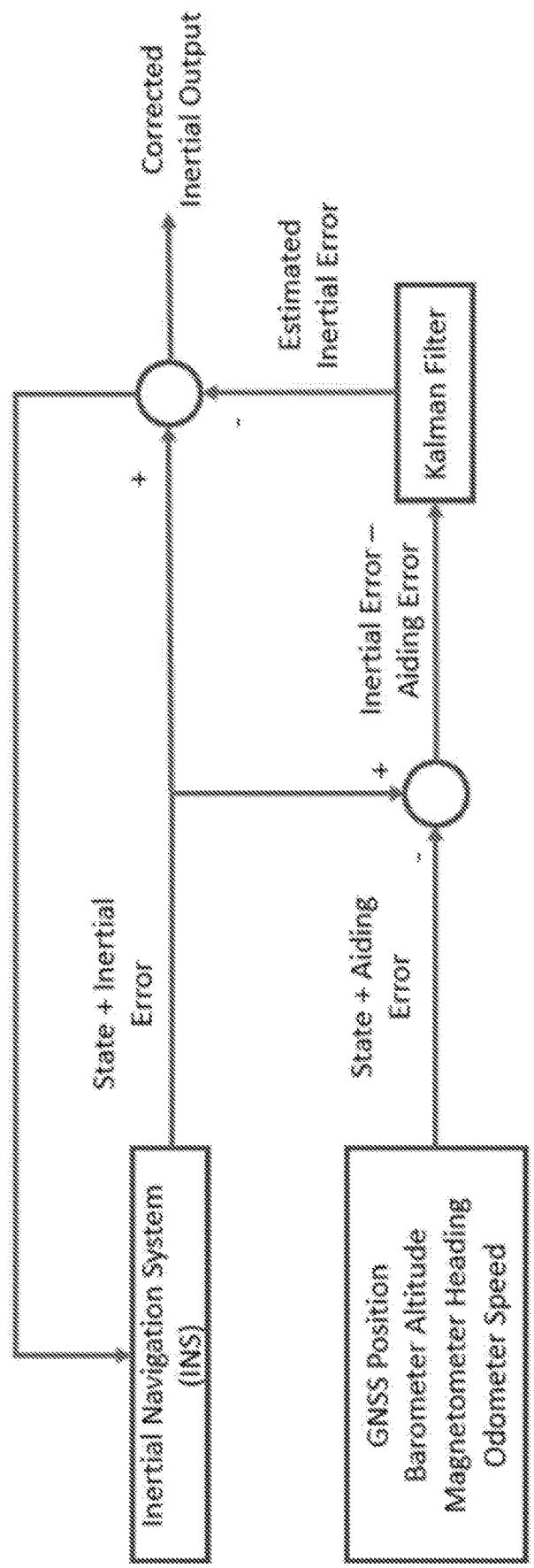
FIG. 14 is schematic diagram showing an additional state estimation technique that integrates the motion sensor data according to an embodiment that can act as an input to an embodiment of a system model.

As noted above, other embodiments use a system model utilizing the solution from another state estimation technique (another filter) that integrates INS and GNSS systems to feed the system model for the state estimation technique at hand. For example, a Kalman Filter-based navigation solution (among other state estimation techniques) can be used as an input to the system model for the current state estimation technique. The solution may integrate inertial sensor data with GNSS updates using a Kalman Filter solution (an example among other state estimation techniques). Other sources of absolute updates that maybe integrated into the solution, include; odometer for speed updates, magnetometer for heading updates and barometer for altitude updates. One suitable architecture is schematically depicted in FIG. 14, which shows the basic block diagram of the Kalman Filter-based positioning solution for estimating the inertial sensors error using the absolute information (obtained from various sensors) and subtracts it from the INS solution to obtain the final corrected solution.

The solution from the Kalman filter-based system may include system states and an estimation of the uncertainty of the solution. The following equations depict an example of a system model for the current state estimation technique based on the other integrated solution using another state estimation technique (in this example the Kalman Filter-based solution):

$$\varphi_k = \varphi_{k-1} + (\varphi_{k,sol} - \varphi_{k-1,sol}) + \varphi_{noise}$$

$$\lambda_k = \lambda_{k-1} + (\lambda_{k,sol} - \lambda_{k-1,sol}) + \lambda_{noise}$$

$$h_k = h_{k-1} + (h_{k,sol} - h_{k-1,sol}) + h_{noise}$$

Here, $\varphi_k$, $\varphi_{k-1}$, $\lambda_k$, $\lambda_{k-1}$, $h_k$, $h_{k-1}$ are the current and the previous latitude, longitude and altitude of the system model respectively. Moreover, $\varphi_{k,sol}$, $\varphi_{k-1,sol}$, $\lambda_{k,sol}$, $\lambda_{k-1,sol}$, $h_{k,sol}$, $h_{k-1,sol}$ are the current and previous latitude, longitude and altitude of the Kalman Filter-based solution respectively. Finally, $\varphi_{noise}$, $\lambda_{noise}$, $h_{noise}$ random variables representing process noise added with the following distribution:

$$\varphi_{noise} \sim N(0, (\sigma_{\varphi_{k,sol}} + \sigma_{\varphi_{k-1,sol}})^2)$$

$$\lambda_{noise} \sim N(0, (\sigma_{\lambda_{k,sol}} + \sigma_{\lambda_{k-1,sol}})^2)$$

$$h_{noise} \sim N(0, (\sigma_{h_{k,sol}} + \sigma_{h_{k-1,sol}})^2)$$

In this example, the random variables are normally distributed and represent the uncertainty in the estimated states from the Kalman Filter-based solution. The noise standard deviation is calculated based on the standard deviation of the current and previous solution.

3 State Estimation

Next, details regarding the design of a state estimator to integrate the radar data and the motion sensor data are discussed. As noted above, four exemplary radar measurement models include a range-based model, a NOL model, a radar map matching model and a closed-form model. Each may be integrated with the system models described immediately above. For the purposes of this disclosure, the integration of each radar measurement model is in the context of a Particle Filter (PF) state estimator. A PF estimator may be used when the system and/or the measurement model are nonlinear as opposed to other state estimation filters, such as Kalman Filters (KF) that require linearization. Moreover, PF estimators are more suited when the noise affecting the measurement model or the system model are non-Gaussian. In other words, PF can be used to represent multimodal error distributions. Moreover, PF estimators provide a multi-hypothesis approach, whereas a KF propagates a single hypothesis.

However, other nonlinear state estimation techniques are within the scope of this disclosure. For example, another filtering approach that can be used is the Mixture PF. Some aspects of the basic PF called Sampling/Importance Resampling (SIR) PF are first discussed. In the prediction phase, the SIR PF samples from the system model, which does not depend on the last observation. In MEMS-based INS/Radar integration, the sampling based on the system model, which depends on inertial sensor readings as control inputs, makes the SIR PF suffer from poor performance because with more drift this sampling operation will not produce enough samples in regions where the true probability density function (PDF) of the state is large, especially in the case of MEMS-based sensors. Because of the limitation of the SIR PF, it has to use a very large number of samples to assure good coverage of the state space, thus making it computationally expensive. Mixture PF is one of the variants of PF that aim to overcome this limitation of SIR and to use much less number of samples while not sacrificing the performance. The much lower number of samples makes Mixture PF applicable in real time.

As described above, in the SIR PF the samples are predicted from the system model, and then the most recent observation is used to adjust the importance weights of this prediction. The Mixture PF adds to the samples predicted from the system model some samples predicted from the most recent observation. The importance weights of these new samples are adjusted according to the probability that they came from the samples of the last iteration and the latest control inputs.

During the sampling phase of the Mixture PF used in the present embodiments, some samples predicted according to the most recent observation are added to those samples predicted according to the system model. The most recent observation is used to adjust the importance weights of the samples predicted according to the system model. The importance weights of the additional samples predicted according to the most recent observation are adjusted according to the probability that they were generated from the samples of the last iteration and the system model with latest control inputs. When no radar objects are detected, only samples based on the system model are used, but when objects are detected, both types of samples are used to give better performance, particularly during regions of no radar detections. Also adding the samples from radar observation leads to faster recovery to true position after radar outages (durations where no objects are detected by the radar).

It is worth noting that a KF filter can also be used given that the sensor model and the system model are linear. If either the sensor or the system model is not linear, different forms of KF can be used like Extended Kalman Filter (EKF) to linearize the models prior to running the filter.

3.1 Measurement Model: Range-Based Embodiments

This discussion involves using a range-based radar model to estimate the probability density function: $p(\rho_t^k|x_t,m)$ as detailed above. In other words, given knowledge of the map and an estimate of the state of the vehicle, the function represents the probability distribution of the measured range. The map is used along with ray-casting algorithms to estimate the true range to an object (if detected by radar) given a state of the platform. Here, k refers to the $k^{th}$ range at a certain (azimuth/elevation) angle. Assuming measurements of a single scan are independent, deriving $p(\rho_t|x_t,m)$ from $p(\rho_t^k|x_t,m)$ is reinstated as: $p(\rho_t|x_t,m) = \Pi_{k=0}^{K-1} p(\rho_t|x_t,m)$, where $\rho_t^k \sim N(\Sigma_{e=0}^{E-1}\mu_i, \Sigma_{e=0}^{E-1}\sigma_i^2)$.

The proposed Adaptive Measurement model which incorporates different factors such as environmental, radar design and dynamic factors (also discussed above), can be used to tune model parameters $\mu_i$ and $\sigma_i^2$ for each measurement $\rho_t^k$. The probability of a scan of measurements denoted by $p(\rho_t|x_t,m)$ can be directly used to weight the importance of a particle with known-state in a map. In this embodiment, the range based measurement model is integrated with the MEMS-based Total-state system model. In the context of the basic PF or the Sampling/Importance Resampling (SIR) filter, the PF is initialized by generating N particles using a random distribution (could be within a certain confined distance from the initial state). In the prediction stage, the system model is used to propagate the state of the N particles based on the inputs from the inertial sensors and the proposed system model. The state of each particle is represented by the vector $x_k = [\varphi_k, \lambda_k, h_k, v_k^E, v_k^N, v_k^U, p_k, r_k, A_k]^T$, where $\varphi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle.

The radar measurements are then used by the measurement model to compute $p(\rho_t|x_t,m)$ for each of the N particles. Prior to computing $\rho_t^{k,true}$ using ray-casting algorithm for each detected object, all moving objects/targets are filtered by utilizing relative Doppler information. Consequently, an importance weight is associated with each particle, proportional to how well the output of the ray-casting algorithm aligns with the measured ranges given the particle state. Then, a resampling step is necessary to randomly draw N new particles from the old N particles with replacement in proportion to the normalized importance weight of each old particle (usually these weights are normalized by dividing the weight of each particle by the sum of all weights). Hence, particles with low importance weight will have a high probability of not propagating to the next state. In other words, surviving particles usually cluster around areas with higher posterior probability.

3.2 Measurement Model: Nearest-Object Likelihood Embodiments

This example relates to integrating the state model with a Nearest-Object Likelihood model that does not need the ray-casting operation to compute $p(\rho_t|x_t,m)$. The first step is to filter out all measurements that are reflected from moving objects (since the map might only contain static objects). Then, the measurements to static targets are projected onto the map in the global frame. For example, the projected radar position due to the $k^{th}$ measurement is given by, where $[x_{rad,t}^k, y_{rad,t}^k, z_{rad,t}^k]$ is the 3D radar position in the global frame:

$$\begin{bmatrix} x_{rad,t}^k \\ y_{rad,t}^k \\ z_{rad,t}^k \end{bmatrix} = \begin{bmatrix} x_{rad,t} \\ y_{rad,t} \\ z_{rad,t} \end{bmatrix} + R_l^g * \begin{bmatrix} \rho_t^k * \cos(\theta_{rad,t}^k)\cos(\phi_{rad,t}^k) \\ \rho_t^k * \cos(\theta_{rad,t}^k)\sin(\phi_{rad,t}^k) \\ \rho_t^k * \sin(\theta_{rad,t}^k) \end{bmatrix}$$

The next step is to search for the nearest object in the map to the projected position denoted by $(x_{rad,t}^k, y_{rad,t}^k, z_{rad,t}^k)$. Here, it is assumed that the likelihood $p(\rho_t^k|x_t,m)$ is equal to a Gaussian distribution with zero mean and variance $\sigma_{near}^2$ representing the error in Euclidian distance between the projected position and the nearest object in the map. Hence, the probability of a set of measurements given the state of the platform and a map can be represented by $p(\rho_t|x_t,m) \propto \Pi_{k=0}^{K-1}(D=dist^k)$, where $D \sim N(0,\sigma_{near}^2)$ and $dist^k$ is the distance between the projected position of measurement k and the nearest object in the map.

The probability of a scan of measurements denoted by $p(\rho_t|x_t,m)$ can be directly used to weight the importance of a particle with known-state in a map in this integration of the NOL measurement model and the MEMS-based Total-state system model. In the context of the basic PF or the Sampling/Importance Re-sampling (SIR) filter, the PF is initialized by generating N particles using a random distribution (could be within a certain confined distance from the initial state). In the prediction stage, the system model is used to propagate the state of the N particles based on the inputs from the inertial sensors and the proposed system model. The state of each particle is represented by the vector $x_k = [\phi_k, \lambda_k, h_k, v_k^E, v_k^N, v_k^U, p_k, r_k, A_k]^T$, where $\phi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle.

The radar measurements are then used to project the platform's state in the map and then the distance to the nearest object is used as an input to the measurement model to compute $p(\rho_t|x_t,m)$ for each of the N particles. Prior to the projection step, all moving objects/targets are filtered by utilizing relative Doppler information. Consequently, an importance weight is associated with each particle, proportional to the proximity of the projected state to the nearest object in the map. Then, a resampling step is necessary to randomly draw N new particles from the old N particles with replacement in proportion to the normalized importance weight of each old particle (usually these weights are normalized by dividing the weight of each particle by the sum of all weights). Hence, particles with low importance weight will have a high probability of not propagating to the next state. In other words, surviving particles usually cluster around areas with higher posterior probability. Then, a resampling step is necessary to randomly draw N new particles from the old N particles with replacement in proportion to the normalized importance weight of each old particle (usually these weights are normalized by dividing the weight of each particle by the sum of all weights). Hence, particles of low importance weight will have a high probability of not propagating to the next state. In other words, surviving particles usually cluster around areas with higher posterior probability.

As noted above, the basic SIR PF filter has certain limitations because the samples are only predicted from the system model and then the most recent observation is used to adjust the importance weights of this prediction. The Mixture PF adds to the samples predicted from the system model additional samples predicted from the most recent observation. The importance weights of these new samples are adjusted according to the probability that they came from the samples of the last iteration and the latest control inputs. In the context of NOL-based radar measurement model, a suitable method generates particles drawn from the measurement model. This may be done by searching for states, for which the object list detected by the radar is closely aligned (i.e., a high probability of radar measurement given the current state) with objects in the global map. A measure of how aligned the object list given a specific state, is by computing the probability of most recent measurement denoted by $p(\rho_t|x_t,m)$ using the NOL radar measurement model. If such states are found, it is possible to generate particles drawn from the measurement model rather than the system model. For this process to be efficient, search space (infinite number of states) within the global map should be considered so that constraints can be effectively applied to limit the search space and consequently reduce computational complexity. After new particles are successfully drawn from the NOL-based measurement model, the importance weights of these new samples are adjusted according to the probability that they came from the samples of the last iteration and the latest control inputs.

3.3 Measurement Model: Radar Map-Matching Embodiments

In this example, a radar map matching measurement model is integrated with the system model. As noted above, the map matching model is based on applying matching algorithms between a local map (radar scan) and the global map (e.g., a reference for radar measurements) as means of measuring the likelihood of a scan given the knowledge of the state and the map. The local map is defined as a map created based on radar measurements. The global map can either be a feature-based or location-based map. Regardless of the type of map used, it can be converted to the appropriate format (OGM map) for us to be able to match it directly to radar scans.

Assuming a 3D radar map and a 3D radar, the center of a grid cell in the global and local map can be denoted by $m_{x,y,z}^{gl}$ and $m_{x,y,z}^{loc}$ respectively. The linear correlation can be used to indicate the likelihood of the current local map matching the global map, given the current state of the vehicle. Let us denote to the mean of the relevant section of the global map by $\overline{m}^{gl}$ and the mean of the local map by $\overline{m}^{loc}$. Moreover, we denote to the standard deviation of the global and local map by $\sigma_{m^{gl}}$ and $\sigma_{m^{loc}}$ respectively. Hence, the correlation coefficient between the local and global map is represented by:

$$p(m^{loc}|x_t,m) = \text{Corr}_{m^{gl},m^{loc}} = \Sigma_{x,y,z}((m_{x,y,z}^{loc} - \overline{m}^{loc}) * (m_{x,y,z}^{gl} - \overline{m}^{gl}))/(\sigma_{m^{gl}} * \sigma_{m^{loc}})$$

Although the correlation coefficient ranges between +1 and −1, only a positive correlation or no correlation at all is significant so it can be assumed all negative correlations equal 0, allowing the likelihood of a radar scan to be represented as $p(\rho_t↑x_t,m) \propto \max(\text{Corr}_{m^{gl},m^{loc}}, 0)$.

The probability of a scan of measurements denoted by $p(z_t|x_t,m)$ can be directly used to weight the importance of a particle with known-state in a map. Here, we discuss the integration of the Radar Map-Matching measurement model and the MEMS-based Total-state system model. In the context of the basic PF or the Sampling/Importance Resampling (SIR) filter, the PF is initialized by generating N particles using a random distribution (could be within a certain confined distance from the initial state). In the prediction stage, the system model is used to propagate the state of the N particles based on the inputs from the inertial sensors and the proposed system model. The state of each particle is represented by the vector $x_k = [\varphi_k, \lambda_k, h_k, v_k^E, v_k^N, v_k^U, p_k, r_k, A_k]^T$, where $\varphi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle.

The radar measurements are then used to create the local radar map and then the local map is iteratively matching with global map to the correlation of the current scan given the state of the particle. The computed correlation is then used to infer $p(\rho_t|x_t,m)$ for each of the N particles. Prior to the map-matching step, all moving objects/targets are filtered by utilizing relative Doppler information. Consequently, an importance weight is associated with each particle, proportional to the correlation between the local map and the global map given the state of the particle. Then, a resampling step is necessary to randomly draw N new particles from the old N particles with replacement in proportion to the normalized importance weight of each old particle (usually these weights are normalized by dividing the weight of each particle by the sum of all weights). Hence, particles of low importance weight will have a high probability of not propagating to the next state. In other words, surviving particles usually cluster around areas with higher posterior probability.

Again, the basic SIR PF filter has certain limitations because the samples are only predicted from the system model and then the most recent observation is used to adjust the importance weights of this prediction. Thus, in this example using a Mixture PF allows the addition of further samples predicted from the most recent observation in addition to the samples predicted from the system model. The importance weights of these new samples are adjusted according to the probability that they came from the samples of the last iteration and the latest control inputs. In the context of radar map matching measurement model, a method may be employed that generates particles drawn from the measurement model. This may be done by searching for states, for which the measurement from the radar is closely aligned (i.e., a high probability of radar measurement given the current state) to measurements from the global map at specific locations. A measure of how aligned the radar measurement given a specific state, is by computing the probability of most recent measurement denoted by $p(\rho_t|x_t,m)$ using the map-matching correlation factor. In other words, several matches can be found by matching the local map to the global map at different states and savings states where the match between the local map and the global map results in a high correlation factor. If such states are found, we will be able to generate particles drawn from the measurement model rather than the system model. For this process to be efficient, the search space (infinite number of states) within the global map should be considered to effectively apply constraints that limit the search space and consequently reduce computational complexity. After new particles are successfully drawn from based on the map-matching based measurement model, the importance weights of these new samples are adjusted according to the probability that they came from the samples of the last iteration and the latest control inputs.

3.4 Measurement Model: Closed-Form Embodiments

This section discusses the integration of a map matching model with the system model and includes specific, but non-limiting examples. As noted above, map matching is a non-probabilistic modeling approach that assumes objects detected by the radar can be identified uniquely as objects in the map. Given an estimate of the range to an object (which can be supplemented with the relative Doppler information) and knowledge of which object is detected by the radar in the map, a correspondence may be determined that relates the measurements to the states of the platform in the closed-form model.

In this tightly-coupled Mixture PF integration, radar raw data is used and is integrated with the inertial sensors. The radar raw data used in the present navigation module in this example are ranges and Doppler shifts. From the measured Doppler for each target, the corresponding range rate can be calculated. In the update phase of the integration filter the ranges and range-rates can be used as the measurement updates to update the position and velocity states of the vehicle. The measurement model that relates these measurements to the position and velocity states is a nonlinear model.

As is known, the KF integration solutions linearize this model. PF with its ability to deal with nonlinear models may provide improved performance for tightly-coupled integration because it can use the exact nonlinear measurement model, in addition to the fact that the system model is may be a nonlinear model. The incoming frequency at the Radar receiver is not exactly the frequency of the reflected signal by the target, but is shifted from the original value transmitted by the radar. This is called the Doppler shift and it is due to relative motion between the object/target and the radar receiver. The Doppler shift from the $m^{th}$ object is the projection of relative velocities (of object and receiver) onto the line of sight vector multiplied by the transmitted frequency and divided by the speed of light, and is given by $$D^m = \frac{\{(V^m - V) \cdot 1^m\} f_{tr}}{c},$$

where $v^m = [v_x^m, v_y^m, v_z^m]$ is the $m^{th}$ object velocity in the ECEF frame, $v = [v_x, v_y, v_z]$ is the true receiver velocity in the ECEF frame, $f_{tr}$ is the radar's transmitted frequency, and $$1^m = \frac{[(x-x^m), (y-y^m), (z-z^m)]^T}{\sqrt{(x-x^m)^2 + (y-y^m)^2 + (z-z^m)^2}} = [1_x^m, 1_y^m, 1_z^m]^T$$

is the true line of sight vector reflection from the $m^{th}$ object to the receiver. Given the measured Doppler shift, the range-rate $\dot{\rho}^m$ is calculated as follows $$\dot{\rho}^m = -\frac{D^m c}{f_{tr}}.$$

After compensating for any systematic range errors, the corrected range can be written as $\rho_c^m = r^{m,true} + \varepsilon_\rho^m$. The true geometric range from $m^{th}$ detected object to receiver is the Euclidean distance and is given as $r^m = \sqrt{(x-x^m)^2 + (y-y^m)^2 + (z-z^m)^2} = \|x - x^m\|$, where $x = [x,y,z]^T$ is the radar receiver position in ECEF frame and $x^m = [x^m, y^m, z^m]^T$ is the position of the $m^{th}$ detected object.

The traditional techniques relying on KF used to linearize these equations about the range estimate obtained from the inertial sensors mechanization. PF is suggested in this example to accommodate nonlinear models, thus there is no need for linearizing this equation. A suitable nonlinear radar range model for M detected object is:

$$\begin{bmatrix} \rho_c^1 \\ \vdots \\ \rho_c^M \end{bmatrix} = \begin{bmatrix} \|x - x^1\| + b_r + \tilde{\varepsilon}_\rho^1 \\ \vdots \\ \|x - x^M\| + b_r + \tilde{\varepsilon}_\rho^M \end{bmatrix} = \begin{bmatrix} \sqrt{(x-x^1)^2 + (y-y^1)^2 + (z-z^1)^2} + b_r + \tilde{\varepsilon}_\rho^1 \\ \vdots \\ \sqrt{(x-x^M)^2 + (y-y^M)^2 + (z-z^M)^2} + b_r + \tilde{\varepsilon}_\rho^M \end{bmatrix}$$

Since the position state x in the above equation is in ECEF rectangular coordinates, it may be translated to Geodetic coordinates for the state vector used in the Mixture PF. The relationship between the Geodetic and Cartesian coordinates is given by:

$$\begin{bmatrix} x \\ y \\ z \end{bmatrix} = \begin{bmatrix} (R_N + h)\cos\varphi\cos\lambda \\ (R_N + h)\cos\varphi\sin\lambda \\ \{R_N(1-e^2) + h\}\sin\varphi \end{bmatrix},$$

where $R_N$ is the normal radius of curvature of the Earth's ellipsoid and e is the eccentricity of the Meridian ellipse. Thus, the range model for Geodetic coordinates may be represented by:

$$\begin{bmatrix} \rho_c^1 \\ \vdots \\ \rho_c^M \end{bmatrix} = \begin{bmatrix} \sqrt{\begin{array}{c}((R_N + h)\cos\varphi\cos\lambda - x^1)^2 + \\ ((R_N + h)\cos\varphi\sin\lambda - y^1)^2 + \\ (\{R_N(1-e^2) + h\}\sin\varphi - z^1)^2\end{array}} + b_r + \tilde{\varepsilon}_\rho^1 \\ \vdots \\ \sqrt{\begin{array}{c}((R_N + h)\cos\varphi\cos\lambda - x^M)^2 + \\ ((R_N + h)\cos\varphi\sin\lambda - y^M)^2 + \\ (\{R_N(1-e^2) + h\}\sin\varphi - z^M)^2\end{array}} + b_r + \tilde{\varepsilon}_\rho^M \end{bmatrix}$$

The true range-rate between the $m^{th}$ object and radar sensor is expressed as $\dot{r}^m = 1_x^m(v_x - v_x^m) + 1_y^m(v_y - v_y^m) + 1_z^m(v_z - v_z^m)$. The range-rate for the $m^{th}$ object can be modeled as $$\dot{\rho}^m = 1_x^m(v_x - v_x^m) + 1_y^m(v_y - v_y^m) + 1_z^m(v_z - v_z^m) + \varepsilon_{\dot{\rho}}^m$$
$$= 1_x^m(v_x - v_x^m) + 1_y^m(v_y - v_y^m) + 1_z^m(v_z - v_z^m) + \varepsilon_{\dot{\rho}}^m,$$

where $\varepsilon_{\dot{\rho}}^m$ is the error in observation (in meters/sec).

It will be appreciated that the above equation is linear in velocities, but it is nonlinear in position. This can be seen by examining the expression for the line of sight unit vector above. Again, there is no need for linearization because of the nonlinear capabilities of PF. The nonlinear model for range-rates of M targets, again in ECEF rectangular coordinates is:

$$\begin{bmatrix} \dot{\rho}^1 \\ \vdots \\ \dot{\rho}^M \end{bmatrix} = \begin{bmatrix} 1_x^1(v_x - v_x^1) + 1_y^1(v_y - v_y^1) + 1_z^1(v_z - v_z^1) + \varepsilon_{\dot{\rho}}^1 \\ \vdots \\ 1_x^M(v_x - v_x^M) + 1_y^M(v_y - v_y^M) + 1_z^M(v_z - v_z^M) + \varepsilon_{\dot{\rho}}^M \end{bmatrix}$$

The velocities here are in ECEF and need to be in local-level frame because this is part of the state vector in Mixture PF. The transformation uses the rotation matrix from the local-level frame to ECEF ($R_l^e$) and is as follows:

$$\begin{bmatrix} v_x \\ v_y \\ v_z \end{bmatrix} = R_l^e \begin{bmatrix} v_e \\ v_n \\ v_u \end{bmatrix} = \begin{bmatrix} -\sin\lambda & -\sin\varphi\cos\lambda & \cos\varphi\cos\lambda \\ \cos\lambda & -\sin\varphi\sin\lambda & \cos\varphi\sin\lambda \\ 0 & \cos\varphi & \sin\varphi \end{bmatrix} \begin{bmatrix} v_e \\ v_n \\ v_u \end{bmatrix}$$

Furthermore, the line of sight unit vector from $m^{th}$ detected object to the radar sensor will be expressed as follows:

$$1^m = \frac{[((R_n+h)\cos\varphi\cos\lambda - x^m), ((R_N+h)\cos\varphi\sin\lambda - y^m),}{\sqrt{((R_N+h)\cos\varphi\cos\lambda - x^m)^2 + ((R_N+h)\cos\varphi\sin\lambda - y^m)^2 +}}$$
$$\frac{(\{R_N(1-e^2)+h\}\sin\varphi - z^m)]^T}{\sqrt{(\{R_N(1-e^2)+h\}\sin\varphi - z^m)^2}}$$
$$= [1_x^m, 1_y^m, 1_z^m]^T$$

The foregoing combined equations constitute the overall nonlinear model for M radar detected objects.

Next, these concepts are illustrated in the following non-limiting examples.

3.4.1 Example 1

Measurement Model for Error-State System Model

As discussed, the measurement model is a nonlinear model that relates the difference between the mechanization estimate of the ranges and range-rates and the radar raw measurements (range measurements and range-rates) at a time epoch k, $\delta z_k$, to the states at time k, $\delta x_k$, and the measurement noise $\varepsilon_k$. First, the radar raw measurements are $z_k = [\rho_k^1 \ldots \rho_k^M \dot{\rho}_k^1 \ldots \dot{\rho}_k^M]^T$ for M detected objects. The nonlinear measurement model for the error-state model can be in the form $\delta z_k = h(\delta x_k, \varepsilon_k)$, where $\delta z_k = [\rho_k^{1,Mech} - \rho_{c,k}^{1,rad} \ldots \rho_k^{M,Mech} - \rho_{c,k}^{M,rad} \dot{\rho}_k^{1,Mech} - \dot{\rho}_k^{1,rad} \ldots \dot{\rho}_k^{M,Mech} - \dot{\rho}_k^{M,rad}]^T$ and $\varepsilon_k = [\tilde{\varepsilon}_{\rho,k}^1 \ldots \tilde{\varepsilon}_{\rho,k}^M \tilde{\varepsilon}_{\dot{\rho},k}^1 \ldots \tilde{\varepsilon}_{\dot{\rho},k}^M]^T$.

The part of the measurement model for the ranges is as follows:

$$\begin{bmatrix} p_k^{1,Mech} - p_{c,f}^{1,rad} \\ \vdots \\ p_k^{M,Mech} - p_{c,k}^{M,rad} \end{bmatrix} =$$

$$\begin{bmatrix} \sqrt{(x_k^{Mech} - x_k^1)^2 + (y_k^{Mech} - y_k^1)^2 + (z_k^{Mech} - z_k^1)^2} \\ \vdots \\ \sqrt{(x_k^{Mech} - x_k^M)^2 + (y_k^{Mech} - y_k^M)^2 + (z_k^{Mech} - z_k^M)^2} \end{bmatrix} -$$

$$\begin{bmatrix} \sqrt{(x_k^{Corr} - x_k^1)^2 + (y_k^{Corr} - y_k^1)^2 + (z_k^{Corr} - z_k^1)^2} + \tilde{\varepsilon}_\rho^1 \\ \vdots \\ \sqrt{(x_k^{Corr} - x_k^M)^2 + (y_k^{Corr} - y_k^M)^2 + (z_k^{Corr} - z_k^M)^2} + \tilde{\varepsilon}_\rho^M \end{bmatrix},$$

where the radar receiver position from mechanization is $$x_k^{Mech} = \begin{bmatrix} x_k^{Mech} \\ y_k^{Mech} \\ z_k^{Mech} \end{bmatrix} = \begin{bmatrix} (R_{N,k}^{Mech} + h_k^{Mech})\cos\varphi_k^{Mech}\cos\lambda_k^{Mech} \\ (R_{N,k}^{Mech} + h_k^{Mech})\cos\varphi_k^{Mech}\sin\lambda_k^{Mech} \\ \{R_{N,k}^{Mech}(1-e^2) + h_k^{Mech}\}\sin\varphi_k^{Mech} \end{bmatrix},$$

the corrected receiver position is $$x_k^{Corr} = \begin{bmatrix} x_k^{Corr} \\ y_k^{Corr} \\ z_k^{Corr} \end{bmatrix} = \begin{bmatrix} (R_{N,k}^{Mech} - \delta R_{N,k} + h_k^{Mech} - \delta h_k)\cos(\varphi_k^{Mech} - \delta\varphi_k)\cos(\lambda_k^{Mech} - \delta\lambda_k) \\ (R_{N,k}^{Mech} - \delta R_{N,k} + h_k^{Mech} - \delta h_k)\cos(\varphi_k^{Mech} - \delta\varphi_k)\sin(\lambda_k^{Mech} - \delta\lambda_k) \\ \{(R_{N,k}^{Mech} - \delta R_{N,k})(1-e^2) + h_k^{Mech} - \delta h_k\}\sin(\varphi_k^{Mech} - \delta\varphi_k) \end{bmatrix}$$

and $x_k^m = [x_k^m \ y_k^m \ z_k^m]^T$ is the position of the $m^{th}$ radar detected object.

Next, the part of the measurement model for the range-rates is:

$$\begin{bmatrix} \dot{\rho}_k^{1,Mech} - \dot{\rho}_k^{1,rad} \\ \vdots \\ \dot{\rho}_k^{M,Mech} - \dot{\rho}_k^{M,rad} \end{bmatrix} = \begin{bmatrix} 1_{x,k}^{1,Mech} \cdot (v_{x,k}^{Mech} - v_{x,k}^1) + 1_{y,k}^{1,Mech} \cdot \\ (v_{y,k}^{Mech} - v_{y,k}^1) + 1_{z,k}^{1,Mech} \cdot (v_{z,k}^{Mech} - v_{z,k}^1) \\ \vdots \\ 1_{x,k}^{M,Mech} \cdot (v_{x,k}^{Mech} - v_{x,k}^M) + 1_{y,k}^{M,Mech} \cdot \\ (v_{y,k}^{Mech} - v_{y,k}^M) + 1_{z,k}^{M,Mech} \cdot (v_{z,k}^{Mech} - v_{z,k}^M) \end{bmatrix} - \begin{bmatrix} 1_{x,k}^{1,Corr} \cdot (v_{x,k}^{Corr} - v_{x,k}^1) + 1_{y,k}^{1,Corr} \cdot (v_{y,k}^{Corr} - v_{y,k}^1) + \\ 1_{z,k}^{1,Corr} \cdot (v_{z,k}^{Corr} - v_{z,k}^1) + \varepsilon_\rho^1 \\ \vdots \\ 1_{x,k}^{M,Corr} \cdot (v_{x,k}^{Corr} - v_{x,k}^M) + 1_{y,k}^{M,Corr} \cdot \\ (v_{y,k}^{Corr} - v_{y,k}^M) + 1_{z,k}^{M,Corr} \cdot (v_{z,k}^{Corr} - v_{z,k}^M) + \varepsilon_\rho^M \end{bmatrix}$$

where $$\begin{bmatrix} v_{x,k}^{Mech} \\ v_{y,k}^{Mech} \\ v_{z,k}^{Mech} \end{bmatrix} = R_{\ell,k}^{e,Mech} \begin{bmatrix} v_{e,k}^{Mech} \\ v_{n,k}^{Mech} \\ v_{u,k}^{Mech} \end{bmatrix} = \begin{bmatrix} -\sin\lambda_k^{Mech} & -\sin\varphi_k^{Mech}\cos\lambda_k^{Mech} & \cos\varphi_k^{Mech}\cos\lambda_k^{Mech} \\ \cos\lambda_k^{Mech} & -\sin\varphi_k^{Mech}\sin\lambda_k^{Mech} & \cos\varphi_k^{Mech}\sin\lambda_k^{Mech} \\ 0 & \cos\varphi_k^{Mech} & \sin\varphi_k^{Mech} \end{bmatrix} \begin{bmatrix} v_{e,k}^{Mech} \\ v_{n,k}^{Mech} \\ v_{u,k}^{Mech} \end{bmatrix}$$

and

-continued $$\begin{bmatrix} v_{x,k}^{Corr} \\ v_{y,k}^{Corr} \\ v_{z,k}^{Corr} \end{bmatrix} = R_{\ell,k}^{e,Corr} \begin{bmatrix} v_{e,k}^{Corr} \\ v_{n,k}^{Corr} \\ v_{u,k}^{Corr} \end{bmatrix} = \begin{bmatrix} -\sin(\lambda_k^{Mech} - \delta\lambda_k) & -\sin(\varphi_k^{Mech} - \delta\varphi_k) & \cos(\varphi_k^{Mech} - \delta\varphi_k) \\ \cos(\lambda_k^{Mech} - \delta\lambda_k) & -\sin(\varphi_k^{Mech} - \delta\varphi_k) & \cos(\lambda_k^{Mech} - \delta\lambda_k) \\ \cos(\lambda_k^{Mech} - \delta\lambda_k) & \sin(\lambda_k^{Mech} - \delta\lambda_k) & \sin(\lambda_k^{Mech} - \delta\lambda_k) \\ 0 & \cos(\varphi_k^{Mech} - \delta\varphi_k) & \sin(\varphi_k^{Mech} - \delta\varphi_k) \end{bmatrix} \begin{bmatrix} v_{e,k}^{Mech} - \delta v_{e,k} \\ v_{n,k}^{Mech} - \delta v_{n,k} \\ v_{u,k}^{Mech} - \delta v_{u,k} \end{bmatrix}$$

Furthermore, the mechanization version of the line of sight unit vector from $m^{th}$ detected object to radar receiver is expressed as follows:

$$1_k^{m,Mech} = \frac{[(x_k^{Mech} - x_k^m), (y_k^{Mech} - y_k^m), (z_k^{Mech} - z_k^m)]^T}{\sqrt{(x_k^{Mech} - x_k^m)^2 + (y_k^{Mech} - y_k^m)^2 + (z_k^{Mech} - z_k^m)^2}}$$
$$= [1_{x,k}^{m,Mech}, 1_{y,k}^{m,Mech}, 1_{z,k}^{m,Mech}]^T,$$

where the receiver position from mechanization is as defined above. The corrected (or estimated) version of the line of sight unit vector from $m^{th}$ detected object to radar receiver is expressed as follows:

$$1_k^{m,Corr} = \frac{[(x_k^{Corr} - x_k^m), (y_k^{Corr} - y_k^m), (z_k^{Corr} - z_k^m)]^T}{\sqrt{(x_k^{Corr} - x_k^m)^2 + (y_k^{Corr} - y_k^m)^2 + (z_k^{Corr} - z_k^m)^2}}$$
$$= [1_{x,k}^{m,Corr}, 1_{y,k}^{m,Corr}, 1_{z,k}^{m,Corr}]^T,$$

where the corrected receiver position is as defined above.

3.4.2 Example 2

Measurement Model for (1) Total-State System Model, (2) System Model with Another Integration Filter In the next example, whether in the case of a total state system model or a system model based on another integration filter or state estimation technique, the measurement model of the current nonlinear state estimation technique is a nonlinear model that relates the radar raw measurements (range measurements and range-rates) at a time epoch k, $z_k$, to the states at time k, $x_k$, and the measurement noise $\varepsilon_k$. Moreover, this also applies to a system model based on another integration filter solution. First, the radar raw measurements are $z_k = [\rho_{c,k}^{1,rad} \ldots \rho_{c,k}^{M,rad} \dot{\rho}_k^{1,rad} \ldots \dot{\rho}_k^{M,rad}]^T$ for M detected objects. The nonlinear measurement model can be in the form $z_k = h(x_k, \varepsilon_k)$, where $\varepsilon_k = [\tilde{\varepsilon}_{\rho,k}^1 \ldots \tilde{\varepsilon}_{\rho,k}^M \varepsilon_{\dot{\rho},k}^1 \ldots \varepsilon_{\dot{\rho},k}^M]^T$.

The part of the measurement model for the ranges is:

$$\begin{bmatrix} \rho_{c,k}^{1,rad} \\ \vdots \\ \rho_{c,k}^{M,rad} \end{bmatrix} = \begin{bmatrix} \sqrt{(x_k - x_k^1)^2 + (y_k - y_k^1)^2 + (z_k - z_k^1)^2} + \tilde{\varepsilon}_\rho^1 \\ \vdots \\ \sqrt{(x_k - x_k^M)^2 + (y_k - y_k^M)^2 + (z_k - z_k^M)^2} + \tilde{\varepsilon}_\rho^M \end{bmatrix},$$

where the radar receiver position is $$x_k = \begin{bmatrix} x_k \\ y_k \\ z_k \end{bmatrix} = \begin{bmatrix} (R_{N,k} + h_k)\cos\varphi_k\cos\lambda_k \\ (R_{N,k} + h_k)\cos\varphi_k\sin\lambda_k \\ \{R_{N,k}(1-e^2) + h_k\}\sin\varphi_k \end{bmatrix}$$

and $x_k^m = [x_k^m \; y_k^m \; z_k^m]^T$ is the position of the $m^{th}$ detected object. The measurement model for the range-rates is:

$$\begin{bmatrix} \dot{\rho}_k^{1,rad} \\ \vdots \\ \dot{\rho}_k^{M,rad} \end{bmatrix} = \begin{bmatrix} 1_{x,k}^1 \cdot (v_{x,k} - v_{x,k}^1) + 1_{y,k}^1 \cdot (v_{y,k} - v_{y,k}^1) + 1_{z,k}^1 \cdot (v_{z,k} - v_{z,k}^1) + \varepsilon_{\dot{\rho}}^1 \\ \vdots \\ 1_{x,k}^M \cdot (v_{x,k} - v_{x,k}^M) + 1_{y,k}^M \cdot (v_{y,k} - v_{y,k}^M) + 1_{z,k}^M \cdot (v_{z,k} - v_{z,k}^M) + \varepsilon_{\dot{\rho}}^M \end{bmatrix},$$

where
$v^m = [v_x^m, v_y^m, v_z^m]$ is the $m^{th}$ object velocity in the ECEF frame, and
$v = [v_x, v_y, v_z]$ is the true radar receiver velocity in the ECEF frame and thus:

$$\begin{bmatrix} v_{x,k} \\ v_{y,k} \\ v_{z,k} \end{bmatrix} = R_{\ell,k}^{e,Mech} \begin{bmatrix} v_{e,k} \\ v_{n,k} \\ v_{u,k} \end{bmatrix} = \begin{bmatrix} -\sin\lambda_k & -\sin\varphi_k\cos\lambda_k & \cos\varphi_k\cos\lambda_k \\ \cos\lambda_k & -\sin\varphi_k\sin\lambda_k & \cos\varphi_k\sin\lambda_k \\ 0 & \cos\varphi_k & \sin\varphi_k \end{bmatrix} \begin{bmatrix} v_{e,k} \\ v_{n,k} \\ v_{u,k} \end{bmatrix}$$

Furthermore, the line of sight unit vector from $m^{th}$ detected object to radar receiver is expressed as follows:

$$1_k^m = \frac{[(x_k - x_k^m), (y_k - y_k^m), (z_k - z_k^m)]^T}{\sqrt{(x_k - x_k^m)^2 + (y_k - y_k^m)^2 + (z_k - z_k^m)^2}}$$
$$= [1_{x,k}^m, 1_{y,k}^m, 1_{z,k}^m]^T,$$

where the receiver position is as defined above.

4 Radar-Based Updates

4.1 Radar Doppler Shift Update

In a further aspect, Doppler shift may be used as an update. It will be recognized that one of the main observables from the radar is the Doppler information associated with each target. This raw data is independent from the radar range estimation. The incoming frequency at the radar receiver is not exactly the frequency of the reflected signal by the target, but is shifted from the original value transmitted by the radar. This is called the Doppler shift and it is due to relative motion between the object/target and the radar receiver. The Doppler shift from the $m^{th}$ object is the projection of relative velocities (of object and receiver) onto the line of sight vector multiplied by the transmitted frequency and divided by the speed of light, and is given by $$D^m = \frac{\{(V^m - V) \cdot 1^m\} f_{tr}}{c},$$

where $v^m = [v_x^m, v_y^m, v_z^m]$ is the $m^{th}$ object velocity in the ECEF frame, $v = [v_x, v_y, v_z]$ is the true receiver velocity in the ECEF frame, $f_{tr}$ is the radar's transmitted frequency, and $$1^m = \frac{[(x - x^m), (y - y^m), (z - z^m)]^T}{\sqrt{(x - x^m)^2 + (y - y^m)^2 + (z - z^m)^2}} = [1_x^m, 1_y^m, 1_z^m]^T$$

is the true line of sight vector reflection from the $m^{th}$ object to the receiver.

Given that $D^m$ is a direct observable and $V^m$ and $f_{tr}$ (frequency of the transmitted signal) are known, the velocity V is the only unknown. The part of the measurement model for the range-rates is:

$$\begin{bmatrix} \dot{\rho}_k^{1,rad} \\ \vdots \\ \dot{\rho}_k^{M,rad} \end{bmatrix} = \begin{bmatrix} 1_{x,k}^1 \cdot (v_{x,k} - v_{x,k}^1) + 1_{y,k}^1 \cdot (v_{y,k} - v_{y,k}^1) + \\ 1_{z,k}^1 \cdot (v_{z,k} - v_{z,k}^1) + \varepsilon_{\dot{\rho}}^1 \\ \vdots \\ 1_{x,k}^M \cdot (v_{x,k} - v_{x,k}^M) + 1_{y,k}^M \cdot (v_{y,k} - v_{y,k}^M) + \\ 1_{z,k}^M \cdot (v_{z,k} - v_{z,k}^M) + \varepsilon_{\dot{\rho}}^M \end{bmatrix},$$

where $v^m = [v_x^m, v_y^m, v_z^m]$ is the $m_{th}$ object velocity in the ECEF frame, and
$v = [v_x, v_y, v_z]$ is the true radar receiver velocity in the ECEF frame and thus:

$$\begin{bmatrix} v_{x,k} \\ v_{y,k} \\ v_{z,k} \end{bmatrix} = R_{\ell,k}^{e,Mech} \begin{bmatrix} v_{e,k} \\ v_{n,k} \\ v_{u,k} \end{bmatrix} = \begin{bmatrix} -\sin\lambda_k & -\sin\varphi_k \cos\lambda_k & \cos\varphi_k \cos\lambda_k \\ \cos\lambda_k & -\sin\varphi_k \sin\lambda_k & \cos\varphi_k \sin\lambda_k \\ 0 & \cos\varphi_k & \sin\varphi_k \end{bmatrix} \begin{bmatrix} v_{e,k} \\ v_{n,k} \\ v_{u,k} \end{bmatrix}$$

Furthermore, the line of sight unit vector from $m^{th}$ detected object to radar receiver is expressed as follows:

$$1_k^m = \frac{[(x_k - x_k^m), (y_k - y_k^m), (z_k - z_k^m)]^T}{\sqrt{(x_k - x_k^m)^2 (y_k - y_k^m)^2 + (z_k - z_k^m)^2}}$$
$$= [1_{x,k}^m, 1_{y,k}^m, 1_{z,k}^m]^T$$

where the receiver position is as defined above.

This absolute update from the radar may be used in conjunction with the probabilistic measurement models, namely the range-based model, the Nearest-Object Likelihood model or the radar map matching model to influence the importance weight of the particles.

4.2 Radar/Map-Based Positioning

The above discussion of state estimation has included integrating radar observables (ranges and Doppler shifts) with MEMS-based sensors using a tightly-coupled approach for state estimation. In a further aspect, the radar scans and the map may be used to estimate the state of the platform in the global frame at any given time and then integrating the radar estimated states with MEMS-based sensors using loosely-coupled integration approach. The map may include a feature-based map, location-based map or both. The position of the vehicle maybe estimated by matching the current scan of the radar with a surveyed database of scans, where each scan is associated with a state. The scan that results in the highest match indicator (e.g., correlation factor) can be used to infer the state of the vehicle estimated by the radar/map integration. Another approach is to use unique features in the map that can be detected by the radar, and once detected, a position can be inferred. For example, if the radar detects a very specific distribution of road signs across its field of view, the equivalent geometric distribution of signs can be searched for in the map and thereby infer position based on the radar map match, previous estimate of the platform position and other constraints. Motion constraints like non-holonomic constraints can be applied to limit the search space for a match within the map.

These loosely-coupled approaches may be employed with the error-state or the total-state system model. In the case of error-state system model, the loosely-coupled integration uses position and velocity updates from the radar/map estimator. Thus the measurements are given as $z_k = [\varphi_k^{rad} \lambda_k^{rad} h_k^{rad} v_k^{E,rad} v_k^{N,rad} v_k^{U,rad}]^T$, which consists of the radar readings for the latitude, longitude, altitude, and velocity components along East, North, and Up directions respectively. The measurement model can therefore be given as $$\delta z_k = \begin{bmatrix} \delta z_k^\varphi \\ \delta z_k^\lambda \\ \delta z_k^h \\ \delta z_k^{v_e} \\ \delta z_k^{v_n} \\ \delta z_k^{v_u} \end{bmatrix} = h(\delta x_k, v_k) = \begin{bmatrix} \varphi_k^{Mech} - \varphi_k^{rad} \\ \lambda_k^{Mech} - \lambda_k^{rad} \\ -h_k^{Mech} - h_k^{rad} \\ v_k^{E,Mech} - v_k^{E,rad} \\ v_k^{N,GPS} - v_k^{N,rad} \\ v_k^{U,GPS} - v_k^{U,rad} \end{bmatrix} + \begin{bmatrix} v_k^\varphi \\ v_k^\lambda \\ v_k^h \\ v_k^E \\ v_k^N \\ v_k^U \end{bmatrix},$$

where $v_k = [v_k^\varphi v_k^\lambda v_k^h v_k^{v_e} v_k^{v_n} v_k^{v_u} v_k^p v_k^r]^T$ is the noise in the radar observations used for update.

In the case of total-state system model, the loosely-coupled integration uses position and velocity updates from the radar/map estimator. Thus, the measurements are given as $$z_k = \begin{bmatrix} z_k^\varphi \\ z_k^\lambda \\ z_k^h \\ z_k^{v_e} \\ z_k^{v_n} \\ z_k^{v_u} \end{bmatrix} = h(x_k, v_k) = \begin{bmatrix} \varphi_k^{rad} \\ \lambda_k^{rad} \\ h_k^{rad} \\ v_k^{E,rad} \\ v_k^{N,rad} \\ v_k^{U,rad} \end{bmatrix} + \begin{bmatrix} v_k^\varphi \\ v_k^\lambda \\ v_k^h \\ v_k^E \\ v_k^N \\ v_k^U \end{bmatrix},$$

where $v_k = [v_k^\varphi v_k^\lambda v_k^h v_k^{v_e} v_k^{v_n} v_k^{v_u} v_p^k v_r^k]^T$ is the noise in the radar observations used for update.

4.3 Radar-Based Relative Updates (Object Flow Analysis)

Figure 15:
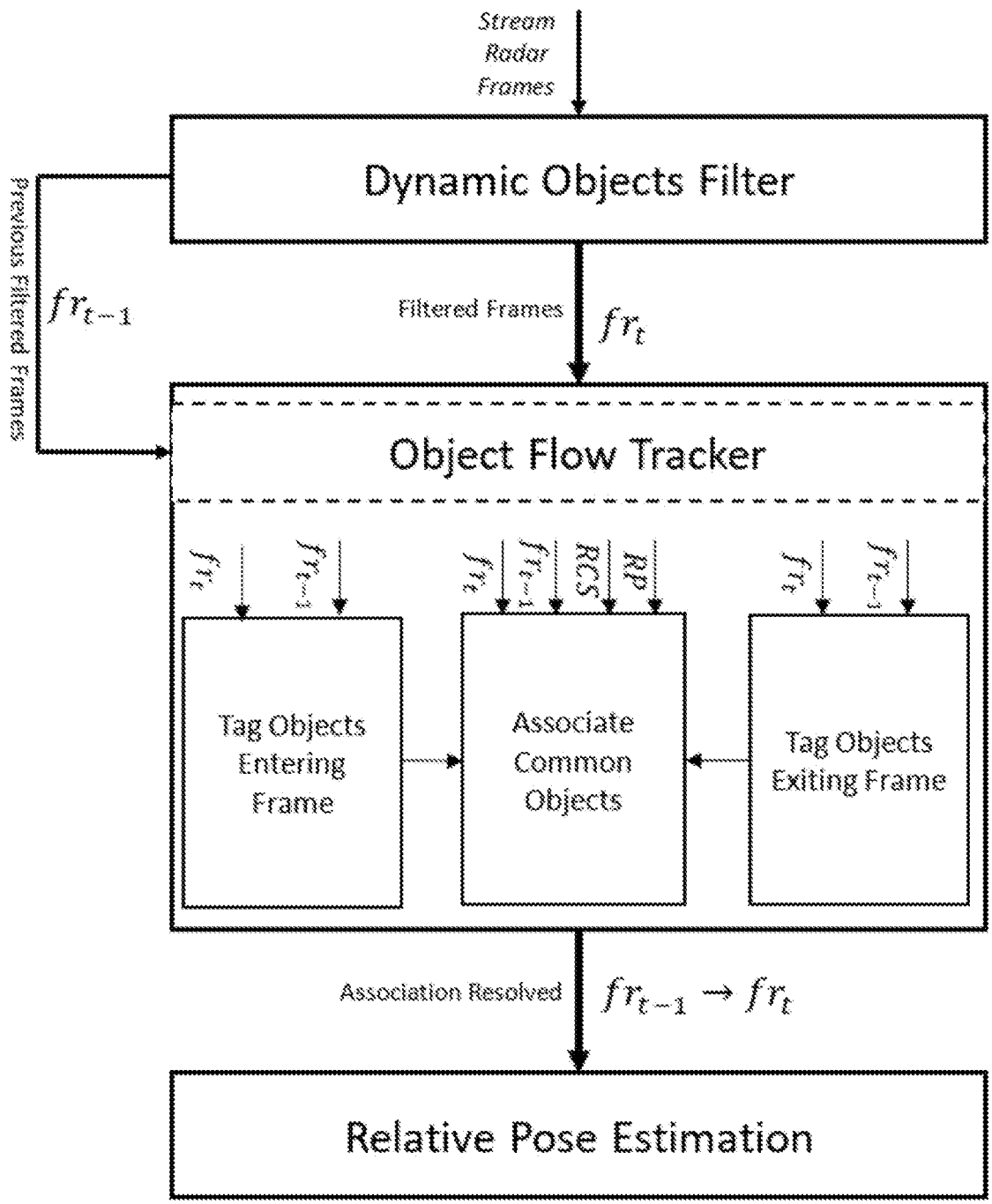
FIG. 15 is a schematic diagram of a radar-based object flow analysis according to an embodiment.

In one aspect, radar measurements may be used to estimate a relative update (or pose) for the platform by performing a flow analysis on the radar measurements. This update may be fused with the inertial measurements and GNSS measurements to estimate more accurate states. One suitable architecture is schematically depicted in FIG. 15. The first step of this system is a block that filters out all moving objects from the radar frame. A radar frame is defined as a full radar scan of the field of view. The filtered radar frame consists of the centroids of static objects detected by the radar. The second step is to link the same objects between frames to one another based on different measurement characteristics like Radar Cross Section (RCS) and Reflected Power of each object in the frame.

The second block is the Object Flow Tracker step which tracks objects in the present frame denoted by $fr_t$ compared to objects in previous frame denoted by $fr_{t-1}$. This is the association/corresponds step that tags objects that exist in $fr_{t-1}$ but not in $fr_t$ as objects exiting the frame. In addition, the association step should also tag objects that exist in $fr_t$ frame but not in $fr_{t-1}$ as objects that are entering the present frame and may be used to help in estimating the next platform state. Finally, only objects that are present in $fr_t$ and $fr_{t-1}$ may be tagged as objects relevant to the relative update estimation at time t.

After resolving the association problem between objects in previous and current frame, the next step is to compute the magnitude and direction of the movement of static objects in the present frame relative to the previous frame. The Relative Pose Estimation step estimates a relative update between the two frames (i.e., change in vehicle's pose within time [t,t−1]) based on the information about the movement of static objects in the present frame relative the previous frame.

4.4 Radar Doppler-Based Relative Updates

Doppler information relative to static objects may be used to estimate a relative update between two radar frames. A radar frame is defined as a full scan of Dopplers across the field of view of the radar. The first step is to filter all moving targets (like vehicles and pedestrians) using Doppler information and the odometer speed of the vehicle. The output of the first step is a frame containing all static detected objects and associated with each object is the Doppler relative to the host vehicle.

The next step utilizes the relative Doppler of the static objects in the current frame to estimate the change in the platform's states. Hence, the Relative Pose Estimation step estimates a relative update between the two frames (i.e., change in vehicle's pose within time [t,t−1]) based on the information about the relative Doppler of static objects in the present frame.

5 Misalignment Detection and Estimation

In yet another aspect, the techniques of this disclosure may be applied to detect and determine misalignment. As noted above, misalignment may refer to either a mounting misalignment when the device is strapped to the platform or a varying misalignment when the device is non-strapped. Thus, an optional misalignment procedure may be performed to calculate the relative orientation between the frame of the sensor assembly (i.e. device frame) and the frame of the moving platform. The following discussion includes four specific, non-limiting examples.

The device heading, pitch, and roll (attitude angles of the device) can be different than the heading, pitch, and roll of the platform (attitude angles of the platform) and to get a navigation solution for the platform and/or device (processed on the device) with accuracy, the navigation algorithm should have the information about the misalignment as well as the absolute attitude of the platform. This misalignment detection and estimation is intended to enhance the navigation solution. To improve the navigation by applying constraints on the motion of the moving platform (for example in the form of specific updates), the platform attitude angles must be known. Since the device attitude angles are known, the misalignment angles between the device and platform frame are required to obtain the platform attitude angles. If the misalignment angles are known the below constraints are examples of what can be implemented to constrain the navigation solution especially during long absolute velocity outages (such as GNSS signals outages). Exemplary usages include nonholonomic constraints, vehicular dead reckoning, and any other position or velocity constraint that may be applied to the platform after the resolution of the attitude.

Example 1

Heading Misalignment Using Absolute Velocity Updates

In a first example, absolute velocity updates are used to estimate heading misalignment. In order to calculate the portable device heading from gyroscopes an initial heading of the device has to be known. If an absolute velocity source (such as from GNSS) is not available (for example because of interruption) but a magnetometer is available and with adequate readings, it will be used to get the initial device heading. If an absolute velocity source is available and if a magnetometer is not available or not with adequate readings, the velocity source will be used to get the initial heading of the moving platform, and a routine is run to get the initial heading misalignment of the portable device with respect to the moving platform (which is described below), then the initial device heading can be obtained. If an absolute velocity source is available and if a magnetometer is available and with adequate readings, a blended version of the initial device heading calculated from the above two options can be formed.

This example details a suitable routine to get the initial heading misalignment of the portable device with respect to the moving platform if an absolute velocity source is available (such as GNSS). This routine needs: (i) a very first heading of the platform (person or vehicle or other) that can be obtained from the source of absolute velocity provided that the device is not stationary, (ii) the source of absolute velocity to be available for a short duration such as for example about 5 seconds.

The procedure of this routine is to use the absolute velocity in the local level frame to generate acceleration in the local level frame, add gravity acceleration from a gravity model, then use the pitch and roll together with different heading values (device heading corrected for different heading misalignment values) to calculate the accelerations (more literally the specific forces) in the estimated sensor frame. The different heading misalignments are first chosen to cover all the 360 degrees ambiguity. The actual accelerometer readings, after being corrected for the sensor errors (such as biases, scale factors and non-orthogonalities), are compared to all the different calculated ones (example of techniques that can be used here are correlation techniques). A best sector of possible heading misalignments is chosen and divided into more candidates of heading misalignment in this sector. Different accelerations in the estimated sensor frame are generated and again compared to the actual sensor readings. The operation continues either until the accuracy of the solution saturates and no longer improves or until a pre-chosen depth of comparisons is received.

As mentioned above, if an absolute velocity source (such as from GNSS) is not available (for example because of interruption) but a magnetometer is available and with adequate readings, it will be used to get the initial device heading. If an absolute velocity source is available and if a magnetometer is not available or not with adequate readings, the velocity source will be used to get the initial heading of the moving platform when it starts moving as $A_k^{platform}$=a tan $2(v_k^e, v_k^n)$, where k in general is the time index of the absolute velocity readings, and k=0 for the first reading. A routine is run to get the initial heading misalignment of the portable device with respect to the moving platform $\Delta A_{initial}$ (this routine is described below), then the initial device heading is obtained as $A_{initial}^{device} = A_{initial}^{platform} - \Delta A_{initial}$, where a magnetometer is available and with adequate readings, a better blended version of the initial device heading calculated from the above-mentioned two options can be formed The routine needs the track of heading of the platform (vehicle or other) during a short period (such as for example, of about 5 seconds), but there are almost no constraints on platform motion during this period except that the platform cannot be stationary the whole period, but temporary static period is accepted. This heading can be obtained by either one of the following:

i) the first heading of the platform that can be obtained from the source of absolute velocity provided that the platform is not stationary, this heading is followed (for example) by a gyroscope-based calculation of heading to keep track of the platform heading if the device misalignment with respect to the platform is kept near constant (might slightly change but does not undergo big changes).

ii) the track of absolute heading of the platform might be obtained from the absolute source of velocity during the short period during which this routine will run. If during this period the platform stops temporarily the last heading is used for the temporary stop period.

The routine also needs the source of absolute velocity to be available for the same short period discussed above. This means that $v_k^e$, $v_k^n$, and $v_k^u$ have to be available during this short period, at whatever data rate this absolute source provides.

The first step of this routine is to use the absolute velocity in the local level frame to generate acceleration in the local level frame $$a_k^e = \frac{v_k^e - v_{k-1}^e}{\Delta t}$$

$$a_k^n = \frac{v_k^n - v_{k-1}^n}{\Delta t}$$

-continued $$a_k^u = \frac{v_k^u - v_{k-1}^u}{\Delta t},$$

where $\Delta t$ is the sampling rate of the absolute velocity source. The next step is to add gravity acceleration from a gravity model to get specific forces in the local level frame $$\begin{bmatrix} f_k^e \\ f_k^n \\ f_k^u \end{bmatrix} = \begin{bmatrix} a_k^e \\ a_k^n \\ a_k^u \end{bmatrix} + \begin{bmatrix} 0 \\ 0 \\ g_k \end{bmatrix}$$

and then use the pitch $p_k^{device}$ and roll $r_k^{device}$ together with different candidate device heading values (calculated from the platform heading corrected for different candidate heading misalignment values) to calculate the accelerations (more literally the specific forces) in the estimated candidate sensor frame. Different heading misalignments are first chosen to cover all the 360 degrees ambiguity, for example, if the heading space is divided equally to 8 options, the following misalignments are the possible candidates to use $$\Delta A^{candidate} \text{ one from } \left[-\text{pi} \; \frac{-3\text{pi}}{4} \; \frac{-\text{pi}}{2} \; \frac{-\text{pi}}{4} \; 0 \; \frac{\text{pi}}{4} \; \frac{\text{pi}}{2} \; \frac{3\text{pi}}{4}\right]$$

$$A_k^{device} = A_k^{platform} - \Delta A^{candidate}.$$

A rotation matrix for conversion from the device frame (i.e. the accelerometer frame) to the local level (ENU) frame may be used as follows $$\begin{bmatrix} \cos A_k^{device} \cos r_k^{device} + & & \cos A_k^{device} \sin r_k^{device} - \\ \sin A_k^{device} \sin p_k^{device} \sin r_k^{device} & \sin A_k^{device} \cos p_k^{device} & \sin A_k^{device} \sin p_k^{device} \cos r_k^{device} \\ -\sin A_k^{device} \cos r_k^{device} + & & -\sin A_k^{device} \sin r_k^{device} - \\ \cos A_k^{device} \sin p_k^{device} \sin r_k^{device} & \cos A_k^{device} \cos p_k^{device} & \cos A_k^{device} \sin p_k^{device} \cos r_k^{device} \\ -\cos p_k^{device} \sin r_k^{device} & \sin p_k^{device} & \cos p_k^{device} \cos r_k^{device} \end{bmatrix}$$

which exhibits the following relation:

$$\begin{bmatrix} f_k^{x,candidate} \\ f_k^{y,candidate} \\ f_k^{z,candidate} \end{bmatrix} = (R_{device,k}^e)^T \begin{bmatrix} f_k^e \\ f_k^n \\ f_k^u \end{bmatrix}$$

The actual accelerometers readings are $[f_j^x \; f_j^y \; f_j^z]^T$ where j is the timing index for the higher rate inertial readings (preferably these accelerometers readings are used after removal of the estimated sensor errors). These actual sensors readings are down-sampled to the relatively lower rate of the absolute velocity readings, for example, either by averaging or by dropping of the extra samples. The down-sampled version of these actual accelerometer readings are compared to all the different candidate accelerometer readings (example of comparison techniques that can be used here are correlation techniques some of which can be bias independent, differencing or calculating root mean squared (RMS) errors). A best sector of possible heading misalignments is chosen and divided into further candidates of heading misalignment in this sector.

For example, if the best sector was from a misalignment of $$\frac{-3\,\text{pi}}{4}$$

to a misalignment of $$\frac{-\text{pi}}{2},$$

this range will be further divided into 8 new candidates as provided below:

$\Delta A^{candidate}$ one from $$\left[\frac{-3\,\text{pi}}{4}\ \frac{-20\,\text{pi}}{28}\ \frac{-19\,\text{pi}}{28}\ \frac{-18\,\text{pi}}{28}\ \frac{-17\,\text{pi}}{28}\ \frac{-16\,\text{pi}}{28}\ \frac{-15\,\text{pi}}{28}\ \frac{-\text{pi}}{2}\right].$$

Then the previously described operations are repeated. Different candidate accelerations (or more literally specific forces) in the estimated sensor frame are generated and again compared to the down-sampled actual sensor readings. The operation continues either until the accuracy of the solution saturates and no longer improves or until a specific pre-chosen depth of comparison is achieved. An estimate of the misalignment between the portable device heading and the platform heading is obtained as the best $\Delta A^{candidate}$ together with an indication or measure of its accuracy from the depth of divisions the technique had undergone and the step separation of the last candidate pool for the misalignment. Thus, the initial device heading (that will be used to start the full navigation in this case) is computed from the platform heading and the estimated initial misalignment.

Example 2

Heading Misalignment Using Radius of Rotation

In the next example, the misalignment between a device and a platform may be determined from the radius of rotation of the device, utilizing motion sensor data in the presence or in the absence of absolute navigational information updates. Details regarding suitable techniques may be found in commonly-owned U.S. patent application Ser. No. 14/917,730, filed Mar. 9, 2016, which is hereby incorporated by reference in its entirety.

Example 3

Heading Misalignment Using Acceleration and Deceleration

In another example, the misalignment between a device and a platform may be determined from acceleration and/or deceleration of the platform, utilizing motion sensor data in the presence or in the absence of absolute navigational information updates. Details regarding suitable techniques may be found in commonly-owned U.S. Pat. No. 9,797,727, issued Oct. 24, 2017, which is hereby incorporated by reference in its entirety.

Example 4

Pitch Misalignment Using Absolute Velocity Updates

In a last illustrative example, absolute velocity updates may be used to estimate pitch misalignment. The device pitch angle can be different than the pitch angle of the platform because of mounting misalignment or varying misalignment when the device is non-strapped. To enhance the navigation solution, the pitch misalignment angle is calculated. By definition, pitch misalignment angle is the difference between the device pitch angle and the pitch angle of the platform. To calculate the pitch misalignment angle, a state estimation technique is used. One potential example of a system model that can be used is a Gauss-Markov process, while measurements are obtained from GNSS velocity and accelerometers measurements and applied as a measurement update through the measurement model. One suitable technique employs the following equations, where measurements are the difference between system and GNSS pitch angles:

$$\text{measurement} = pitch_{system} - pitch_{GPS}$$

$$pitch_{system} = \tan^{-1}\left(\frac{f_y - a_{GNS}}{\sqrt{f_x^2 + f_z^2}}\right)$$

$$a_{GPS} = \frac{\left(\sqrt{v_{up}^2 + v_{east}^2 + v_{north}^2}\right)_{current} - \left(\sqrt{v_{up}^2 + v_{east}^2 + v_{north}^2}\right)_{previous}}{\Delta t}$$

$$pitch_{GPS} = \tan^{-1}\left(\frac{v_{up}^2}{\sqrt{v_{east}^2 + v_{north}^2}}\right)$$

System pitch angle is calculated using accelerometers readings (where $f_y$ is forward accelerometer reading, $f_x$ is lateral accelerometer reading, and $f_z$ is vertical accelerometer reading) and a calculated forward acceleration of the platform. The calculated forward acceleration of the platform can be either from, for example, GNSS velocity measurements (as in the above example) or from odometer speed measurements as another example. As an example, GNSS pitch angle is calculated using GNSS velocity measurements only. Obtaining a measurement and system model, a dedicated Kalman filter or particle filter can be used to obtain the final pitch misalignment angle of the system. Another option to obtain the pitch misalignment angle of the system is to use the described measurement and system models as a part of the larger system and measurement of the main integrated navigation filter (whether Kalman or Particle filter for example) and amending the states of that main filter to include the above described pitch misalignment state. A similar technique may also be applied to obtain roll misalignment.

6 Other Optional Observations

Still further aspects of this disclosure relate to using other observables, including information from a GNSS positioning system and an odometer, as measurement updates in the state estimation technique when integrating the radar measurements and the motion sensor data. These optional observations may be used to estimate a more accurate state.

Three main types of INS/GNSS integration have been proposed to attain maximum advantage depending upon the type of use and choice of simplicity versus robustness, leading to three main integration architectures, loosely coupled, tightly coupled and ultra-tightly (or deeply) coupled. Loosely coupled integration uses an estimation technique to integrate inertial sensors data with the position and velocity output of a GNSS receiver. The distinguishing feature of this configuration is a separate filter for the GNSS and is an example of cascaded integration because of the two filters (GNSS filter and integration filter) used in sequence. Tightly coupled integration uses an estimation technique to integrate inertial sensors readings with raw GNSS data (i.e. pseudoranges that can be generated from code or carrier phase or a combination of both, and pseudorange rates that can be calculated from Doppler shifts) to get the vehicle position, velocity, and orientation. In this solution, there is no separate filter for GNSS, but there is a single common master filter that performs the integration. For the loosely coupled integration scheme, at least four satellites are needed to provide acceptable GNSS position and velocity input to the integration technique. The advantage of the tightly coupled approach is that less than four satellites can be used as this integration can provide a GNSS update even if fewer than four satellites are visible, which is typical of a real life trajectory in urban environments as well as thick forest canopies and steep hills. Another advantage of tightly coupled integration is that satellites with poor GNSS measurements can be detected and rejected from being used in the integrated solution. Ultra-tight (deep) integration has two major differences with regard to the other architectures. Firstly, there is a basic difference in the architecture of the GNSS receiver compared to those used in loose and tight integration. Secondly, the information from INS is used as an integral part of the GNSS receiver, thus, INS and GNSS are no longer independent navigators, and the GNSS receiver itself accepts feedback. It should be understood that the present navigation solution may be utilized in any of the foregoing types of integration.

It is to be noted that the state estimation or filtering techniques used for inertial sensors/GNSS integration may work in a total-state approach or in an error state approach, each of which has characteristics described above. It would be known to a person skilled in the art that not all the state estimation or filtering techniques can work in both approaches.

To help illustrate these above concepts, a first error state system model and total-state system model examples are described below that integrate absolute navigational information with an error-state system model. In these present examples, a three-dimensional (3D) navigation solution is provided by calculating 3D position, velocity and attitude of a moving platform. The relative navigational information includes motion sensor data obtained from MEMS-based inertial sensors consisting of three orthogonal accelerometers and three orthogonal gyroscopes, such as sensor assembly 106 of device 100 in FIG. 1. A source of absolute navigational information 116 is also used and host processor 102 may implement integration module 114 to integrate the information using a nonlinear state estimation technique, such as for example, Mixture PF. The reference-based absolute navigational information 116, such as from a GNSS receiver, and the motion sensor data, such as from sensor assembly 102, are integrated using Mixture PF in either a loosely coupled, tightly coupled, or hybrid loosely/tightly coupled architecture, having a system and measurement model, wherein the system model is either a nonlinear error-state system model or a nonlinear total-state model without linearization or approximation that are used with the traditional KF-based solutions and their linearized error-state system models. The filter may optionally be programmed to comprise advanced modeling of inertial sensors stochastic drift. If the filter has the last option, it may optionally be further programmed to use derived updates for such drift from GNSS, where appropriate. The filter may optionally be programmed to automatically detect and assess the quality of GNSS information, and further provide a means of discarding or discounting degraded information. The filter may optionally be programmed to automatically select between a loosely coupled and a tightly coupled integration scheme. Moreover, where tightly coupled architecture is selected, the GNSS information from each available satellite may be assessed independently and either discarded (where degraded) or utilized as a measurement update. In these examples, the navigation solution of the device, whether tethered or non-tethered to the moving platform, is given by $x_k = [\phi_k, \lambda_k, h_k, v_k^E, v_k^N, v_k^U, p_k, r_k, A_k]^T$, where $\phi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle.

Correspondingly, the techniques of this disclosure may involve integration of GNSS with an error-state system model or a total-state system model as desired. As will be appreciated, architectures in which the measurement model is loosely-coupled or tightly-coupled may be used, as well as hybrid loosely/tightly coupled schemes.

7 Additional Optional Modules

Still further aspects of this disclosure relate to optional operations or modules that can be utilized with the techniques described above. The following section gives non-limiting examples of some of these options.

7.1 Radar-Based Simultaneous Localization and Mapping

Further, a radar-based Simultaneous Localization and Mapping (SLAM) process can be incorporated with the techniques of this disclosure. As will be appreciated, SLAM involves determining position information for the platform while building a map. It is assumed that a map is not provided and hence the absolute position of objects is unknown. Thus, the state of the platform and the map which contains an object list are unknown. A practical solution to this problem is to utilize Graph-SLAM algorithms to estimate the state of the platform and build the map as a list of landmarks. In a Graph based SLAM, the nodes in the graph represent the different states of the platform and the links between the nodes depict the constraints set by the motion sensors. Moreover, landmarks are also represented as nodes, and the link between landmarks and the platform's state node at time t represents the distance constraints. The SLAM equations are solved by finding the optimal state of nodes (i.e., position, attitude), such that all constraints are met. There are also several techniques utilized by Graph-SLAM to incorporate the uncertainty of the motion model and the measurement model into the SLAM equations. It is also assumed that the initial state of the platform is known.

Moreover, Online Graph-SLAM can be used to reduce the complexity of the graph by removing older states and keeping only one node to represent the current state of the vehicle.

The radar scans along with the object detection module can be used to estimate the distance to the centroid of the objects within the radar's field of view. Other characteristics of the reflected RF signal at a certain angle like power of the signal, Radar-Cross-Section (RCS), relative Doppler frequency and so forth can be used to track objects and provide unique identifiers for static objects. It may also be desirable to filter moving objects using the relative Doppler information detected by the radar. The motion can be used to predict the next state of the vehicle, hence, the Euclidian distance between the current state and the previous state can be used to link both nodes in the graph. The uncertainty of the motion model can be propagated to the Euclidian distance computation and used to modulate the importance of links between poses in the graph. Moreover, the measurement model uncertainty can be propagated to the distance between the landmark and the current state and used to modulate the importance of links between the current states and detected landmarks.

7.2 Augmenting Radar Signature Map with Reflected Power

In yet another aspect, a radar signature map may be updated with reflected power information. Using radar measurements, a mapping vehicle or other platform can be used to build an occupancy grid or a 3D model of the world (i.e., global map). Measurements are associated with an accurate position of the platform. This map can later be used for localization purposes, for example by finding the best match between the local map created by radar and the global map. The best match is associated with a position, and this position is inferred to be the current position of the platform. In many occasions, multiple good matches may be found that do not discriminate the best match (for example, if the correlation indicator between the global map and the local map is very close for several matches).

To resolve the issue of multiple matches, the reflected power with each measurement from the radar sensor may be recorded in the mapping process. In other words, when the map is built, in addition to recording the range, elevation, azimuth and the accurate state of the platform, the reflected power information from the object is also recorded for storage in the map (this reflected power is unique to the state of the platform). This takes advantage of the fact that different materials in the environment surrounding the platform reflect the RF signals with different magnitude in the direction of the radar sensor. For example, metals reflect most of the power from the radar, while wood hardly reflects anything. Moreover, the orientation of a metal object with respect to the radar RF signal also contributes to how much power is reflected in the direction of the radar. Therefore, the reflected power can be used as a third or fourth dimension for 2D or 3D occupancy grids respectively. By using reflected power, ambiguity as to what the state of the platform should be may be reduced (this reduces the possibility of generating many good matches between the local map and the global map).

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency are assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available) in addition to the different core use of map information discussed above, and a map matching or model matching routine. Map matching or model matching can further enhance the navigation solution during the absolute navigational information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigational information problems (degradation or absence), or they can totally replace the absolute navigational information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMAX. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for providing feedback for map information using an integrated navigation solution for a device within a moving platform, the method comprising:
    a) obtaining motion sensor data from a sensor assembly of the device,
    b) obtaining radar measurements for the platform;
    c) obtaining map information for an environment encompassing the platform;
    d) generating an integrated navigation solution based at least in part on the obtained motion sensor data using a nonlinear state estimation technique, wherein a prediction phase involving a system model is used to propagate predictions about a state of the platform and an update phase involving at least one measurement model relating measurements to the state is used to update the state of the platform, wherein the nonlinear state estimation technique comprises using a nonlinear measurement model for radar measurements, wherein integrating the motion sensor data and the radar measurements in the nonlinear state estimation technique is tightly-coupled, and wherein the generating comprises:
  i) using the obtained motion sensor data in the nonlinear state estimation technique; and
  ii) integrating the radar measurements directly by updating the nonlinear state estimation technique using the nonlinear measurement models and the map information;
e) assessing the map information based at least in part on the integrated navigation solution and radar measurements; and
f) providing feedback for the map information based on the assessment.

2. The method of claim 1, wherein the measurement model comprises at least one of:
  a) a radar range-based model based at least in part on a probability distribution of measured ranges using an estimated state of the platform and the map information;
  b) a radar nearest object likelihood model based at least in part on a probability distribution of distance to an object detected using the radar measurements, an estimated state of the platform and a nearest object identification from the map information;
  c) a radar map matching model based at least in part on a probability distribution derived by correlating a global map derived from the map information to a local map generated using the radar measurement and an estimated state of the platform; and
  d) a radar closed-form model based at least in part on a relation between an estimated state of the platform and ranges to objects from the map information derived from the radar measurements.

3. The method of claim 2, wherein the nonlinear measurement model further comprises models for radar-related errors comprising any one or any combination of environmental errors, sensor-based errors and dynamic errors.

4. The method of claim 1, wherein the nonlinear state estimation technique comprises at least one of:
  a) an error-state system model;
  b) a total-state system model, wherein the integrated navigation solution is output directly by the total-state model; and
  c) a system model receiving input from an additional state estimation technique that integrates the motion sensor data.

5. The method of claim 1, wherein assessing the map information is performed over successive epochs of radar measurements.

6. The method of claim 1, wherein assessing the map information comprises comparing objects detected using the radar measurements with objects from the map information.

7. The method of claim 6, wherein the comparing comprises at least one of:
  a) determining that at least one object detected using the radar measurements is missing from the map information;
  b) determining that at least one object from the map information is not detected by the radar measurements;
  c) determining a correspondence between an object detected using the radar measurements and an object from the map information;
  d) determining correspondence between an object detected using the radar measurements and an object from the map information, wherein the radar measurements indicate a difference in a characteristic of the corresponding objects; and
  e) determining correspondence between an object detected using the radar measurements and an object from the map information, wherein the radar measurements indicate a difference in a characteristic of the corresponding objects and the characteristic is at least one of position, orientation, dimension and reflected power.

8. The method of claim 1, wherein assessing the map information comprises at least one of:
  a) identifying at least one error in the map information;
  b) determining that at least one change has occurred in the map information; and
  c) determining an improvement for the map information.

9. The method of claim 8, wherein providing feedback for the map information comprises at least one of:
  a) wherein assessing the map information comprises identifying at least one error in the map information, marking at least one identified error in the map information;
  b) wherein assessing the map information comprises identifying at least one error in the map information, correcting at least one identified error in the map information;
  c) wherein assessing the map information comprises determining that at least one change has occurred in the map information, marking at least one determined change in the map information;
  d) wherein assessing the map information comprises determining that at least one change has occurred in the map information, updating at least one determined change in the map information;
  e) rebuilding at least a portion of the map information for an area;
  f) wherein assessing the map information comprises determining an improvement for the map information, increasing resolution of at least a portion of the map information;
  g) wherein assessing the map information comprises determining an improvement for the map information, increasing resolution of at least a portion of the map information, wherein the increased resolution is based at least in part on the integrated navigation solution;
  h) wherein assessing the map information comprises determining an improvement for the map information, increasing accuracy of at least a portion of the map information; and
  i) wherein assessing the map information comprises determining an improvement for the map information, increasing accuracy of at least a portion of the map information, wherein the increased accuracy is based at least in part on the integrated navigation solution.

10. The method of claim 1, wherein assessing the map information comprises distinguishing between errors in the radar measurements and errors in the map information.

11. The method of claim 1, further comprising integrating a source of absolute navigational information with the integrated navigation solution.

12. The method of claim 1, further comprising integrating with the integrated navigation solution information from at least one of:
  a) an odometer or means for obtaining platform speed;
  b) a pressure sensor; and
  c) a magnetometer.

13. A system for providing feedback for map information using an integrated navigation solution for a device within a moving platform, comprising:
- a) a device having a sensor assembly configured to output motion sensor data;
- b) a radar configured to output radar measurements for the platform; and
- c) at least one processor, coupled to receive the motion sensor data, the radar measurements, and map information for an environment encompassing the platform, and operative to:
  - i) generate an integrated navigation solution based at least in part on the motion sensor data using a nonlinear state estimation technique, wherein a prediction phase involving a system model is used to propagate predictions about a state of the platform and an update phase involving at least one measurement model relating measurements to the state is used to update the state of the platform, wherein the nonlinear state estimation technique comprises using a nonlinear measurement model for radar measurements, wherein integrating the motion sensor data and the radar measurements in the nonlinear state estimation technique is tightly-coupled, and wherein the at least one processor generates the integrated navigation solution by:
    - A) using the obtained motion sensor data in the nonlinear state estimation technique; and
    - B) integrating the radar measurements directly by updating the nonlinear state estimation technique using the nonlinear measurement models and the map information; and
  - ii) assess the map information based at least in part on the integrated navigation solution and radar measurements; and
  - iii) provide feedback for the map information based at least in part on the assessment.

14. The system of claim 13, wherein the measurement model comprises at least one of:
- a) a radar range-based model based at least in part on a probability distribution of measured ranges using an estimated state of the platform and the map information;
- b) a radar nearest object likelihood model based at least in part on a probability distribution of distance to an object detected using the radar measurements, an estimated state of the platform and a nearest object identification from the map information;
- c) a radar map matching model based at least in part on a probability distribution derived by correlating a global map derived from the map information to a local map generated using the radar measurement and an estimated state of the platform; and
- d) a radar closed-form model based at least in part on a relation between an estimated state of the platform and ranges to objects from the map information derived from the radar measurements.

15. The system of claim 13, wherein the nonlinear state estimation technique comprises at least one of:
- a) an error-state system model;
- b) a total-state system model, wherein the integrated navigation solution is output directly by the total-state model; and
- c) a system model receiving input from an additional state estimation technique that integrates the motion sensor data.

16. The system of claim 13, wherein the at least one processor is operative to provide feedback for the map information by performing at least one of:
- a) correcting at least one identified error in the map information;
- b) updating at least one determined change in the map information; and
- c) improving the map information.

17. The system of claim 13, wherein the sensor assembly includes an accelerometer and a gyroscope.

18. The system of claim 17, wherein the sensor assembly is implemented as a Micro Electro Mechanical System (MEMS).

19. The system of claim 13, further comprising a source of absolute navigational information.

20. The system of claim 13, further comprising any one or any combination of:
- a) an odometer or means for obtaining platform speed;
- b) a pressure sensor;
- c) a magnetometer.

* * * * *